United States Patent [19]

Ruppert et al.

[11] Patent Number: 5,640,002
[45] Date of Patent: Jun. 17, 1997

[54] PORTABLE RF ID TAG AND BARCODE READER

[76] Inventors: Jonathan Paul Ruppert, 17147 Heatherwood Way; Ronald Craig Fish, 16590 Oak View Cir., both of Morgan Hill, Calif. 95037; Thomas Allan Yap, 1069 Summerwind Ct., San Jose, Calif. 95132; Ronald Merle Ames, 2854 S. Wheeling Way, Aurora, Colo. 80014

[21] Appl. No.: 515,257

[22] Filed: Aug. 15, 1995

[51] Int. Cl.⁶ .................................................. G06K 7/10
[52] U.S. Cl. .......................... 235/472; 235/462; 235/383; 235/492; 235/493
[58] Field of Search .................... 235/472, 380, 235/462, 383, 382, 435, 492, 493

[56] References Cited

U.S. PATENT DOCUMENTS

| | | | |
|---|---|---|---|
| 4,857,716 | 8/1989 | Gombrich et al. | 235/472 X |
| 4,970,379 | 11/1990 | Danstrom | 235/472 X |
| 5,047,615 | 9/1991 | Fukumoto et al. | 235/472 X |
| 5,059,951 | 10/1991 | Kaltner | 235/383 X |
| 5,151,684 | 9/1992 | Johnsen | 340/572 |
| 5,221,838 | 6/1993 | Gutman et al. | 235/472 X |
| 5,227,614 | 7/1993 | Danielson et al. | 235/462 X |
| 5,250,789 | 10/1993 | Johnsen | 235/383 |
| 5,280,159 | 1/1994 | Schultz et al. | 235/382 |
| 5,293,424 | 3/1994 | Holtey et al. | 235/380 X |
| 5,317,330 | 5/1994 | Everett et al. | 343/867 |
| 5,324,922 | 6/1994 | Roberts | 235/472 X |
| 5,340,973 | 8/1994 | Knowles et al. | 235/472 |
| 5,381,137 | 1/1995 | Ghaem et al. | 340/572 |
| 5,406,063 | 4/1995 | Jelen | 235/472 |
| 5,408,077 | 4/1995 | Campo et al. | 235/383 X |
| 5,412,192 | 5/1995 | Hoss | 235/380 |
| 5,424,524 | 6/1995 | Ruppert et al. | 235/462 |
| 5,434,572 | 7/1995 | Smith | 342/44 |
| 5,442,704 | 8/1995 | Holtey | 235/380 X |
| 5,444,223 | 8/1995 | Blama | 235/435 |
| 5,468,947 | 11/1995 | Danielson et al. | 235/472 |
| 5,479,172 | 12/1995 | Smith et al. | 342/51 |
| 5,513,261 | 4/1996 | Maher | 235/380 X |
| 5,517,194 | 5/1996 | Carroll et al. | 342/50 |
| 5,528,222 | 6/1996 | Moskowitz et al. | 340/572 |
| 5,550,547 | 8/1996 | Chan et al. | 342/42 |

FOREIGN PATENT DOCUMENTS

| | | |
|---|---|---|
| 0199252 | 10/1986 | European Pat. Off. . |
| 0355355 | 2/1990 | European Pat. Off. . |
| 2667183 | 3/1992 | France . |
| 60-69772 | 4/1985 | Japan . |
| 9120058 | 12/1991 | WIPO . |

*Primary Examiner*—Donald T. Hajec
*Assistant Examiner*—Michael G. Lee

[57] ABSTRACT

A portable barcode and RF ID tag reader that gathers information about items to be purchased etc by reading barcodes or RF ID tags. A store host computer gathers information about items to be purchased from the portable barcode/ID Tag readers and then the items are bagged by the customer at the checkout stand or by employees of the store at the checkout stand or in a separate warehouse from which the customer picks up the order. The portable barcode/RF ID tag reader can also be used in authenticating articles by accessing a factory computer using a serial number for the article scanned from an RF ID tag on the article. The portable barcode/RF ID tag reader is comprised of a microprocessor coupled to a bar code reader, an RF ID tag reader, a spread spectrum RF transceiver, a communication port, an audible feedback device, a touchscreen or light pen and display, a thermal printer and a magnetic stripe card reader and a smart card reader.

11 Claims, 54 Drawing Sheets

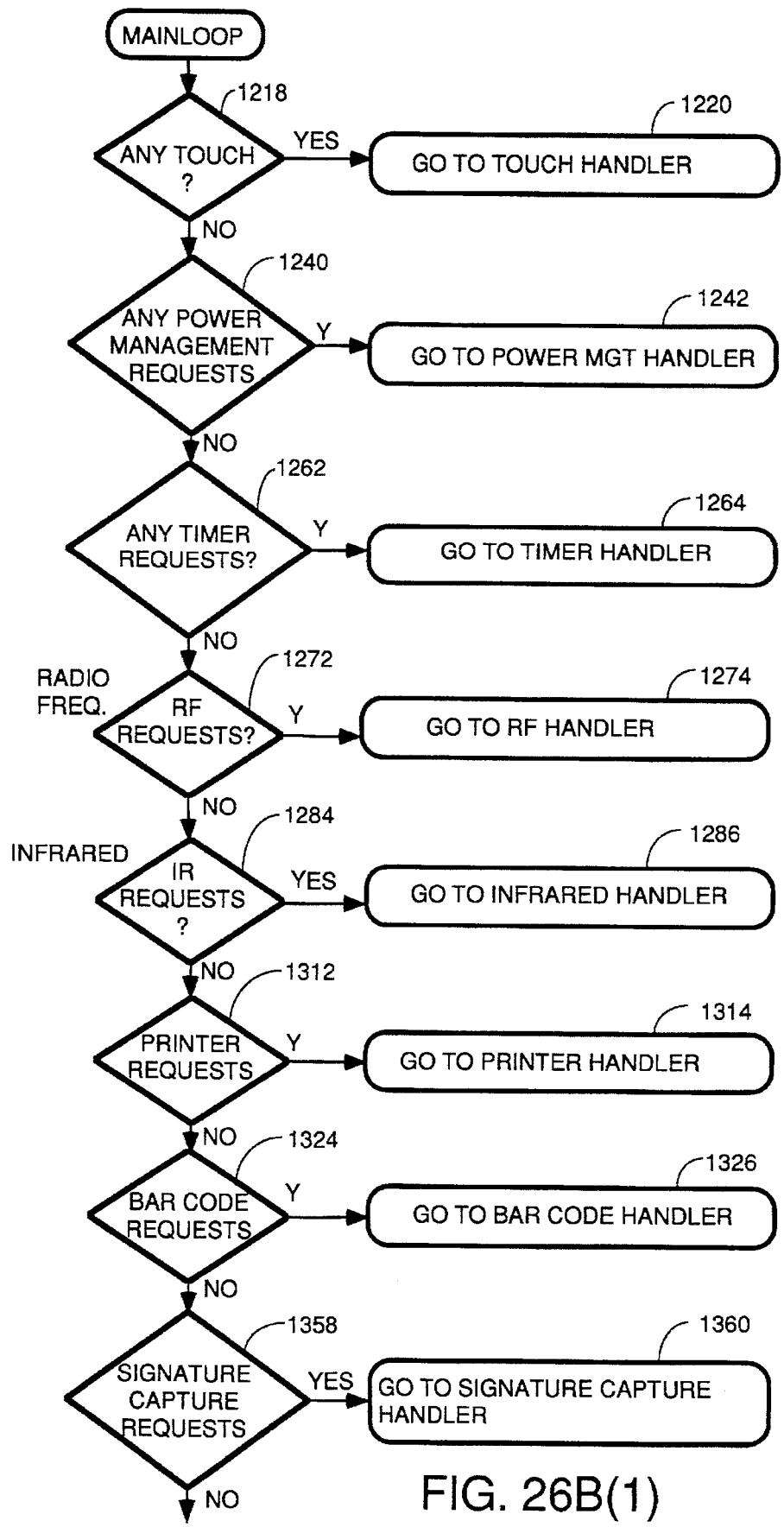
FIG. 26B(1)

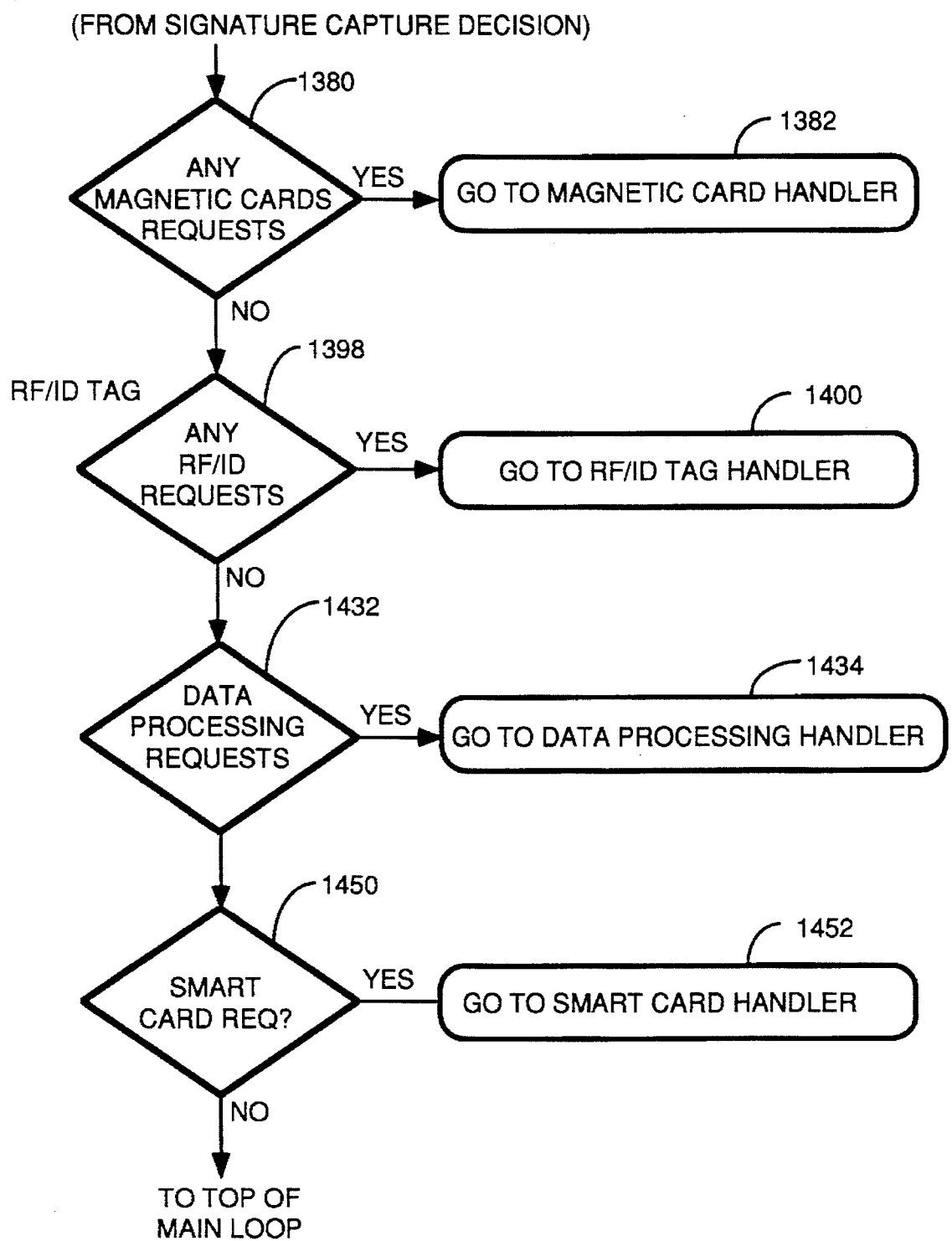
FIG. 26B(2)

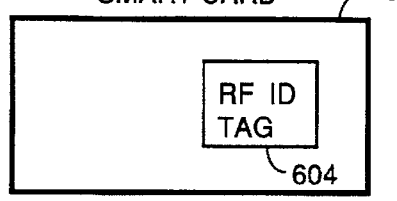
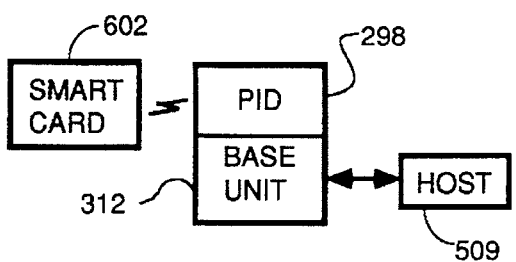
FIG. 28        FIG. 26
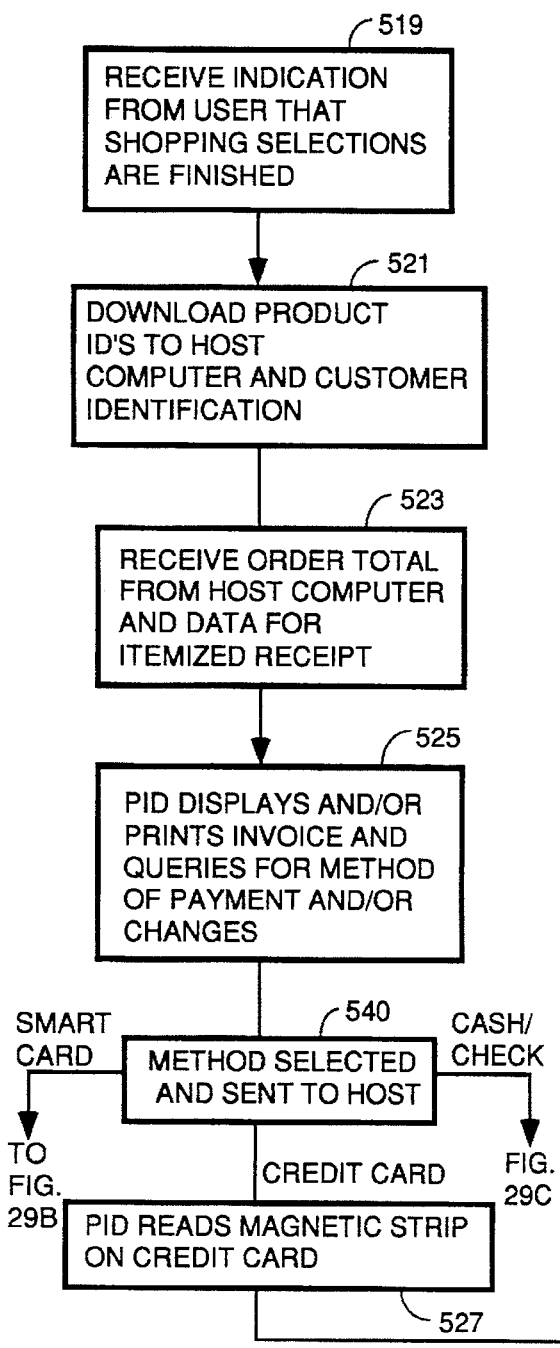
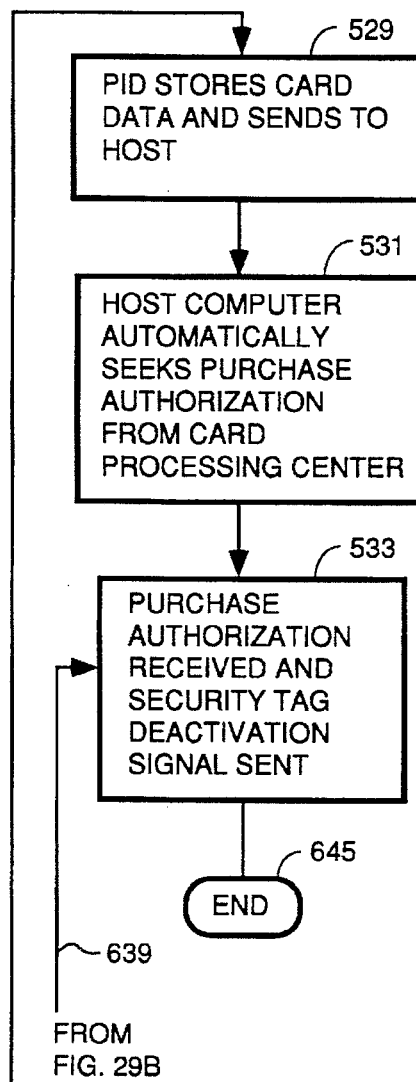
FIG. 29A

SMART CARD PAYMENT PROCESSING

CASH/CHECK PAYMENT OPTION

SECURITY BY WEIGHT

AUTO SORT AND BAG OPTIMIZATION PROCESS

PORTABLE RF ID TAG AND BARCODE READER

BACKGROUND OF THE INVENTION

This application claims priority under 35 U.S.C. §119 of prior filed International Application Number PCT/US95/07292, filed under the Patent Cooperation Treaty in the United States Receiving Office on June 6, 1995, and entitled PORTABLE HANDHELD BARCODE SCANNER AND RF ID TAG INFORMATION GATHERING DEVICE, which itself claimed priority under 35 U.S.C. §119 of a prior filed U.S. patent application entitled PERSONAL SCANNER/COMPUTER FOR DISPLAYING SHOPPING LISTS AND SCANNING BARCODES TO AID SHOPPERS, filed Jun. 24,1993, Ser. No. 08/082,257, which issued as U.S. Pat. No. 5,424,524 on Jun. 13 1995.

The invention pertains to the field of digital scanning, computing, data collection and data processing devices. More precisely, the invention pertains to the field of devices for assisting shoppers in creating shopping lists, scanning bar codes on products to be purchased etc., keeping running totals of amounts spent and items from shopping lists that have been picked up and numerous other useful functions.

One of the problems with shopping today is that it is inconvenient to constantly make comprehensive shopping lists every time a shopping trip is to be made, and, without a shopping list, it is often difficult to remember all the items that need to be purchased. Also, it is difficult to know how much money is being spent compared to a budgeted amount as items are placed in a shopping basket. During crowded shopping times, checkout times at grocery stores for example can be long especially when the shoppers ahead in line have many items.

It is also inconvenient to do comparison shopping for large numbers of items either for the same store over time or as between multiple stores at the same time. A study of changes in prices over time in a favorite store would require the user to write down the prices of large numbers of items and date the lists and keep them and then write down the current prices for the same items, preferably in the same order as the previous lists and compare the lists. Likewise, a comparison of prices between different stores would require physically visiting the different stores and writing down the prices of many items in each store, preferably in the same order in each store.

Further, with the multitude of sources of coupons for discounts on items on sale, it is a time consuming and tedious process to scan the local newspapers etc. for coupons, cut them out and bring them to the store that published the coupons to take advantage of the savings offered thereby.

Therefore, a need has arisen for a device that can ease or eliminate the foregoing problems.

SUMMARY OF THE INVENTION

In accordance with the teachings of the invention, there is disclosed a personal bar code scanning device which comprises a microprocessor and associated control software coupled to a bar code reader, a display, and a bidirectional communication port/device, ROM or EPROM memory and random access memory. Preferably, the display comprises a touchscreen and the communication device is a modem or an infrared transceiver or infrared red transceiver local area network interface. The bar code reading device is preferably a charge coupled device type reader which can image a bar code even on a curved surface and which has a built in decoder for converting the light and dark patterns of the bar code to an ASCII string of characters encoded in the bar code. In some embodiments, the personal scanner will be implemented in the form of a palmtop computer with a keyboard, touchscreen and associated internal modem or infrared transceiver local area network interface.

In one embodiment, the control software includes routines for displaying the list of stored shopping lists, modifying a selected shopping list by adding or deleting items, or generating custom shopping lists starting from nil list. Other routines retrieve the current price list of the store to be shopped. This may be done by modem in some embodiments, or by physical connection to the store computer in other embodiments through the communication port. In other embodiments, the current price list can be downloaded by way of an infrared transceiver local area network interface when the user enters the store and indicates that the price list is to be downloaded. Another routine receives user input indicating when an item is to be scanned, and sends a command to the bar code scanner to cause the bar code to be scanned. The resulting ASCII string from the decoder in the bar code scanner is received and displayed and compared to the items on the currently selected shopping list. In some embodiments, fuzzy logic is used to display all possible matches where the prose used to describe the item on the shopping list does not exactly match the text used in the bar code to describe the item scanned. Another routine alters the display of the item scanned to indicate that it has been scanned and then looks up the item on the current price list and adds its price to a running total which is displayed to the user. Another routine allows the user to enter a desired budget expenditure number as a guide in some embodiments.

When the user indicates by a signal such as touching a particular part of the touchscreen that he or she is done shopping, any item on the shopping list which has not been scanned is blinked or otherwise indicated on the display to remind the user to locate and scan such an item for purchase prevent forgotten items.

After all desired items have been scanned, the stored descriptive information and price information are downloaded from the personal bar code scanner to the store computer either through a hardwired connection between the communication port of the personal scanner and a communication port of the store computer or through an infrared transceiver local area network interface.

In alternative embodiments, when the user downloads a price list, a list of current discount coupons is also downloaded with the price list. This saves the cost to the stores of publishing the coupons and simplifies the life of the user. When the user enters the store and scans an item, the description of the item is used to automatically scan not only the shopping list and price list but also the current coupon list to determine if any discounts apply. If a discount coupon matching the scanned item is found, the discount is automatically applied to the price of the item before the running total is updated.

In the preferred embodiment, the price list is data compressed using known compression algorithms used in FAX machines prior to transmission to the Personal Scanner™ device and is stored in compressed form. The list can be decompressed in the Personal Scanner™ device prior to use in updating the running total as each item is scanned or during the processing to match a scanned item to items on the shopping list.

In the preferred embodiment, a credit card facility is provided whereby the user can enter credit card information needed for a purchase for one or more credit cards in the Personal Scanner™ device or can change credit card information already stored. After all shopping is completed, the user may select one of the stored credit cards to use by touching its entry on a displayed list on a touchscreen. The card information for the selected card is then downloaded to the store computer for use in paying for the purchase.

In an alternative embodiment, the Personal Scanner™ device may be used to shop for real estate. In this embodiment, signs in front of houses for sale will have bar codes thereon which give the house ID. The user scans the bar codes of all houses in the neighborhoods that appeal to the user or which he or she can afford, and the bar codes are stored. The scanned bar code information includes not only the house identification (usually its street address) but also the phone number of a real estate network computer which stores the details of the listing. Later, the user uses an internal or external modem to dial the computer associated with each listing by touching the identification of a particular listing on the touchscreen of the Personal Scanner™ device or by using a lightpen, keyboard etc. The computer storing the details of the listing is then dialed, and the record for the listing of interest is downloaded into the Personal Scanner™ device and displayed so that the user can determine details of interest such as the square footage, number of bedrooms and bathrooms, amenities etc.

In some embodiments optimized for grocery shopping, the Personal Scanner™ device is mounted on a shopping cad for use by user's who do not own their own devices.

BRIEF DESCRIPTION OF THE DRAWINGS

FIG. 28 is a diagram of a block diagram of a new type of smart card with an RF ID tag embedded therein instead of using electrical contacts.

FIGS. 29A–29C is a flow chart of a process shopping using a PID to self scan items to be purchased and communicate with the store host computer to pay for the goods at checkout time by either smart card, credit card or cash.

DETAILED DESCRIPTION OF THE PREFERRED EMBODIMENT

Figure 1:
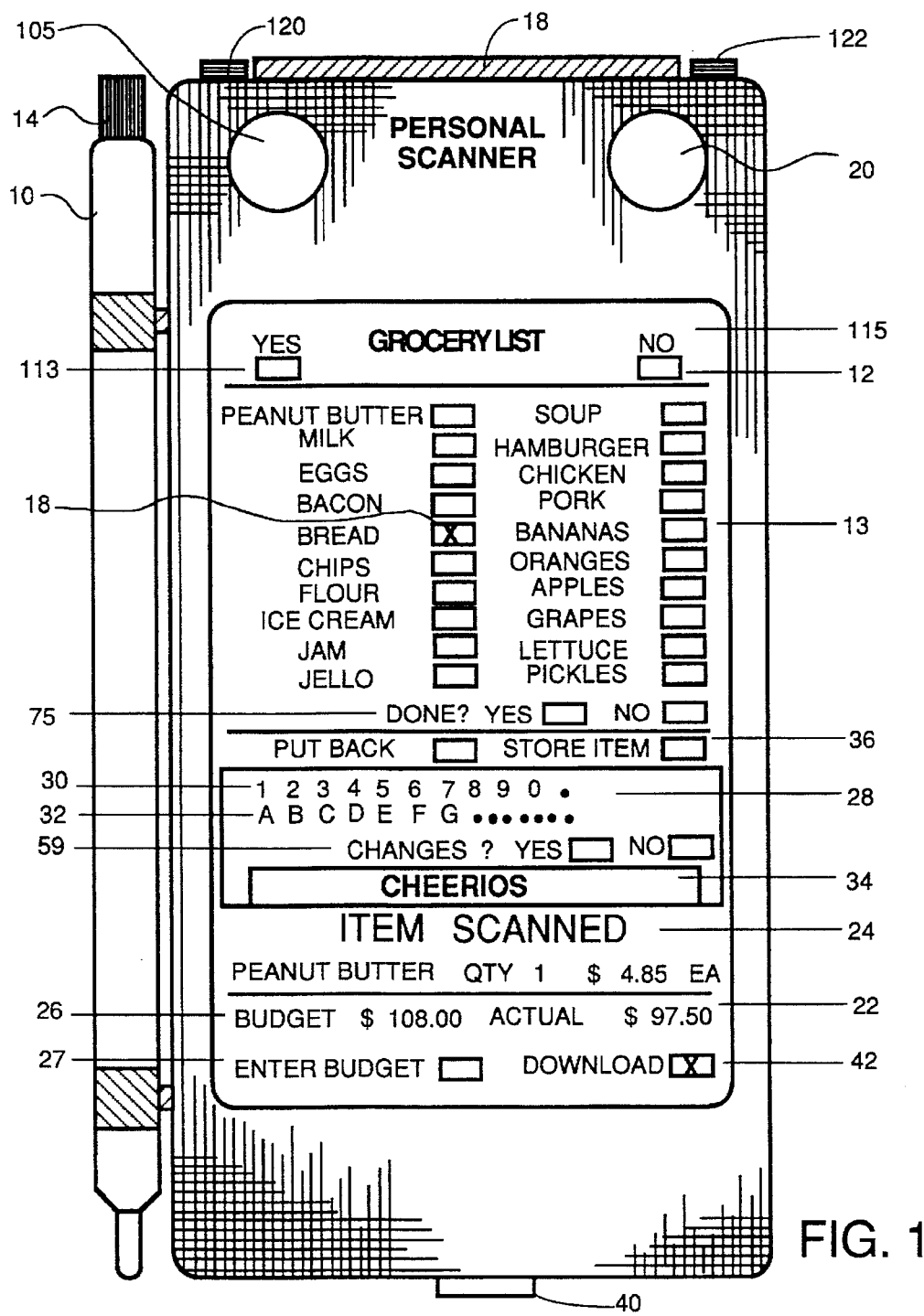
FIG. 1 is a top view of one embodiment of a Personal Scanner™ device.
Figure 2:
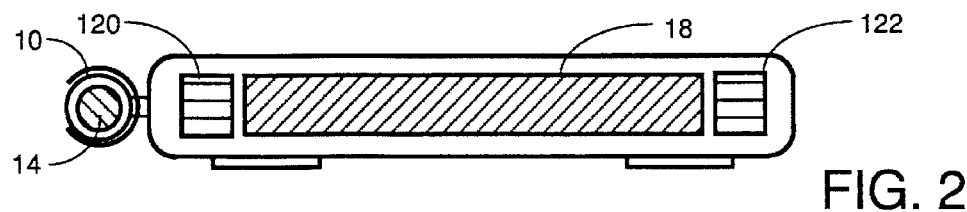
FIG. 2 is an end view of the device of FIG. 1 showing the preferred placement of permanent magnet security strip disarming devices and the scanning window.
Figure 3:
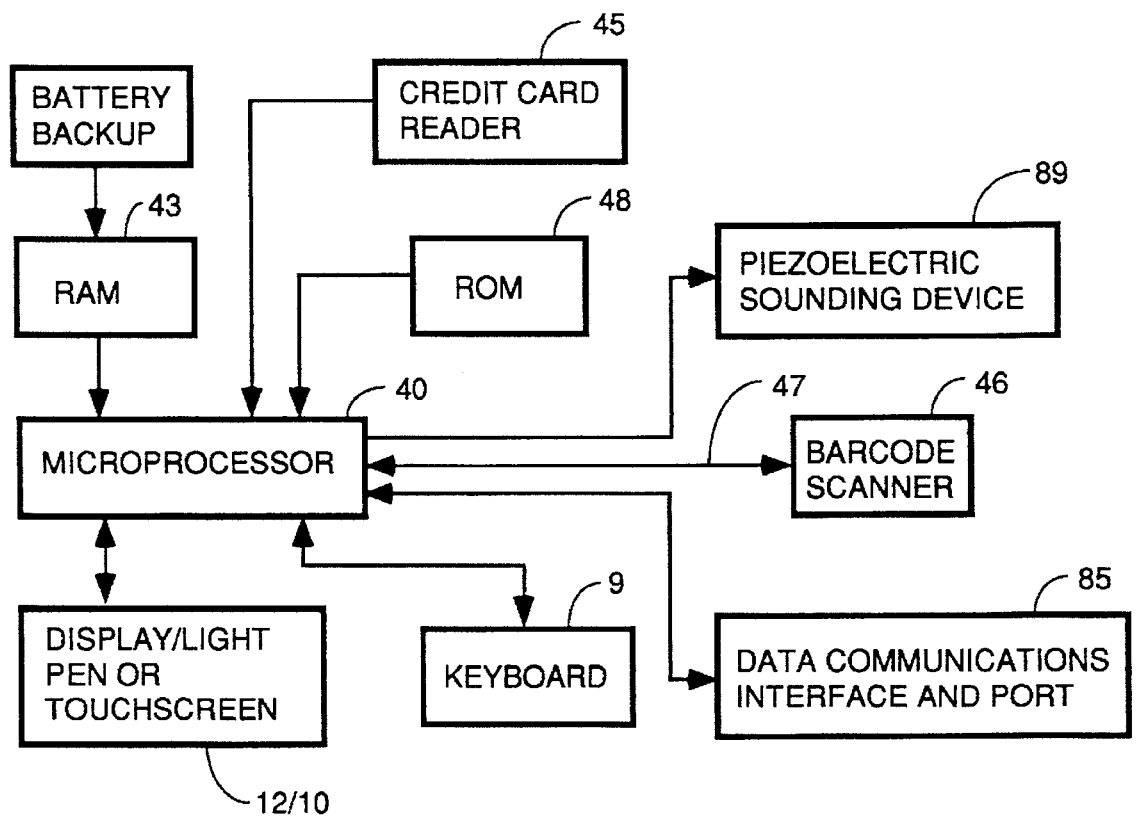
FIG. 3 is a block diagram of typical Personal Scanner™ type device.

Referring to FIG. 1, there is shown a plan view of a device according to one embodiment of the invention where a light pen is used to provide user input. In other embodiments, a touchscreen, mouse, stylus or other choosing device may be used to provide user input. FIG. 2 shows an end view of the device looking into a window through which bar codes are scanned. FIG. 3 shows a block diagram of the electronic structure of the preferred embodiment of the Personal Scanner™ device. Hereafter, the genus of devices according to the teachings of the invention may be referred to as the Personal Scanner™ because the technology is also useful for other applications such as shopping in department stores, taking inventory, etc. The purpose of the Personal Scanner™ in the most basic embodiments is to aid shoppers in generating shopping lists and shopping to fill those lists while keeping track of their total expenditures. This is done by having the user scan the bar code labels on items taken from the shelves and placed in the shopping cart. The Personal Scanner™ comprises, in the simplest embodiments, of a bar code reader coupled to a specially programmed digital computer which can use the output of the bar code reader to identify the items placed in the basket and compare them to the currently selected shopping list. The user can generate one or more shopping lists by providing user input via some feedback method to select or identify the items to be put on the list. In the embodiment shown in FIG. 1, this is done by the user via a light pen 10. The shopping list is then stored in RAM 43. Alternatively, preprogrammed shopping lists may be stored in nonvolatile memory such as ROM 48. Likewise, in embodiments using a palmtop computer, the RAM 43 and/or ROM 48 may be supplemented or replaced by memory cartridges coupled to the palmtop device via the PCMCIA standard integrated circuit memory expansion card interface. These external memory cartridges may be used to store shopping lists such that a collection of different shopping lists larger than the capacity of the internal memory can hold may be stored in a nonvolatile manner.

A light pen is not critical to the invention and any other way for users to provide input to the Personal Scanner™ such as touch screens, keyboard, slewing alphabets such as are used on the ARNAV R50 loran etc. or telephone type keyboards such are in common use on telephones and some GPS units such as the Garmin 100 AVD GPS portable navigator may also be used. The purpose of user feedback to the Personal Scanner™ is to allow users to generate shopping lists by selecting items from prestored lists which list all possible items that a shopper may want. By selecting some smaller subset of items that the user customarily consumes, smaller personalized shopping lists may be generated. Multiple shopping lists may be generated and stored and displayed on the screen 12 when needed. Typically, the screen is a liquid crystal or supertwist display but any other display technology compatible with the available battery power will suffice. To generate one of these lists from a universal list, the universal list is called to the screen by pressing button 14 on the light pen or another button (not shown) on the front panel for touch screen or other embodiments with no light pen. The user then selects items from the universal list for inclusion in the "short list" being composed. In light pen embodiments, the items are selected from the universal list are selected by touching the box 16 associated with a particular item or the item itself. In touchscreen embodiments, the user's selections are sensed by sensing which item on the display is touched by the user. The item then will appear on the short list with a box beside it that is coded on the display in a particular manner such as being filled in as shown in FIG. 1. In the preferred embodiment, a touchscreen is used so that the user need only touch the name of the item itself or an associated item "button" next to the name of the item with his or her finger or an ink pen, pencil etc. to indicate a selection to the Personal Scanner™.

In even simpler embodiments, only one shopping list is used which could be selected by the user as indicative of the types of foods or other items that user consumes normally. In these embodiments, the Personal Scanner™ would be offered in different models, each with a different shopping list. The user would select the model to use or purchase based upon the type of shopping list stored therein.

When the user is ready to shop, the user takes the personal shopper to the grocery store and selects items from the shelves and puts them in his or her shopping cart. As the items are being put into the shopping basket, the bar code label on the package is scanned with a bar code scanner the window for which is shown at 18 in FIGS. 1 and 2. In the preferred embodiment, the bar code scanner within the Personal Scanner™ is a charge coupled device type because of its lower cost and lower power consumption and because it can tolerate curved surfaces such as are found on cans. In alternative embodiments, the bar code scanner can be a laser diode based scanner, LED contact scanner, optical or magnetic scanner or character reader.

To scan an item using the CCD type bar code scanner, the user places the window 18 in contact with the bar code label on the package, and presses button 20 to start the scan. The bar code is then scanned and the resulting signals are decoded into the ASCII characters etc. which were originally encoded into the bar code (any other code such as EBCDIC could also be used). The ASCII characters identify the item, and are compared to the shopping list for a match. If a match is found, then the box beside the matching item on the shopping list has its display changed to another coding indicating the item has been scanned and is in the basket. Typically, this will be an X inside the box, but any other coding can be used.

In some embodiments, a running total of the cost of all the items in the basket is kept and shown on the screen. In the embodiment of FIG. 1, the running total is shown at 22, and the price of the individual item just scanned is shown at 24. The running total is generated by comparing the identity of the item derived from the bar code identity to a price list. The price list is stored in the handheld scanner. In some embodiments, the price list is downloaded by the handheld scanner upon entry to the store. This can be done by direct connection to the store's computer via an RS232 port shown symbolically at 40 in FIG. 1. In other embodiments, a wireless downloading process can be performed upon entry to the store. In this embodiment, an infrared transceiver such as the Photonics Infrared Transceiver™ is included with the handheld scanner. Likewise, the store's computer coupled to its laser scanners also includes an infrared transceiver. When the user enters the store, he or she downloads the price list by touching the download button 42 on the screen with the light pen or a physical button (not shown) located elsewhere. The Personal Scanner™ then downloads the store's current price list using the infrared transceiver or the RS232 port. In some embodiments, the price list can be entered by hand when an item is scanned.

In the preferred embodiment, the price list is data compressed using known compression algorithms used in FAX machines prior to transmission to the Personal Scanner™ device and is stored in compressed form. The list can be decompressed in the Personal Scanner™ device prior to use in updating the running total as each item is scanned or during the processing of FIG. 12.

In some embodiments, the price list information downloaded from the store can be used to make the user a more informed shopper. For example, the items that are on sale or which have risen in price since the last download operation from the same or a different store can be displayed in separate displays or their status can be indicated on the shopping list. For example, the items on the shopping list that are on sale or which have a lower price than the same item price at a different store from which the price list was last downloaded can be flashed, while the items that have risen in price can be highlighted with reverse video.

In some embodiments, the user can designate a budget available to spend. Such a budget figure is shown at 26. In the embodiment shown in FIG. 1, the budget figure can be set by the user using the light pen and selecting the numbers in the budget figure serially using the displayed numbers 0–9 and the decimal point shown at 28 in window 30. Likewise, the letters of the alphabet are shown at 32 in window 30. These letters can be selected individually to make up an item to add to the shopping list.

Alternatively, the shopping list can be generated from a null list or an existing list can be expanded by scanning items that the user wishes included on the list one by one. As each item is scanned and its bar code is decoded, the identity of the item appears in subwindow 34. The user can then add the item displayed in the subwindow 34 by touching the "store item" box 36.

Figure 4:
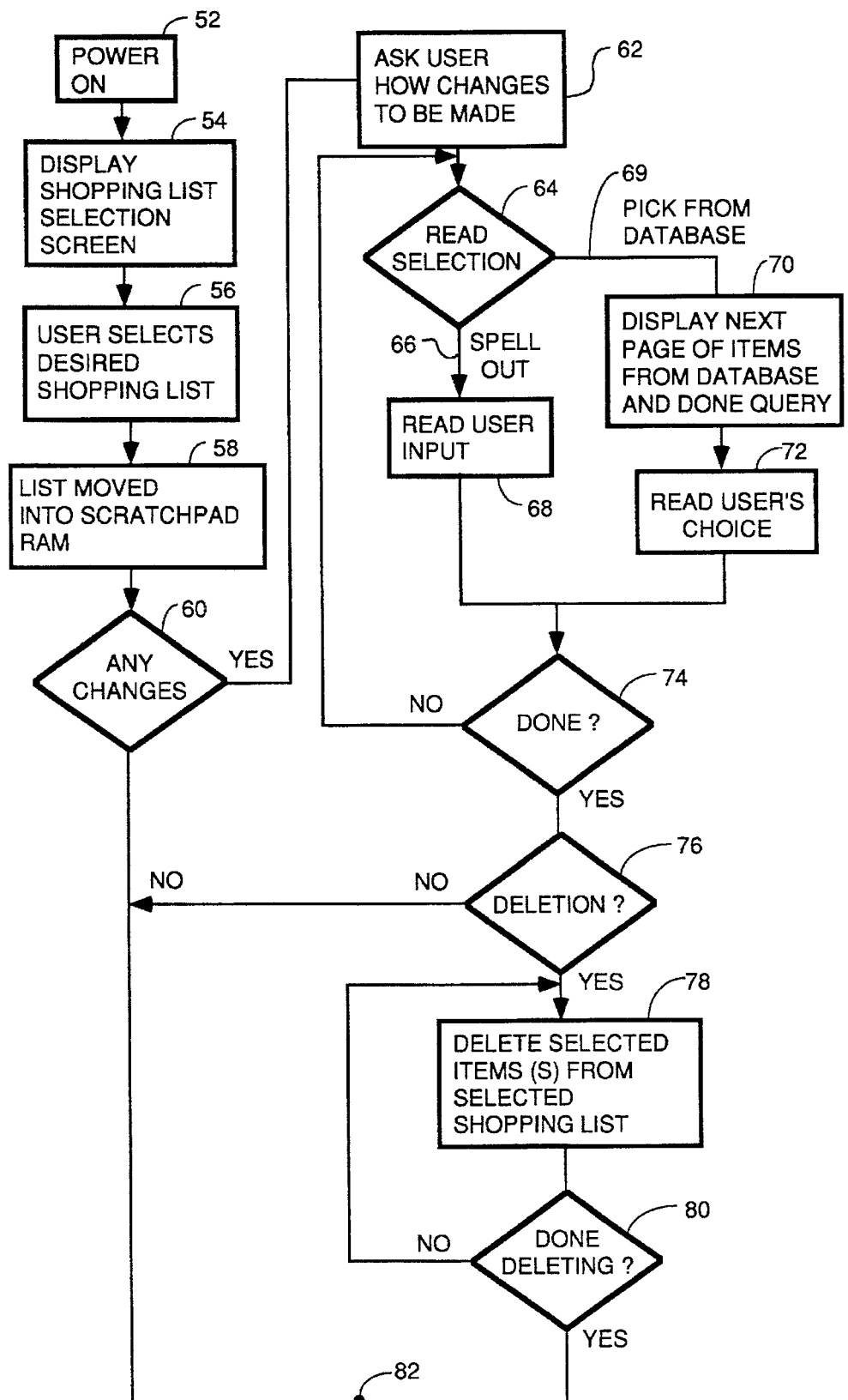
FIG. 4 is a flow chart of the processing which selects from prestored shopping lists, allows modification of those lists or generation of custom lists from a nil list.

Referring to FIG. 4 there is shown a flow chart for processing by the simple embodiment of the Personal Scanner™ shown in FIG. 3. When power is first applied to the unit as symbolized by block 52, the microprocessor 40 scans the ROM 48 to determine the number and names of all the available "fixed" shopping lists, if any, and scans battery backed up RAM 43 to determine the names of any custom shopping lists stored therein. The names of all the available shopping lists are then displayed on a sign-on screen. This process is symbolized by block 54.

The user then selects the shopping list desired by touching a box displayed next to the list on the list itself with the light pen or through any other method of selection. This process is symbolized by block 56.

The selected shopping list is then displayed and moved into an area of RAM 43 reserved as a scratchpad RAM, as symbolized by block 58.

The user is then asked whether there are any changes to the list by blinking or reverse video or color change of the word "changes" displayed at 59 in FIG. 1. The user then touches the "yes" or "no" box displayed next to the word "changes". This process along with the process of sensing the answer to the question is symbolized by block 60.

If there are to be changes, the microprocessor asks the user whether the changes are to be spelled out by the user by selection of letters and/or numbers from the display window 30 or whether the user wishes to pick from the database of all possible choices. This process is symbolized by block 62 and block 64. If the user chooses to spell out the desired changes, path 66 is taken to block 68 which represents the process of reading the user's input selections. In the embodiment of FIG. 3, this input will be by light pen selection of letters and/or numbers displayed in window 30 in FIG. 1. In other embodiments, a touch-screen will be substituted for display/light pen combination 12/10 in FIG. 3, and the process of sensing user input will be the process of sensing touches to the screen in display window 30 or in window 13 is the user chooses to enter changes by displaying the universe of possible choices in window 13. In other embodiments such as an embodiment using a EPSON palmtop computer with a built in touchscreen and keyboard, the user's input may be entered by an optional keyboard 9 or through touches to the touchscreen.

If the user chooses to make the changes by picking items from the database, path 68 is taken to the process represented by block 70. The processing of block 70 comprises displaying the next page of items from the database along with a done query which inquires whether the user has found the item he or she wishes to add to the list. Block 72 represents the process of reading the user's selections from the light pen, touch screen etc. and adding the selected item to the shopping list. Block 74 represents the process of determining whether the user is done selecting from the items displayed in the window 13 or is done selecting letters and numbers from the window 30. This done query is shown at 75 in FIG. 1. If the user is not done, processing returns to block 64 where the user is given the choice of making further additions either by choosing items displayed from the database or by spelling out the additions as described above.

If the user is done making additions, block 76 is performed to determine if there are any deletions. If deletions are to be made, the processing represented by block 78 is performed to sense the selected items designated by the user through the light pen or touch screen and to delete them from the selected shopping list. Block 80 processing is performed to determine if the user indicates he or she is done deleting. If not, processing returns to block 78. If so, processing proceeds on path 82 to the process represented by the flow chart of FIG. 5 to scan items from the shopping list into the Personal Scanner™. Processing also proceeds along path 82 if the user indicates during the processing of block 76 that he or she has no deletions or if the user indicated in the processing represented by block 60 that no changes to the selected shopping list were necessary.

Figure 5:
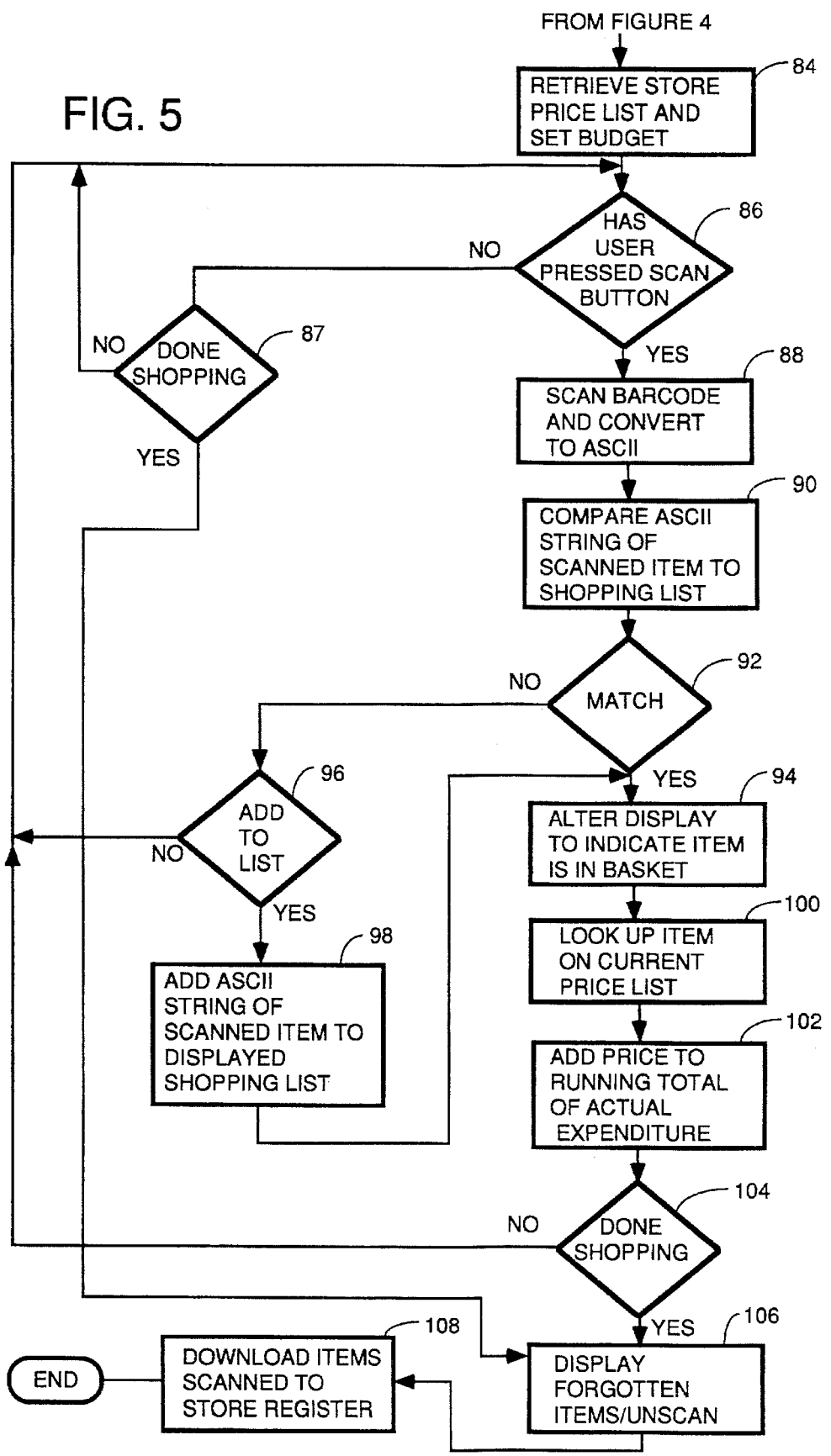
FIG. 5 is a flow chart of processing to retrieve the current price list, scan an item, look for matches on the shopping and price lists, display forgotten items and download data from scanned items to the store computer.

Referring to FIG. 5, there is shown a flow chart for processing for retrieving the store price list, comparing the price list to another price list and for scanning in the items put in the user's basket and displaying the running total of items scanned. Block 84 represents the process of retrieving the store's current price list and giving the user the opportunity to set the budget number which appears at 26 on the display. Setting the budget number only occurs if the user touches the set budget box 27 on the display. If he or she wishes to set a budget, the numbers comprising the budget number are individually selected from the numbers and decimal point displayed at 28 in window 30. The Personal Scanner™ device assumes that the user is done entering budget numbers when a decimal point and two numbers to the right of the decimal point have been selected. In embodiments having a keyboard such as embodiments using the EPSON palmtop computer, the user may enter only a dollar figure and press enter at which time the machine will assume that an even dollar amount is selected for the budget number. Retrieving the store's current price list can be done in any one of several way using a data communication interface and port 85 in FIG. 3. In some embodiments, the data communications interface and port is a modem and a serial or parallel bidirectional data port with appropriate driver circuitry and software. In other embodiments, the data communications interface and port is an infrared transceiver such as the one commercially available from Photonics of San Jose, Calif., the details of which are hereby incorporated by reference. Some information on infrared and radio wireless data transmission is publicly available through the IEEE 802.11 Wireless Networking Work Group, the details of which are hereby incorporated by reference. The transmitted and received infrared patterns comprise a series of data symbols transmitted serially using pulse position encoding. Preceding the data is a timing pattern that allows the receiving unit to synchronize its internal clock with the clock of the transmitting unit. The infrared transmission is diffuse rather than directed and data rates of 1 Megabit/ second can be obtained. Any infrared or radio wireless data transfer device that is capable of downloading the store price list in a reasonable amount of time will suffice for purposes of practicing these type embodiments. The details of the particular data communication interface and port are not critical to the invention, and selection of what type port to use depends upon the desired mode of operation for the device. In some embodiments, the processing of block 84 represents the process of a user dialing the computer of the store of interest using either an internal or external modem (not shown) coupled to the microprocessor 40 through data communications interface and port 85 and downloading the store's current price list by dialing the store computer. In embodiments using the EPSON palmtop computer an internal modem is preferred, but in embodiments using the embodiment shown in FIG. 1, an external modem is preferred. In embodiments using a palmtop computing device, the modem may be attached through a PCMCIA Type II interface. In embodiments where the data communications interface and port 85 is a Photonics Infrared Transceiver™ (available commercially from Photonics Corporation, 2940 North First Street, San Jose, Calif. 95131, the details of which are hereby incorporated by reference), the processing represented by block 84 is the process of logging onto the store's local area network in infrared wireless fashion when the user enters the store and downloading the store's price list.

Query 86 represents the process of scanning the keyboard and waiting for the scan button 20 in FIG. 1 to be pushed. When it is pushed, the Personal Scanner™ assumes that the bar code of the item to be placed in the basket has been placed within range of the scanning window 18, and scanning proceeds in a known fashion. In alternative embodiments, the button 20 can be eliminated and a scanner with proximity sensing capability may be substituted. Such scanners are commercially available and sense when they have been placed adjacent to a bar code. The details of these scanners are hereby incorporated by reference. Such scanners automatically scan and decode any bar code placed within view. The process of scanning the bar code and converting the resulting pattern of signals from the bar code scanning apparatus to ASCII (or EBCDIC etc.) characters is well known in the art. Basically, the bar code scanner 46 converts the bars and spaces of the bar code pattern to a signal waveform that makes transitions between two digital levels in a predetermined unique pattern for each unique bar code. This unique bar code pattern waveform is applied to a decoder which converts the pattern to a series of ASCII characters, and usually calculates a checksum to check the validity of the decoded characters and releases the decoded characters after verifying a correct checksum. Equipment to do this is commercially available from several sources including Densei Nippon Electric Industries of Tokyo, Japan, the details of which are hereby incorporated by reference. Generally, bar code scanners come in three classes: lasers which are expensive and consume large amounts of power, LED devices which must be physically moved past a bar code and which consume large amounts of power and CCD imaging devices which image the entire bar code and then electronically scan it and convert it to the unique waveform representing the bar code. It is the CCD class of bar code scanners which work best for the Personal Scanner™ application because they need not be in contact with the bar code and they consume less power than many other types of bar code scanners. Densei makes CCD type bar code scanners such as the Model BCH5532 Bar Code Reader. The details of the Densei line of CCD bar code scanners in general, and the Model BCH5532 scanner in particular are hereby incorporated by reference. Other types of bar code scanners will also work such as the bar code scanner disclosed in U.S. Pat. No. 4,204,636 to Hayman, which is hereby incorporated by reference. After a bar code has been successfully scanned and decoded, the microprocessor 40 sends a suitable waveform to the piezoelectric sounding device 89 in FIG. 3 to give the user an audible tone that the bar code has been successfully scanned.

If the user does not press the scan button for a predetermined time of, for example 30 seconds, the microprocessor displays a query as to whether the user is done shopping as symbolized by block 87. If the user is done, he or she presses the button 105 on the front panel when he or she has reached the checkout clerk and connected the Personal Scanner™ device to the store's register. This causes the processes symbolized by blocks 106 and 108 to be performed to transfer the scanned items to the store registers as will be described further below.

Block 88 represents the process of scanning the bar code on the package to be placed in the cart and converting the light and dark bars of the bar code from an analog waveform to a collection of digital representations of ASCII characters. When a bar code has been successfully scanned, a beep tone is emitted from a piezoelectric sounding device 89 in FIG. 3. Block 90 represents the process of comparing the ASCII characters of the bar code to the active shopping list currently stored in memory 43. Block 92 represents the process of determining if there is a match between the ASCII string and any entry on the shopping list. If there is, then the display is altered to indicate the item has been placed in the basket, as symbolized by block 94. If there was no match, the user is asked whether he or she wishes to add this item to the shopping list as symbolized by block 96. This is done by displaying some indication that the item scanned is not on the shopping list. Typically this is done by displaying the word ADD on the display in some designated area or lighting an ADD LED (not shown in FIG. 1) on the front panel and displaying "yes" and "no" option boxes on the display. If the user indicates the item is to be added to the shopping list, the ASCII string from the decoder is added to the shopping list as symbolized by block 98. If the user elects not to add the item to the list, processing returns to block 86 to scan the front panel controls for another push of the scan button. After block 98 processing is completed, the processing of block 94 is performed to alter the display to indicate the item has been placed in the basket.

Next, the price of the item just scanned is looked up on the current price list corresponding to the store from which the item is being purchased as symbolized by block 100. The price of the item is then added to the running total for all the groceries placed in the basket, and the running total is displayed at 22 on the display as symbolized by block 102. In some embodiments, if the user wishes to buy more than one of the scanned item, each item must be individually scanned, and this embodiment is assumed for the flow chart of FIG. 5. In other embodiments, another step is present where the computer asks the user how many of the item scanned have been placed in the basket by writing a query to the display to which the user responds by touching a number in the window 30 in FIG. 1 or touching a number key on the keyboard. The microprocessor then multiplies the price of the item by the number of items placed in the basket and adds the result to the running total.

For unpackaged items such as fruit and vegetables, the grocery store must have a produce clerk with a scale and bar code machine who is available for bagging and labelling produce with bar codes which can be scanned. This clerk is available to shoppers who bring produce to the clerk. The clerk weighs and bags items that are sold by the pound and creates a bar code which encodes the item description and its total price. Preferably, the clerk will have available a scale which weighs the item and automatically multiplies the weight by the current price and outputs a properly encoded bar code. Such scales are available commercially from Global Equipment of Oakland, Calif. (Ph(510) 271-0030, distributors for the Kobota FP900 series scale, the details of which are hereby incorporated by reference. Alternatively, the shopper can weigh the item on a scale, input the weight and input the unit price. The Personal Scanner™ device will then multiply the weight by the unit price and add the result to the running total.

Block 104 represents the process of querying the front panel display or controls for a signal from the user that he or she is done shopping. In the embodiment depicted in FIG. 1, this signal is generated with the user presses button 105 on the front panel. When this occurs, the processing of block 106 occurs to display forgotten items and unscan any item the user wishes to place back on the shelf. Typically, the forgotten items are displayed by blinking or converting to reverse video the forgotten items from the shopping list, i.e., those items on the list which were not matched with any scanned item. The user may also unscan any item in the cart at this stage by touching the item to be unscanned on the display twice in short succession. This indicates to the Personal Scanner™ device that the touch to the display is not a random touch. If two touches are detected within a shod time, the item touched is removed from the list of items scanned, and a downward adjustment in made in the running total. Next, the processing symbolized by block 108 is performed to download the descriptions and prices of the items scanned to the store's register so that the order can be paid for by the shopper. In the preferred embodiment, the downloading process is carried out by coupling the Personal Scanner™ device to the store register through RS232 port 40 in FIG. 1 by a cable. In alternative embodiments, the scanned items may be transferred to the store register through a Photonics Infrared Local Area Network Wireless Interface coupled to Data Communications Interface and Port 85 in FIG. 3. The checkout clerk then physically checks each item in the basket against the list downloaded from the—Personal Scanner™ device and makes any necessary corrections. The bill is then totalled and the customer pays the clerk.

Figure 6:
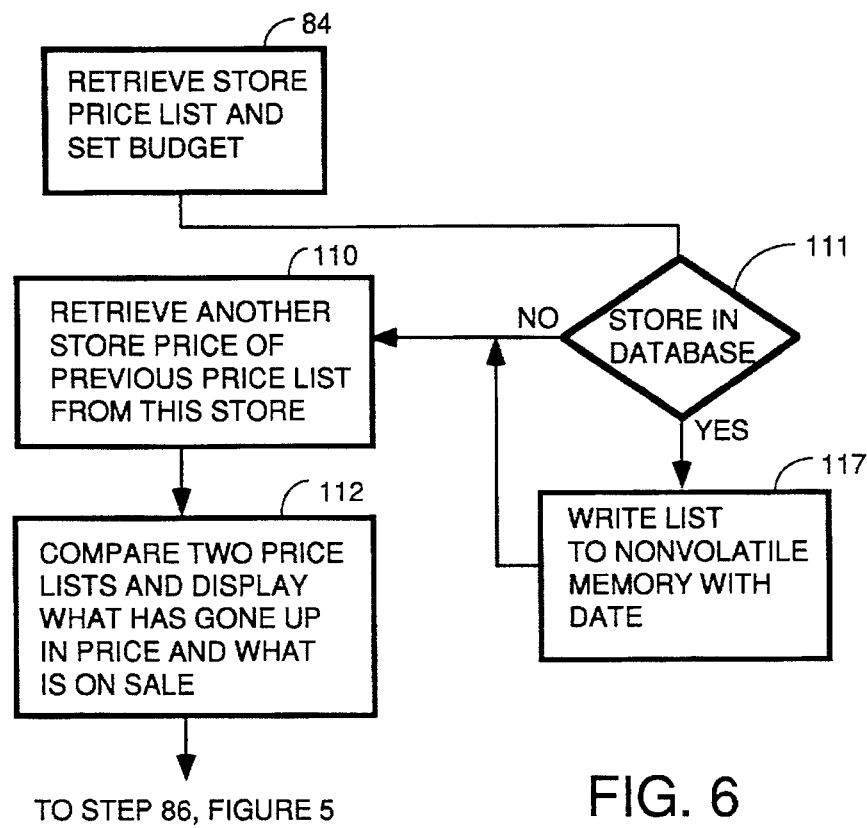
FIG. 6 is a flow chart of processing to retrieve another price list from an earlier time or another store and compare prices item by item and display items that are higher and lower in price.

FIG. 6 shows a flow chart for an alternative embodiment of Personal Scanner™ device which can compare one store price list against the price list from another store or an earlier price list from the same store. Block 84 represents the same process as it did in the flow chart of FIG. 5. A variation from the flow chart of FIG. 5 for this embodiment involves the option to store the current price list in a database stored in nonvolatile memory. Typically, space in battery backed up random access memory 43 in FIG. 3 will be reserved to store one or more old price lists from the shopper's favorite store or from another store. Block 111 represents the process of inquiring of the user whether to store the current price list in the database. If the user wishes to store the list, he or she touches the "yes" button on the front panel display at 113 in FIG. 1. This causes the data defining the current price list to be stored in RAM 43 (or on a hard disk in embodiments using palmtop computers) with the current date as represented by block 117. If the shopper does not want the current price list stored in the database, the "no" box at 115 in the display of the embodiment shown in FIG. 1 is touched physically or with the light pen.

Block 110 represents the process which is performed after the processing of block 111 is performed if the user chooses not to store the price list, or after the processing of block 117 is performed if the user chooses to store the price list. The process of block 110 consists of retrieving a price list from another store or from a database of previous price lists from the store currently being shopped. In the case of retrieving a price list from another store, this may be done by modem as described above by dialing the computer of the store in question or by physically entering the store and downloading their price list through the RS232 port 40 in FIG. 1 or through the Photonics Infrared Transceiver LAN Interface. In the case of retrieving an old price list from the store currently being shopped, the microprocessor will query the user as to which price list to retrieve in the case there are more than one old price list stored in the database. If there is, the user may respond by selecting a date using the numbers displayed at 28 in FIG. 1.

Block 112 represents the process of comparing the current price list item by item with the price list from another store or a previous price list from the same store associated with the current price list. The comparison process indicates which items have risen or fallen in price. Items which have risen in price are displayed in some appropriate fashion such as reverse video while items which have fallen in price are displayed in another way such as by blinking the entry etc.

One of the possible benefits of use of the Personal Scanner™ device is that it may make it possible for grocery stores to reduce their headcount in using fewer checkout clerks since the checkout line will move much faster. Obviously because the Personal Scanner™ device can electronically transfer the information therein to the store register much faster than a checkout clerk can scan each item in a shopper's basket, the checkout lines should move much faster. One concern grocery stores will have of course is in the area of security. To prevent shoppers from putting things in their carts which have not been scanned and then leaving the store with them, in one alternative embodiment, a security strip deactivation system is employed. In the preferred embodiment, the security strip is a magnetic strip upon which other information such as the unit price etc. may be printed. These magnetic strips, when not deactivated and passed through an alternating current magnetic field, cause intermodulation products which can be detected and which set off alarms. These magnetic strips can be deactivated so that the intermodulation products are not created by exposing them to a D.C. or permanent magnet field. Accordingly, in embodiments in which the security strip deactivation system is used, two or more permanent magnets 120 and 122 are mounted on the end of the Personal Scanner™ device adjacent to the scanning window 18 as shown in FIGS. 1 and 2. These magnets are permanent magnets and each has a north and south pole. The magnets 120 and 122 are mounted such that their north and south poles face in opposite directions so as to strengthen the magnetic field that they create in front of the scanning window 18. In other words, if permanent magnet 120 has its north pole facing inward toward the casing of the Personal Scanner™ device, then permanent magnet 122 will be mounted to have its south pole facing inward toward the casing. Such a system is disclosed in U.S. Pat. No. 5,187,354, which is hereby incorporated by reference. For embodiments using memory which is sensitive to magnetic fields such that data might be lost such as hard disks or floppy disks used in palmtop computers adapted to the Personal Scanner™ functions, it is preferred to provide some magnetic shielding between the magnets 120 and 122 and any memory which is magnetically sensitive. Such shielding can be some metal which prevents magnetic field lines from penetrating therethrough.

For items which are to be unscanned and put back on the shelf with this embodiment, it will be necessary for the store to re-magnetize the security strip before putting the item back on the shelf.

Of course the above described security system is subject to abuse by unscrupulous shoppers who may deactivate the security strips by putting the Personal Scanner™ device scanning window close to the security strip to deactivate it but not pressing the scan button to actually scan the bar code. To prevent this, the permanent magnets 120 and 122 in FIGS. 1 and 2 can be replaced with D.C. magnet coils which create D.C. magnetic fields only when the scan button is pushed. In this embodiment, pushing the scan button simultaneously cause bar code scanning to occur and routing of direct current through the coils of electromagnets mounted in the positions of magnets 120 and 122 to create the required D.C. magnetic field.

Figure 7:
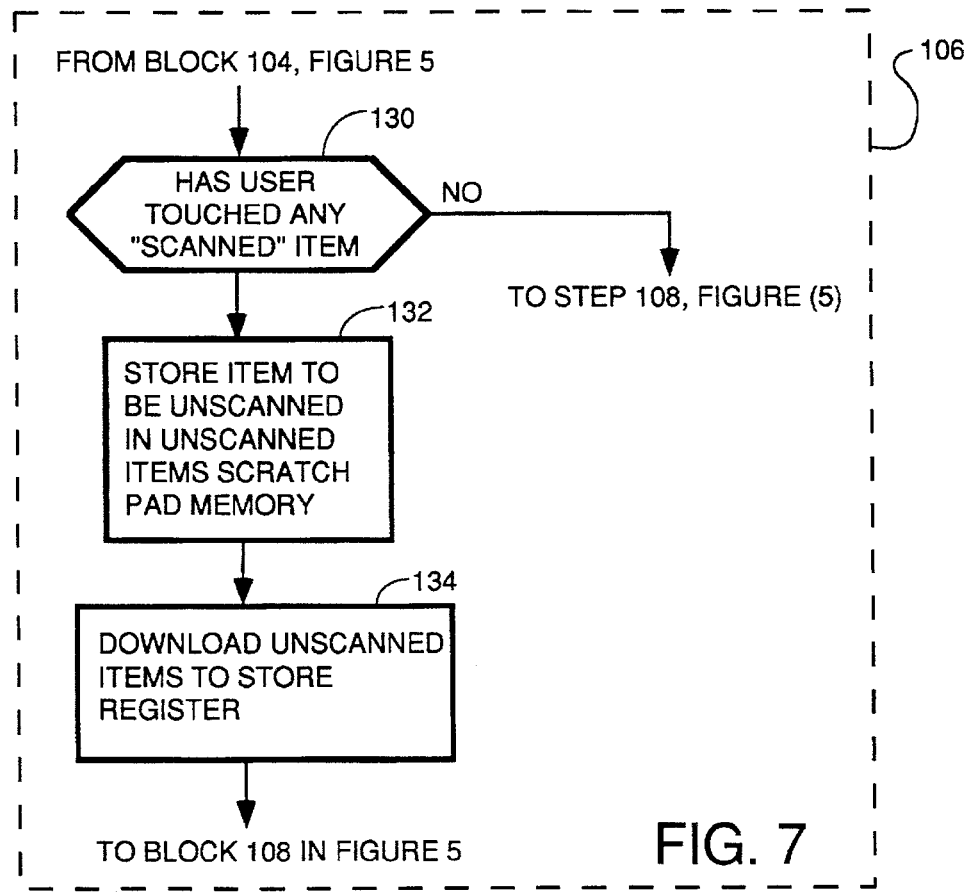
FIG. 7 is a flow chart for processing in deleting an item from the list of items that have been scanned.

Referring to FIG. 7, there is shown an alternative embodiment for a security system for items to be unscanned. In this embodiment, the Personal Scanner™ software automatically assumes that any item on the shopping list displayed as "scanned" is to be unscanned if the user touches it twice in rapid succession on the touchscreen or with the light pen. The process of monitoring for such an event is symbolized by block 130. If this event does not occur, control is passed to block 108 in FIG. 5. If it does occur, then the processing of block 132 is performed to store any item(s) to be unscanned in a special scratchpad memory or database of such items. Thereafter, the unscanned items are downloaded to the store register in a separate transaction from the items that are scanned and the shopper intends to purchase as symbolized by block 134. The checkout clerk then requests that the shopper hand the items which were unscanned to him or her for placement back on the shelves.

Figure 8:
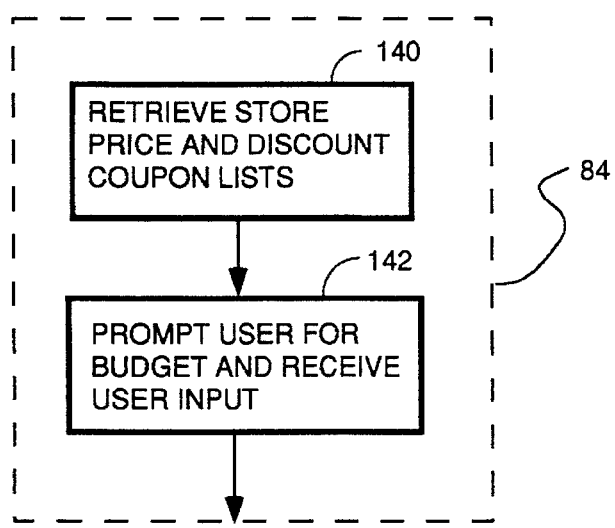
FIG. 8 is a flow chart for processing to allow a user to enter a budget number.

Referring to FIG. 8, there is shown an alternative embodiment for the processing of block 84 in FIG. 5 to automatically download coupon lists. In this embodiment, the processing of block 84 in FIG. 5 is replaced by the processing shown in FIG. 8. When the user enters the store and attaches the Personal Scanner™ device to the store local area network via port 85 in FIG. 3 either by cable or through the Photonics Infrared Transceiver LAN interface or when the user dials the stores computer by modem and downloads the store's current price list, he or she also receives the current list of "coupons", i.e., the list of items currently discounted. This list is stored for later comparison to each item scanned. This process of downloading the price list and coupon list is symbolized by block 140 in FIG. 8. Block 142 symbolizes the process of prompting the user for the budget number and receiving the user's input.

Figure 9:
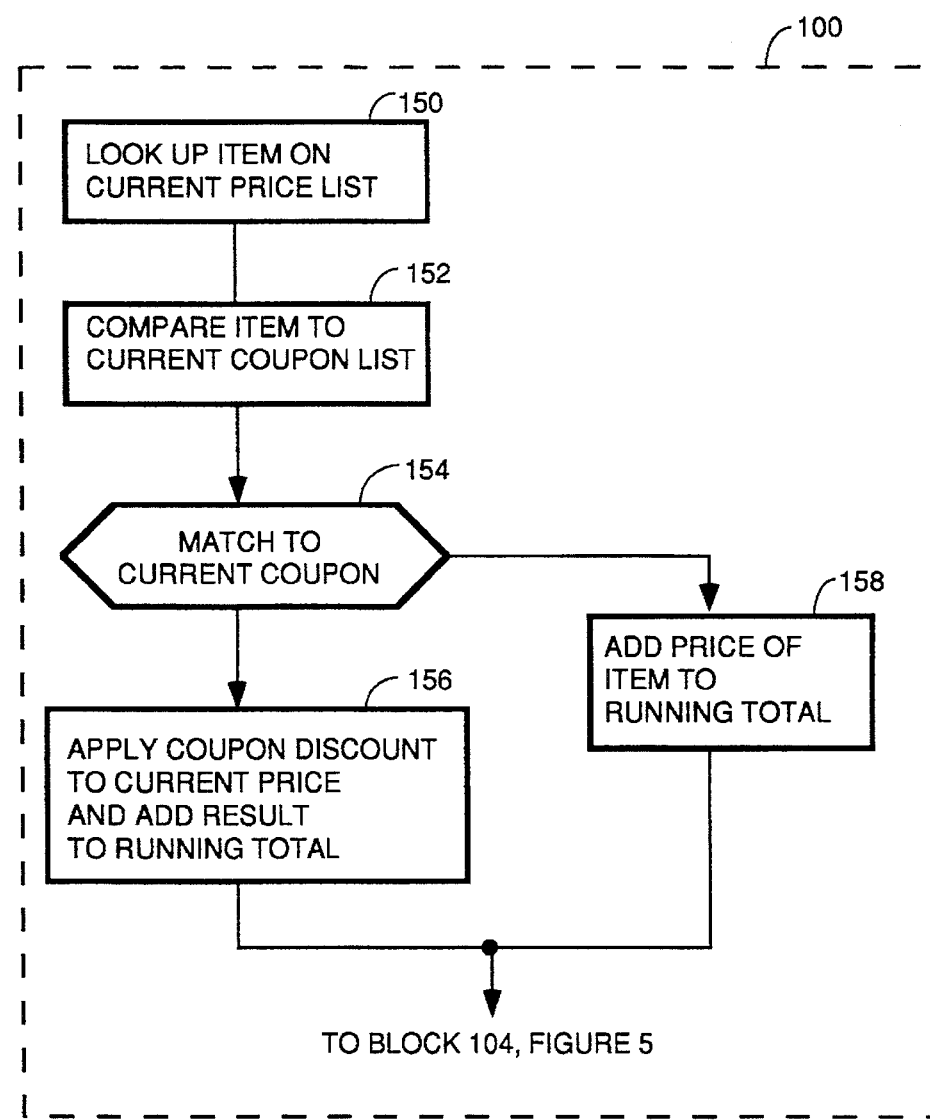
FIG. 9 is a flow chart of processing to automatically apply coupon discount items for any scanned item found on the current coupon list.

FIG. 9 represents the processing which occurs in place of blocks 100 and 102 in FIG. 5 in embodiments where automatic coupon accounting is employed. Block 150 represents the process of looking up the item scanned on the current price list. Next, the item scanned is compared to the current coupon list downloaded in block 140 as symbolized by block 152. Any match is detected in block 154. If there is a match, the coupon discount percentage or absolute amount is applied to the current price, and the result is added to the running total as symbolized by block 156. If there is no match to the coupon list, the current price of the item scanned is added to the running total as symbolized by block 158. After the processing of either block 158 or 156, processing control is passed to block 104 in FIG. 5.

Figure 10:
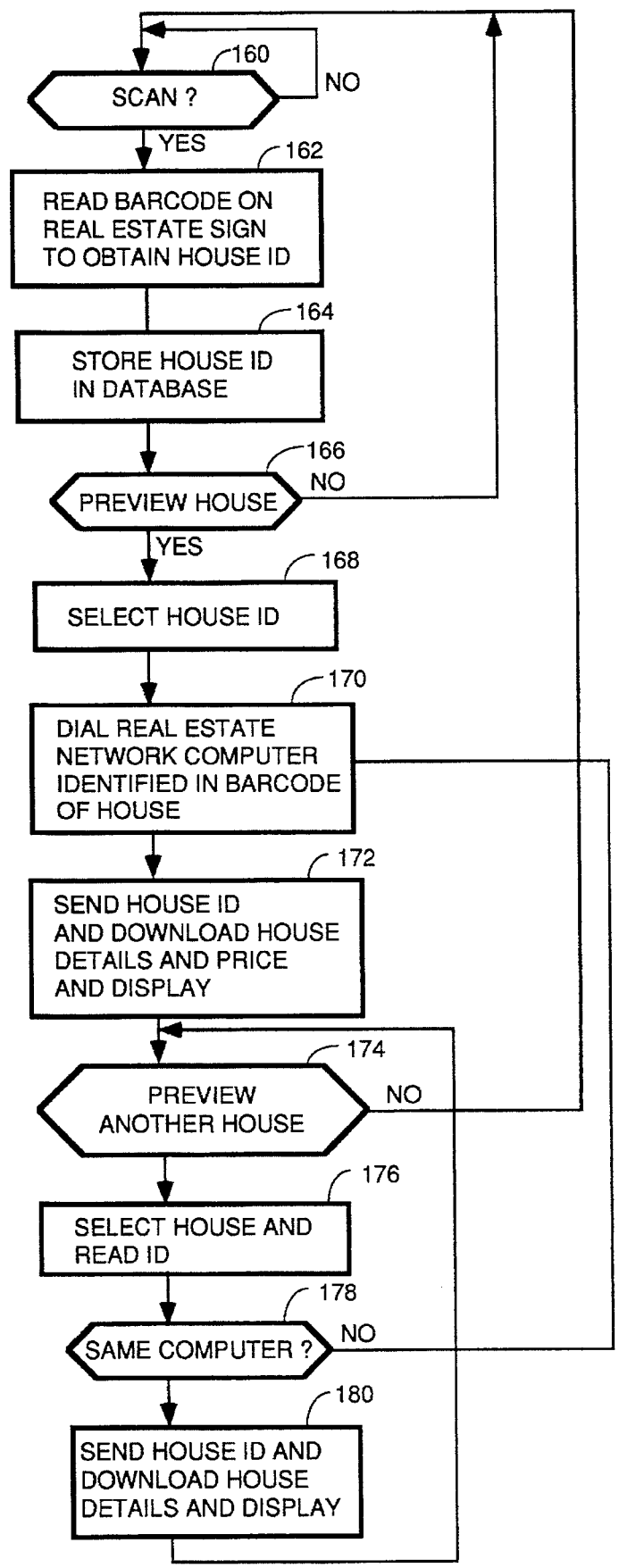
FIG. 10 is a flow chart representing processing to scan house bar codes and download house listing details after all candidate houses have been scanned.

Referring to FIG. 10, there is shown a flow chart for processing for an embodiment of a Personal Scanner™ device useful for shopping for real estate. In this embodiment, real estate signs would include bar codes that provide a house or property identification code and the area code and telephone of a computer in a real estate network which stores details about the listing. The user would be able to scan and store the bar coded information of properties in which he or she was interested in the neighborhoods of interest, and download the details about the property and review it before ever calling a real estate agent.

The process of FIG. 10 starts with the user placing the Personal Scanner™ within range of the bar code on a real estate sign and pressing the scan button (no processing to pick, display and modify a shopping list is present in this embodiment), as symbolized by block 160. The unit sits and idles until this happens. When the scan button is pushed, the bar code on the sign is read, decoded and the ASCII house ID and the telephone number of the pertinent computer are stored in a database in scratchpad, battery backed up RAM. This process is symbolized by blocks 162 and 164. The user is then queried in block 166 as to whether a house is to be previewed. If the user answers no, control is returned to the loop which waits for the scan button to be pushed. If the user answers yes, the list of all house ID's is displayed by the process symbolized by block 168, and the user can highlight one of them to preview by touching the particular ID on the touchscreen or with the lightpen. Preferably the house IDs are the street addresses of the house to help the user remember which house is which if multiple houses have been scanned.

The processing symbolized by block 170 represents the process of using an internal modem or an external modem coupled to the port 85 in FIG. 3 to dial the computer phone number associated with the house ID which has been highlighted and log on. The house ID is then passed to the computer in block 172, and the details of the house listing are downloaded such as square footage, number of bedrooms, fireplaces, amenities and price. These details are displayed, and in a separate area of the display, a query is displayed regarding whether the user wishes to preview another house, as symbolized by block 174. If the user answers no, control is passed back to block 160. If the user answers yes, the processing of block 176 is performed to redisplay the list of houses so as to allow the user to select another house. After the user selects another house, the ID is read and the Personal Scanner™ determines if the record for that house is stored on the same computer as the last house previewed as symbolized by block 178, if it is, the house ID is sent to the same computer to which the user has already logged on and the house record is downloaded and displayed as symbolized by block 180. If the house record is stored on a different computer, the Personal Scanner™ device hangs up and dials the computer associated with the highlighted house record as symbolized by the processing of block 170. Thereafter, processing is as previously described.

Figure 11:
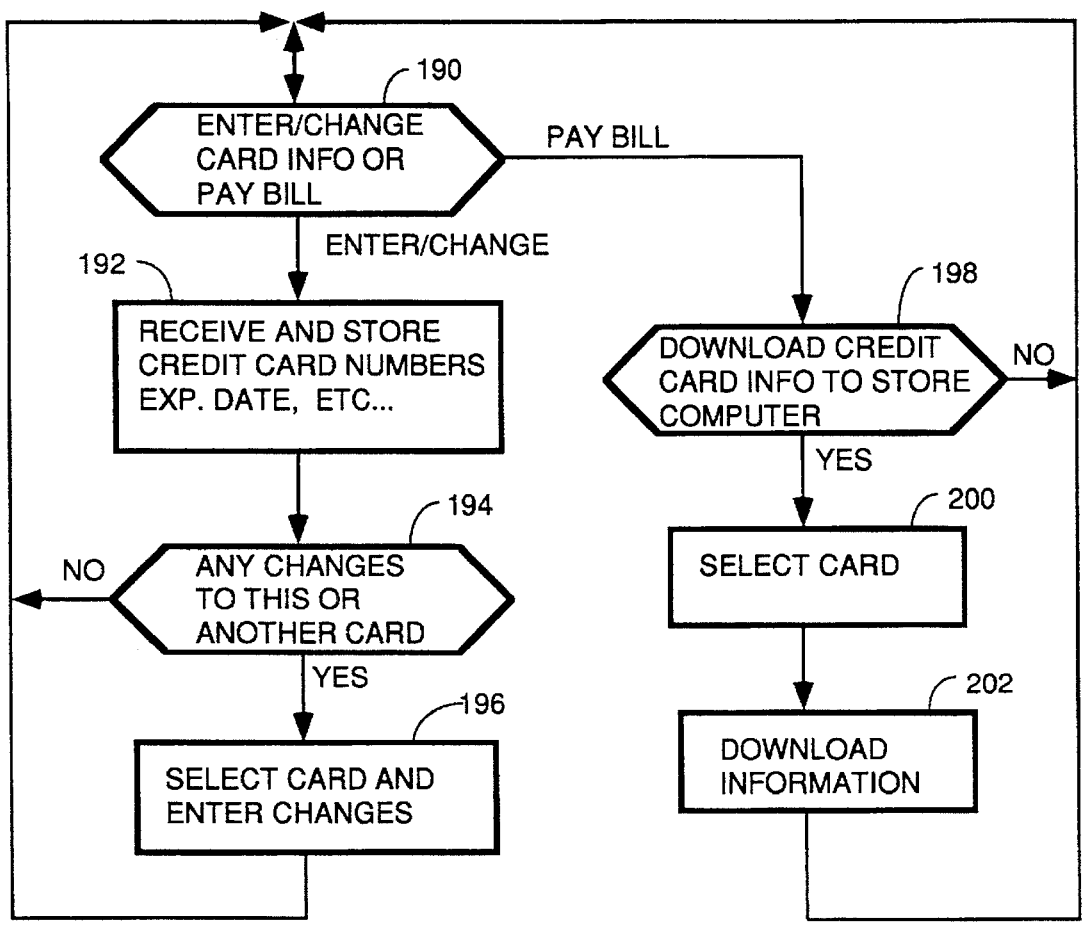
FIG. 11 is a flow chart representing processing to enter/change credit card information and download credit card information to a store computer for use in completing a purchase.

Referring to FIG. 11, there is shown a flow chart for processing to enter and change credit information and download credit card information to the store computer at the time a shopping order is to be paid. Block 190 represents the process of prompting the user to determine if the user wishes to enter credit card information for a new credit card or change information on an old credit card or specify a credit card with which to pay the bill. If the user answers that he or she wishes to enter a new credit card or change the data of a stored credit card, the processing of block 192 is performed. This block represents the process of receiving user input naming the credit card, giving the name shown on the face of the card, the card number and the expiration date. In some embodiments, the credit card information can be entered by "swiping" the credit card through a commercially available credit card reader 45 in FIG. 3 which reads the magnetic strip on the card and sends the data to the microprocessor 40. The details of these commercially available magnetic stripe readers are hereby incorporated by reference. After the credit card data is entered, the user is prompted for any changes to the card data just entered or any other card previously stored as symbolized by block 194. If the answer is no, processing returns to block 190. However, if the answer is yes, the processing of block 196 is performed to allow the user to select the card to be changed and receive the changes to the card data. Thereafter, processing returns to block 190.

If the user answers the query of block 190 that he or she wishes to pay the bill for the shopping which has been completed with a credit card, processing is vectored to block 198. There the user is queried whether he or she wishes to download credit card data to the store computer as represented by block 198. If the answer is no, processing returns to block 190. If the answer is yes, processing is vectored to block 200 which represents the process of displaying the list of stored credit cards to the user and receiving the user's selection as to which card is to be used. Thereafter, the card data is downloaded to the store computer, as symbolized by block 202.

Figure 12:
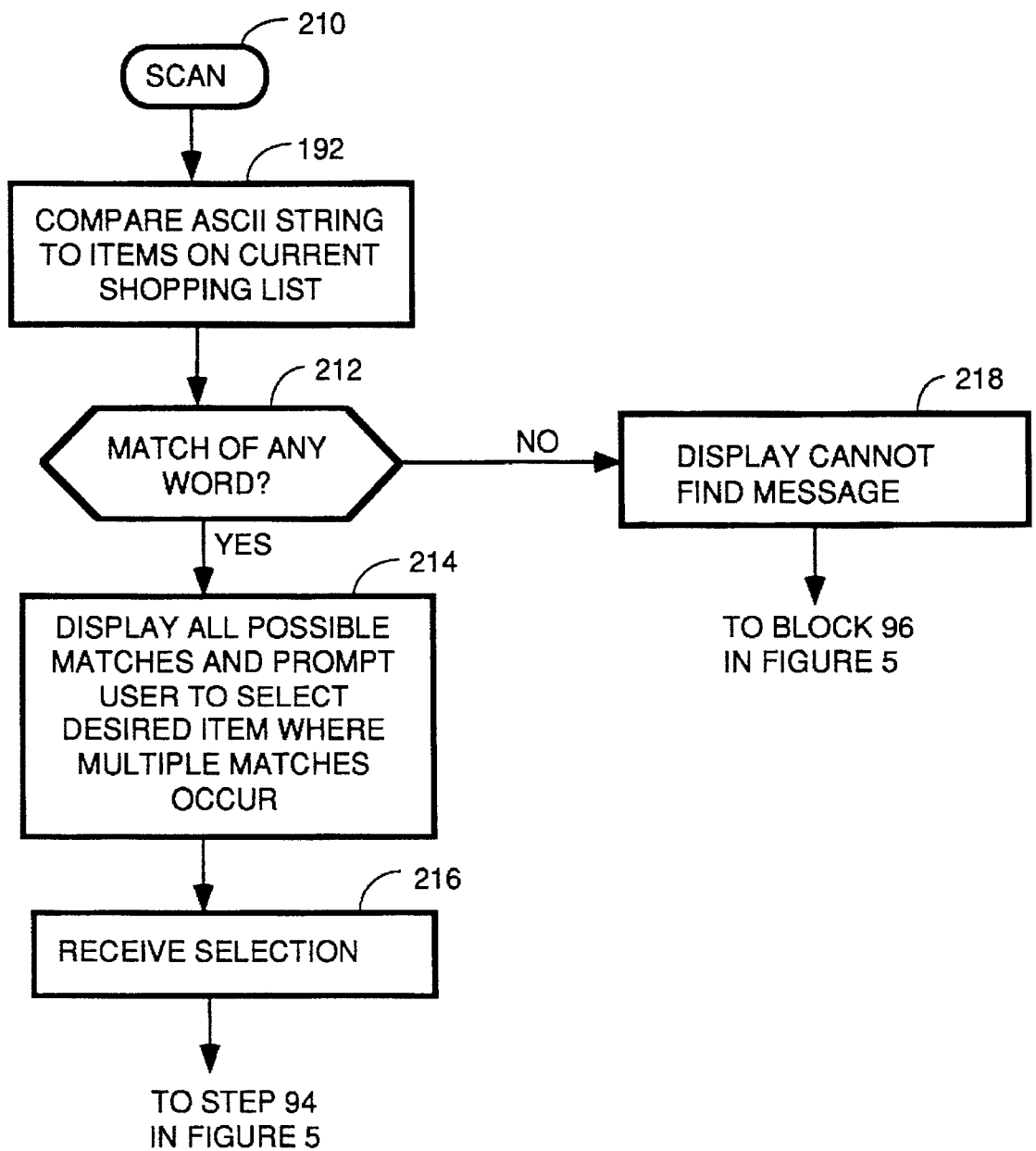
FIG. 12 is a flow chart of processing of fuzzy logic used for matching precise store descriptions mapped to scanned bar codes encoding product identifications with somewhat less precise descriptions of desired items on a user defined shopping list.

FIG. 12 represents the flow chart for match processing for comparing the ASCII string of a scanned item to the active shopping list and active price list. The problem solved by the processing of FIG. 12 is that shoppers may not use the same prose to describe the desired item to be added to a shopping list as exists in the store computer to describe the same item. For example, the user may enter only "peanut butter" on his or her shopping list whereas the store computer may have entered therein three entries for "Skippy brand, chunky style peanut butter", Skippy brand, creamy style peanut butter" and "Jiffy brand, chunk style peanut butter". Since there is not a complete overlap between what is scanned and what is on the shopping list, the Personal Scanner™ device software must use "fuzzy logic" to determine which item on the shopping list corresponds to the item scanned. In FIG. 12, this fuzzy logic is implemented by blocks 210, 212 and 214. The processing of FIG. 12 is an alternative process to that symbolized by block 92 in FIG. 5. The bar codes on products do not encode the entire description of the product. They only encode a product identifier which is mapped in the store computer to an ASCII string which describes the product in the manner seen by the user on his or her receipt. When the user downloads the price list, the ASCII string for each item available in the store is downloaded with its price and its bar code ID. Block 210 represents the process of mapping the bar code ID received from the scanner to the ASCII string describing the product downloaded from the store computer with the price list and comparing the words in the ASCII string describing the item scanned to the words describing the items on the currently selected shopping list. If there is a match between any word or words on the ASCII string to any word describing any item on the shopping list, the items from the shopping list having at least one matching word are marked for later display as symbolized by block 212. Block 214 represents the process of displaying all the items from the current shopping list having at least one matching word as a list of all possible matches, and prompting the user to select which item is the item just placed in the basket. Block 216 represents the process of receiving the user selection usually by sensing which item on the list of possible matches has been touched on the touch screen. Thereafter, processing is vectored to block 94 on FIG. 5. If no match was found in step 212, the processing of block 218 is performed to display a "not found" message. Thereafter processing is vectored to block 96 in FIG. 5.

Figure 13:
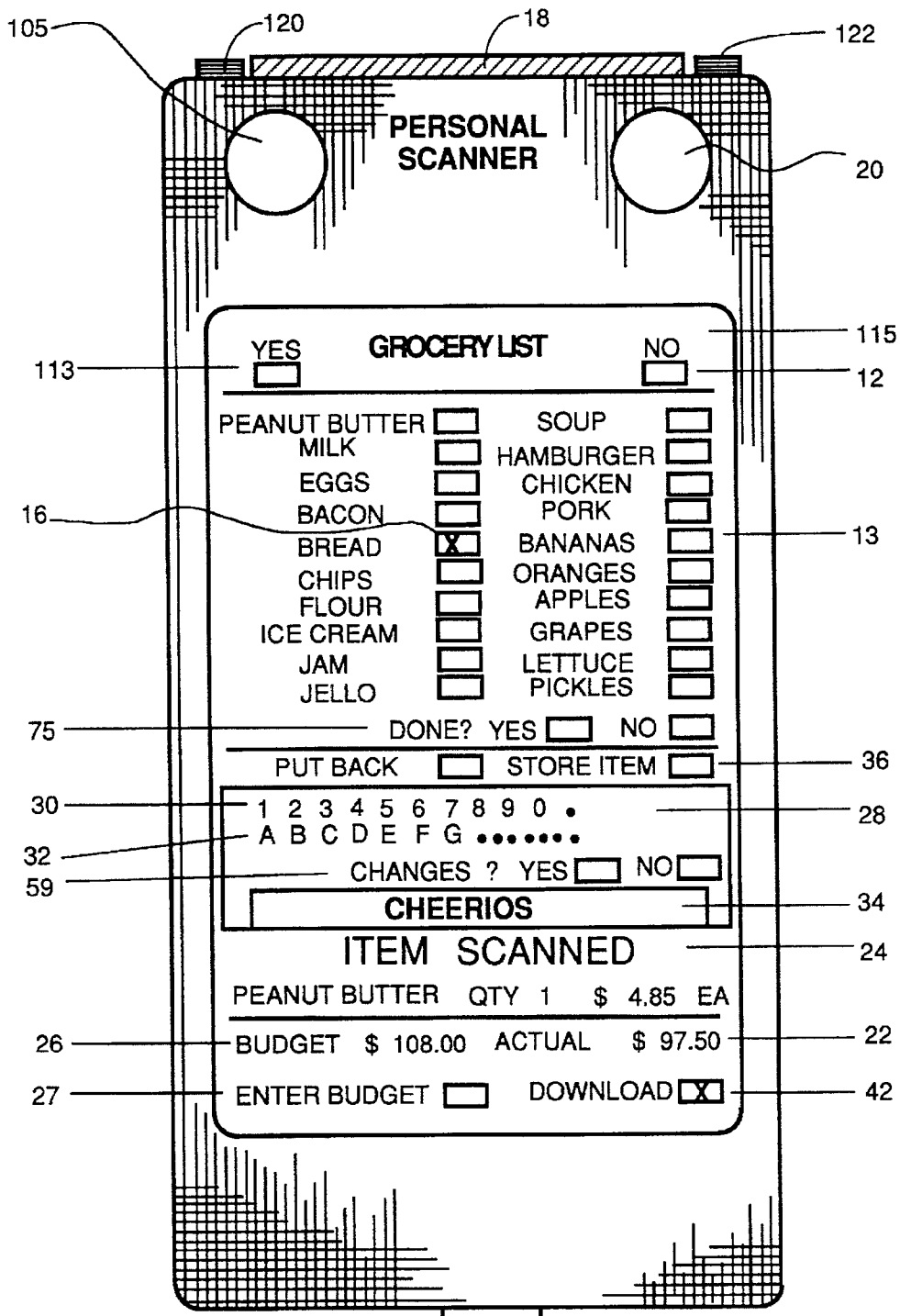
FIG. 13 is a top view of an embodiment of the Personal Scanner™ device using a touchscreen instead of a light pen for selection processes and user input.

FIG. 13 shows a plan view of an embodiment of the device using a touchscreen instead of the light pen 10 shown in FIG. 1. All other functionality is the same as for the embodiments described herein.

Figure 14:
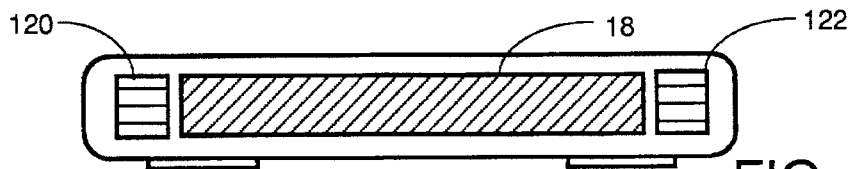
FIG. 14 is an end view of the embodiment shown in FIG. 13.

FIG. 14 is an end view of the embodiment shown in FIG. 13.

Figure 15:
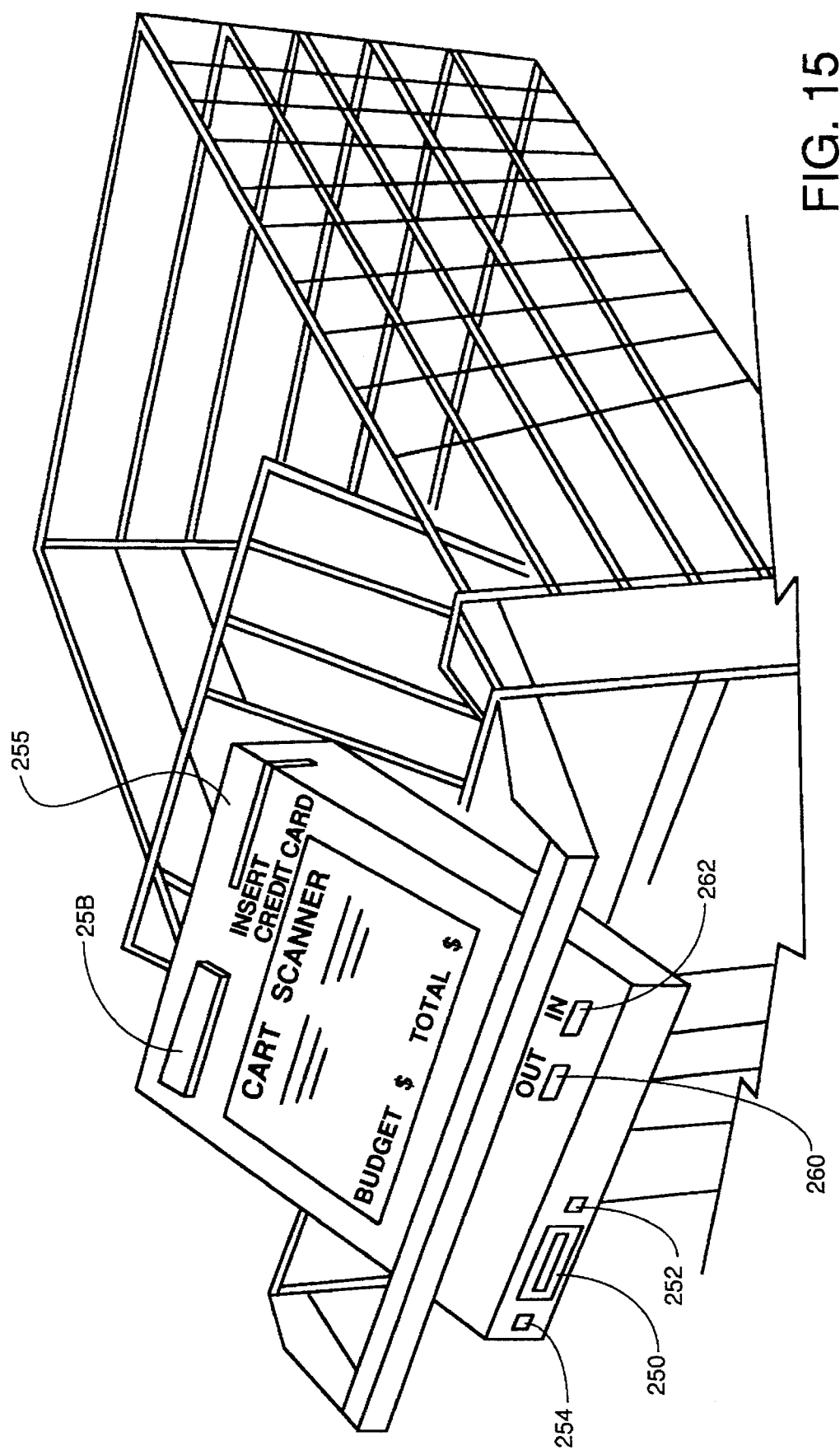
FIG. 15 is a perspective view of a version of the Personal Scanner™ device for use in permanent mounting on a shopping cart for users who do not own their own devices.

Referring to FIG. 15, there is shown a perspective view of a shopping cart mounted version of the Personal Scanner™ device. This embodiment is useful for users who do not own their own Personal Scanner™ devices. The embodiments shown in FIG. 15 uses a touchscreen for user input, but any other pointing device or other method of receiving user input would also suffice to practice the invention. The scanning window is shown at 250 and two D.C. electromagnets for deactivating security strips are shown at 254 and 252. A slot 256 for inserting a credit card into an integrated credit card reader 45 is shown although this is an optional feature and can be deleted in some embodiments. A scan button 258 is pushed by the user when an item has been placed in front of the scanning window for scanning. OUT and IN buttons 260 and 262 are used by the user to download scanned data to the store computer and to download the store price list and coupon list, respectively.

Figure 16:
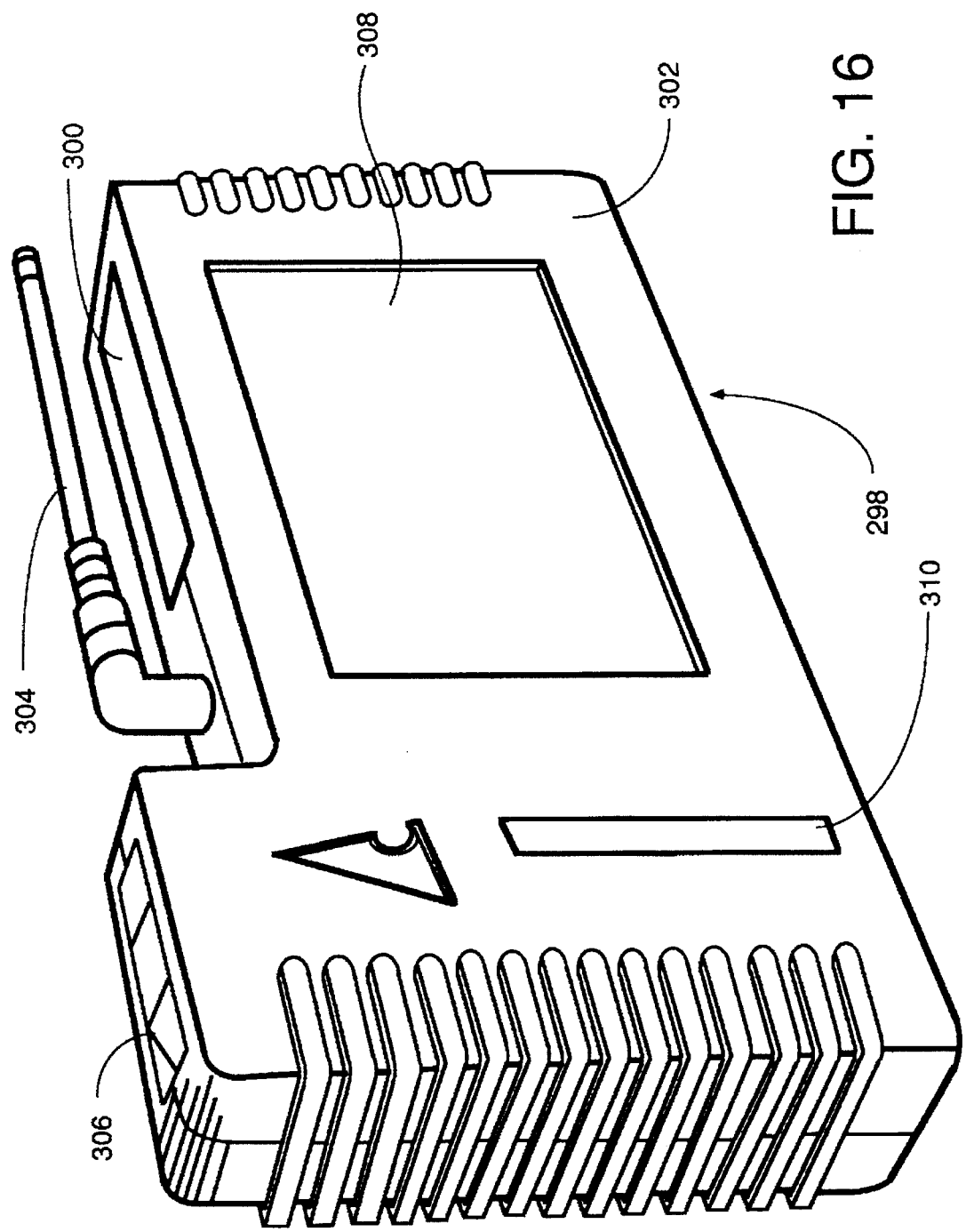
FIG. 16 is an overall perspective view of a commercial embodiment of a Personal Information Device (PID) according to the teachings of the invention.

Referring to FIG. 16, there is shown a perspective view of an alternative embodiment of a PID handheld computing device. The unit is capable of barcode scanning and has a PCMCIA card slot 300 compatible with PCMCIA Type I, II or III PC Cards (not shown). The PCMCIA slot also has built-in magnetic heads (not visible in FIG. 16) to read magnetic stripe cards and contacts (not visible in FIG. 16)to make contact with Smart Cards with physical contacts. The unit also has RF tag interrogation capabilities through a loop antenna embedded in the plastic of case 302. In alternative embodiments, the RF tag interrogation antenna could be an external antenna.

Antenna 304 is coupled to an RF module (not shown) which is used to download data to a host computer coupled to a local area network with an RF link or RF receiver with a digital interface to the host computer. The downloaded data can be scanned data from barcodes or data read from magnetic stripe cards, PC Cards or smart cards inserted into the PCMCIA slot. The antenna 304 can also be used to upload data from a local area network or RF transmitter coupled to a host computer.

The PID unit also includes a front panel button 255 which serves multiple purposes. One purpose is to wake the unit up from sleep or standby mode when the unit has been powered down. Another purpose is to trigger barcode scanning action or RF ID scanning action. Typically, the button 255 is connected to a switch which controls the logic state of an internal interrupt signal line to the microcomputer 320 in FIG. 19.

The PID unit 298 also includes a window 306 through which the PID unit receives light reflected from a barcode. In the preferred embodiment, the PID unit has a CCD barcode scan engine located behind the window 306. Such scan engines are available commercially from Scanquest in San Diego, Calif. In alternative embodiments, the barcode scan engine can also be a laser based barcode scanning engine available from Symbol Technologies of Bohemia, N.Y., PSC of Bohemia, N.Y. or TPS Electronics of Palo Alto, Calif. The details of these barcode scan engines of laser, CCD or other type barcode scan engines are hereby incorporated by reference. The scan engines include special purposed barcode decoder chips or programmed microprocessors that convert the spatial patterns of the barcode into alphanumeric characters from any common code set such as ASCII, EBCDIC etc.

In the preferred embodiment,the PID unit has a signature capturing display 308. This display consists of an LCD or other type underlying display to provide backlighting for a signature capture overlay. The overlay is a pair of conductive films in parallel which are energized at their corners. When a user writes a signature on the display, the pressure of the pen causes the two overlay films to short together at various points. The overlay films are divided into 1024× 1024 pixel arrays and have built in resistive properties. The various points where the films contact each other form resistive voltage dividers such that the x and y coordinates of each touch can be determined by analog to digital converters coupled to the films which read the unique voltages generated by the voltage dividers created by each touch. The overlay screen is available commercially from Touch Tech. of xxxxx, California. The digital data generated by the analog to digital converters is read by an interface circuit that includes a programmed microprocessor which converts each touch into a packet of five bytes of data which are then stored. As a signature is written, numerous sequential touches occur, each of which generates a five byte packet such that a unique stream of data is generated. This stream of data can be stored or downloaded via the RF link to a host computer. Since PC Cards are available to provide additional nonvolatile memory or even hard disk storage, the signature capture data and scanned barcode data can be stored locally within PID 298 for later downloading to a host computer via the RF link. The details of the overlay screen and the interface thereto are hereby incorporated by reference.

The PID unit also includes a built in printer 310 of which only the output slot is visible in FIG. 16. This printer is typically of the thermal printer variety such as are used in many of the handheld calculators or cradles therefor such as the print cradle for the TI 59 scientific calculator. In the preferred embodiment, the printer module is available commercially from Seiko-Epson in Japan as model number MTP201-G128B. This type printer draws very little current except when the paper is moved at which time it draws about 2–3 amps. The details of this printer are hereby incorporated by reference.

The PID unit 298 include rechargeable batteries (not shown) which may be nickel-cadmium, nickel-metal hydride, sealed lead acid, lithium-ion or possibly other battery technologies developed in the future. Typically, the battery pack will be detachable so that a new battery pack can be attached when the battery pack in use is discharged.

Figure 17:
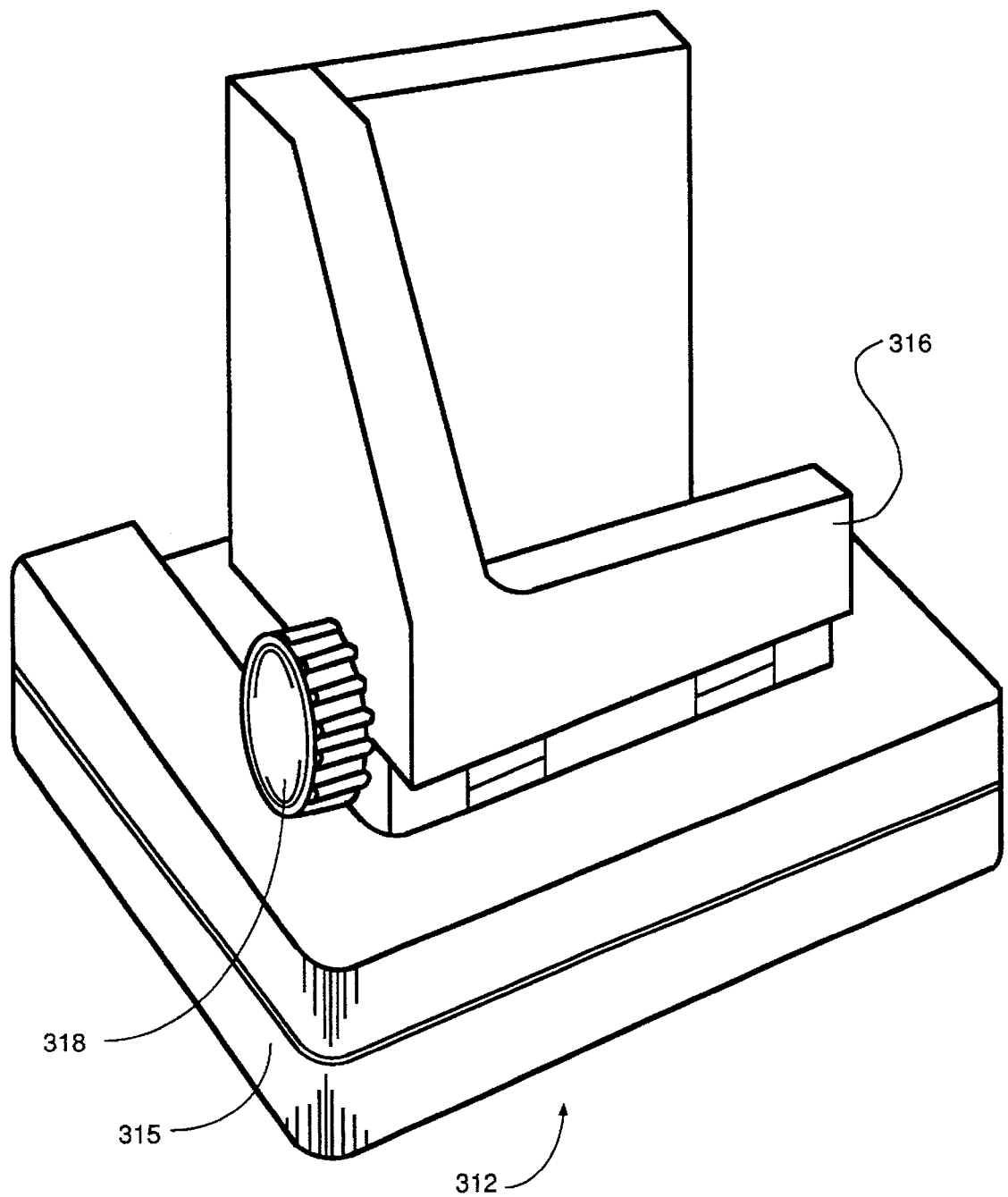
FIG. 17 is an overall perspective of a base unit for charging the Personal Information Device of FIG. 16 and for communicating data from the PID to a store host computer.
Figure 18:
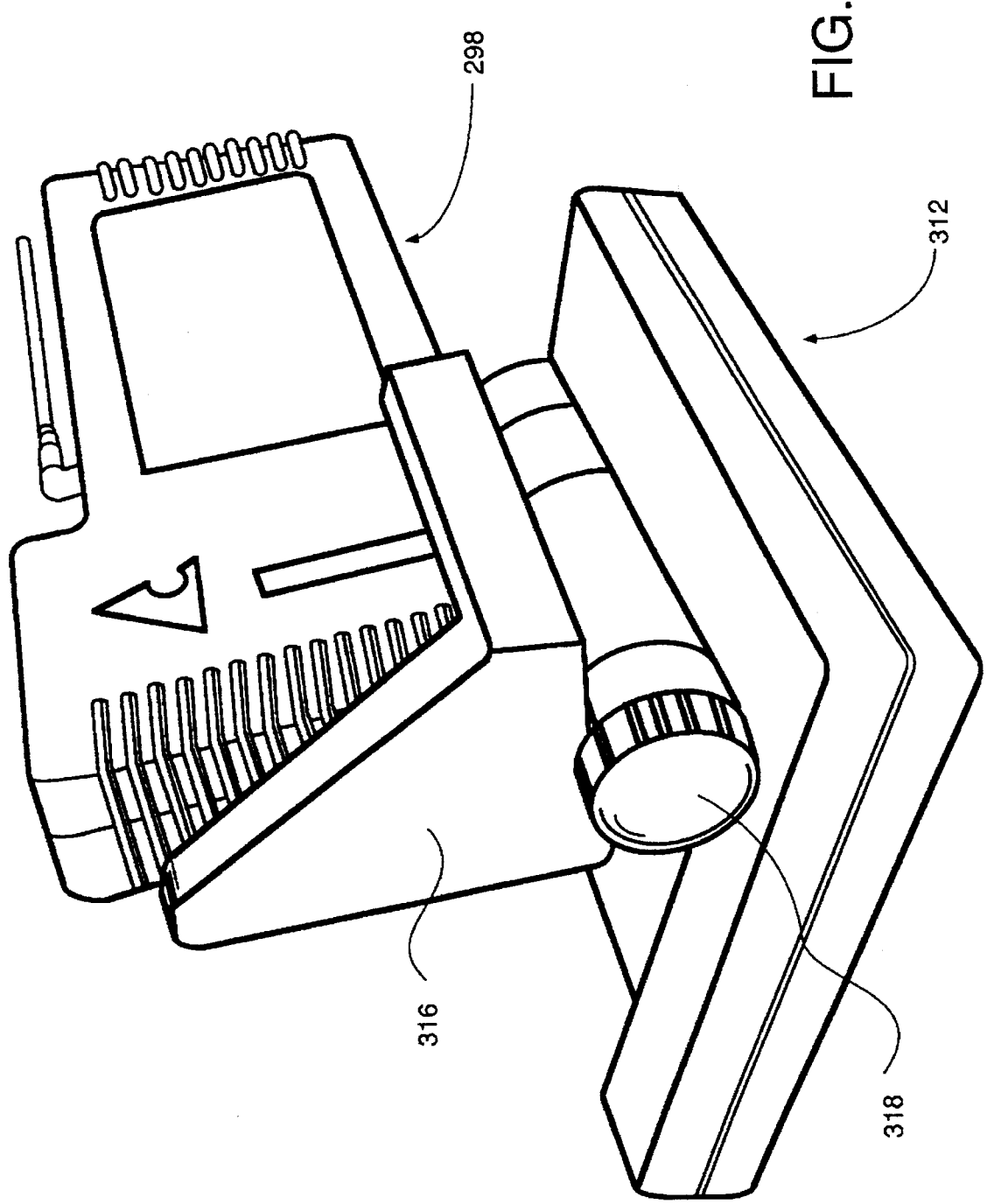
FIG. 18 is a perspective view of the PID as docked with the base unit for charging and communication with the host through the base unit.

FIG. 17 shows a charging stand/desktop unit (hereafter base unit) for use with the PID unit of FIG. 16. The base unit 312 comprises support unit 315 to which is mounted a rotatable charging mount 316. The charging mount 316 can rotate downward to a flat position as will be best understood by reference to FIG. 18. FIG. 18 shows the PID unit mounted for desktop operation in the base unit. The charging unit 316 is configured such that the removable battery pack does not have to be removed when the PID unit is placed in the charging unit. Electrical contacts on the removable battery unit mate with matching electrical contacts on the charging unit to charge the battery.

The charging unit can be rotated using knob 318 to a horizontal orientation such that the barcode scanning window 306 is oriented to read barcodes which are passed by the window within about 20 inches thereof.

The base unit includes its own RF module and RF antenna (not shown) which are used to download data to a host computer or upload data from the host. The base unit can also include a hardwired interface card to a local area network.

Data transfer between the PID unit and the base unit can be by a set of electrical contacts defining mating connectors of a bus, but, in the preferred embodiment, data is transferred between the PID unit and the base unit by way of infrared beams. The PID unit has an infrared window in the back surface (not visible in FIG. 16) behind which is an infrared transceiver module connected to a microprocessor within the PID. An infrared window in the charging unit 316 has an infrared transceiver mounted behind it and is located so as to be in line of sight of the infrared window in the PID unit so as to be able to bidirectionally communicate using infrared beams.

Figure 19:
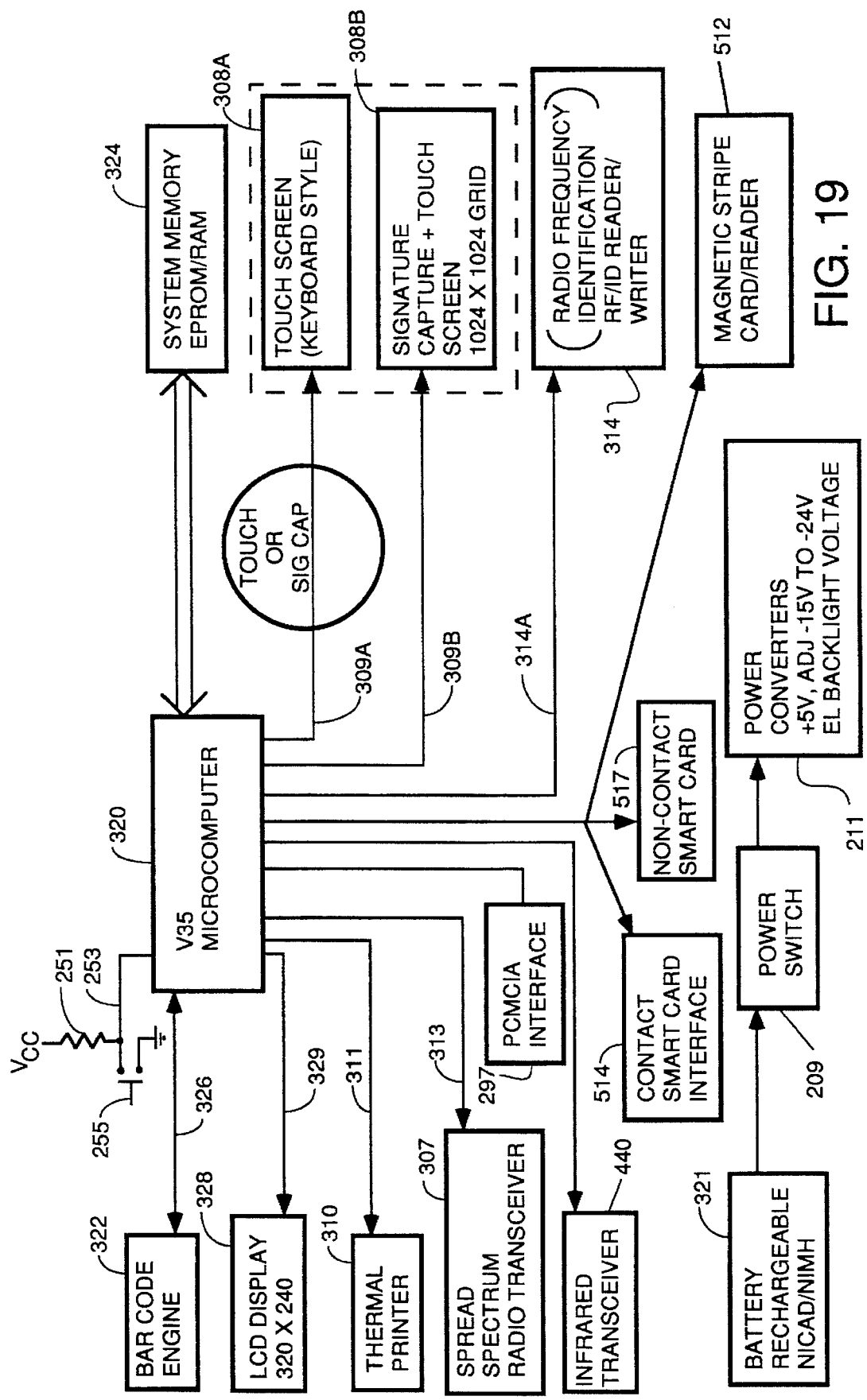
FIG. 19 is a block diagram of the electronics of the PID embodiment of FIG. 16.

FIG. 19 is a block diagram of the circuitry of an alternative embodiment that is housed in the enclosure detailed in FIG. 16. This embodiment utilizes a V35 microcomputer 320 which communicates with and coordinates a plurality of peripherals. Power is provided by a rechargeable battery pack 319 comprised of nickel cadmium or nickel metal hydride batteries. A power switch 209 selectively connects the batteries to a set of power converters 211 which convert the single DC battery voltage to +5 volts, an adjustable −15 volts to −24 volts and a voltage suitable for backlighting the touchscreen display.

The microcomputer 320 can be awakened from sleep state by an interrupt signal on line 253 which is normally held at logic 1 by Vcc applied thereto through pullup resistor 251. Switch 255, which is typically of a momentary contact type, grounds line 253 dragging it to a logic 0 state when the microcomputer is to be awakened.

Barcodes are scanned by a CCD barcode scan engine 322 which is commercially available from Scanquest in San Diego, Calif. The preferred barcode scan engine uses a row of LED's which line a border of the scan engine window. A user places the barcode to be scanned in front of the scan engine window within 20 inches thereof and give a scan signal. The scan signal can be entered by touching a particular portion of the touchscreen, pressing a switch on the PID unit etc. When the scan signal is given, the LED's are sequentially energized to illuminate the barcode in a pseudoscan. The reflected light is imaged by a two dimensional CCD array and the resulting image is processed by image processing circuitry in the scan engine. The particular scan engine selected has image processing circuitry which is capable of decoding either one dimensional barcodes or the new two-dimensional barcodes developed by UPS and outputting alphanumeric characters. In alternative embodiments, any barcode scan engine of laser, CCD or other varieties which are either decoded or undecoded and which can scan one dimensional barcodes may be used. In undecoded scan engine embodiments, a commercially available barcode decoder chip such as the HP2310 series available from Hewlett Packard of Palo Alto, Calif. is coupled to receive the output signal of the barcode scan engine. The decoder chip then decodes the output signal from the scan engine and outputs the ASCII characters encoded in the barcode to the microcomputer 320 via data path 326. If a barcode scan engine which is undecoded is used, microprocessor 320 executes known barcode decoding algorithms such as those used in Telxon or Symbol Technologies portable barcode readers to generate a plurality of alphanumeric characters. These characters are stored in system memory 324. In the case of barcode scan engines that do the decoding and output alphanumeric characters, microprocessor 320 retrieves the decoded characters via bidirectional bus 326 and stores them in system memory 324 for later downloading to a host computer via the RF link to the host or for local use by some application in execution on the PID unit.

The microcomputer 320 communicates with the user through a liquid crystal display 328 which is overlayed with a touchscreen 308. The liquid crystal display is any conventional LCD such as are used on any laptop computer except scaled to a suitable size. Preferably, an LCD display model G321EX5B00X, commercially available from Seiko Instruments sales division located in Torrance, Calif. is used. Characters and graphics to be displayed are communicated to the LCD display 328 via bus 329. Two different types of touchscreens designated 308A and 308B are shown in FIG. 19 to signify alternative embodiments. Touchscreen 308A is a keyboard type which is available commercially from Seiko Instrument located in Torrance, Calif. A keyboard type touchscreen has two insulating films with two dimensional array of locations having matching conductive regions formed on each film such that when the user touches any particular array location, the two conductive regions on the insulating films touch thereby closing a switch. The conductive regions are coupled to edges of the array by a plurality of conductive traces across the surface of the film. The array of switches thus forms a "keyboard" where characters and punctuation can be "typed" by touching various areas on the screen with a finger, pencil etc.

Touchscreen 308B is the signature capture type touchscreen which is commercially available from Inforite Corporation of San Mateo, Calif. This type touchscreen has its own microprocessor and scanning circuitry and has a much higher resolution, typically 1024×1024. This type of touchscreen starts a continuous scanning of its grid of switches when signature capture mode is turned on so that the pattern of switch closures that occurs when a user writes a cursive signature on the touchscreen can be recorded. An analog-to-digital converter reads analog voltages caused by successive switch closures and generates multiple 5 byte packets. These packets of data from signature capture are sent to microcomputer 320 via bus 309B. If touchscreen 308A is used, keyboard codes from touchscreen 308A are sent to the microcomputer via bus 309A.

Figure 43:
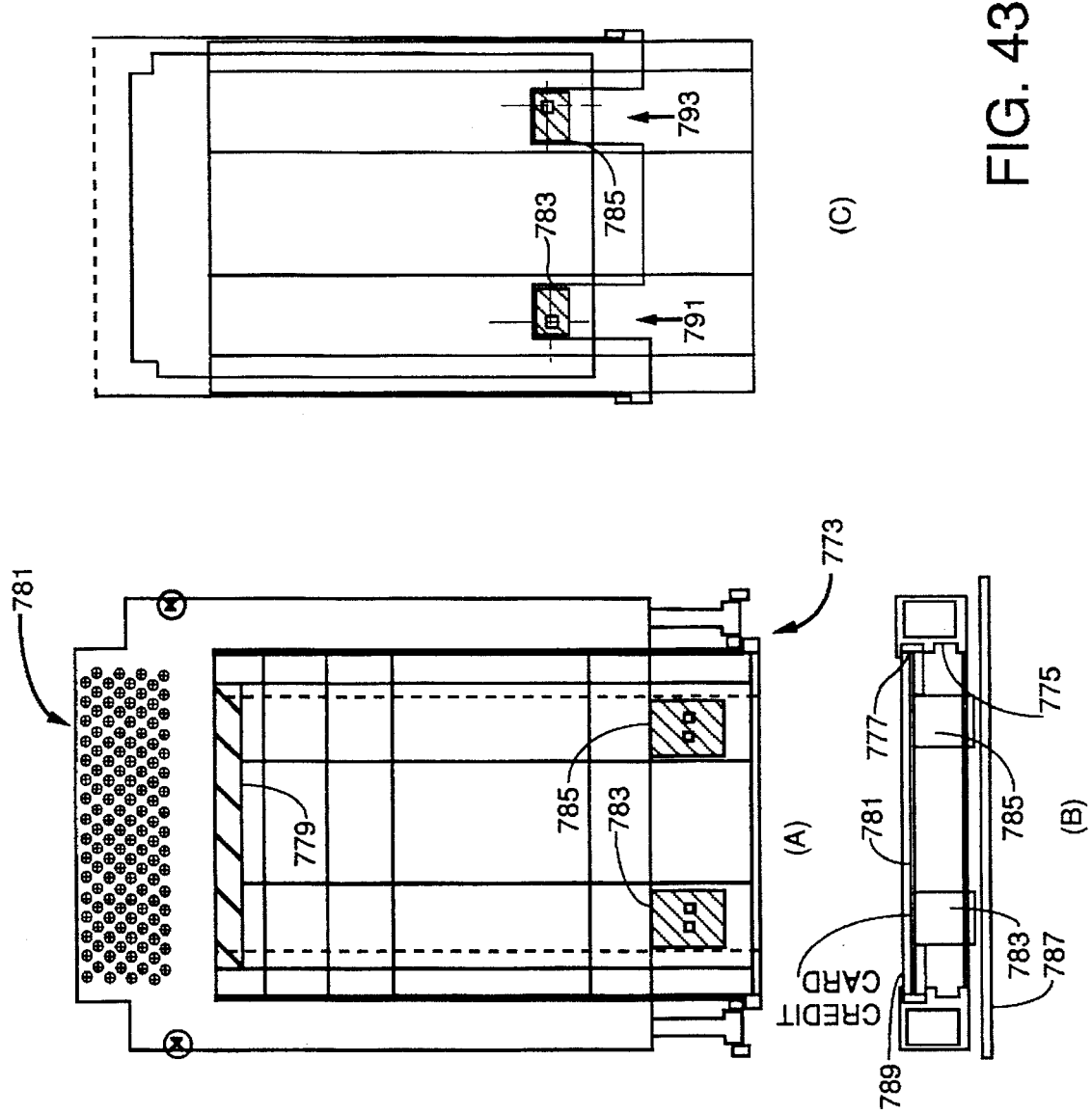
FIG. 43 is a diagram of a PCMCIA/credit card/smart card receiver apparatus for use in the PID according to the invention.

The microcomputer 320 is also coupled to a PCMCIA interface 297 of conventional design. This interface is coupled to the PCMCIA bus contacts 779 in FIG. 43 and reads and writes PCMCIA cards. Many handheld computers today have PCMCIA slots and PCMCIA interface hardware and software to implement a PCMCIA interface in accordance with the specifications of the PCMCIA Industry Association standards group, including but not limited to the PC card Standard Release 2.01, Socket Services Specification Release 2.0, Card Services Specification Release 2.0, ATA Specification Release 1.01, AIMS Specification Release 1.0 and the Recommended Extensions Release 1.0, all of which are incorporated by reference herein. Numerous types of PCMCIA cards exist such as modems, external memories, hard disk drives, LAN interfaces, RF transceiver etc, and a list of them and the identies and locations of their manufacturers is published by the PCMCIA Industry Association. The list and the details of all the commercially available PCMCIA cards is hereby incorporated by reference.

The microcomputer 320 can also create permanent records of transactions, generate receipt, print coupons etc. through use of the thermal printer 310 discussed previously. Data to be printed and control commands are sent to the printer via bus 311.

The microcomputer 320 communicates with other host computers via an RF link implemented by spread spectrum radio transceiver 307. This transceiver receives characters to be transmitted from microcomputer 320 via bus 313, the characters having been retrieved from system memory 324. The RF transceiver is available commercially from Proxim, Inc. located in Mountain View, Calif. as model number xxx. The RF transceiver acts like a modem in modulating digital data onto and RF carrier as audio tones. An alternative RF transceiver would provide voice communication. Such a transceiver is available commercially from Wireless Logic, Inc. of San Jose, Calif. as their "900 MHz SPREAD SPECTRUM RF TRANSCEIVER MODULE" and utilizes WLT9009 speed spectrum signal processor integrated circuit to send either digital data or voice or both to a receiving station. In such an embodiment, the PID would typically have either a built in microphone and speaker or a headset jack for use with a headset/microphone arrangement like pilots use for two way voice communication with an operator at a receiving station. Typical applications would be use on a factory floor taking inventory of parts located in various places in the factory by scanning barcodes or RF ID tags with voice notes to a second operator located remotely indicating where in the factory various parts are located.

Figure 25:
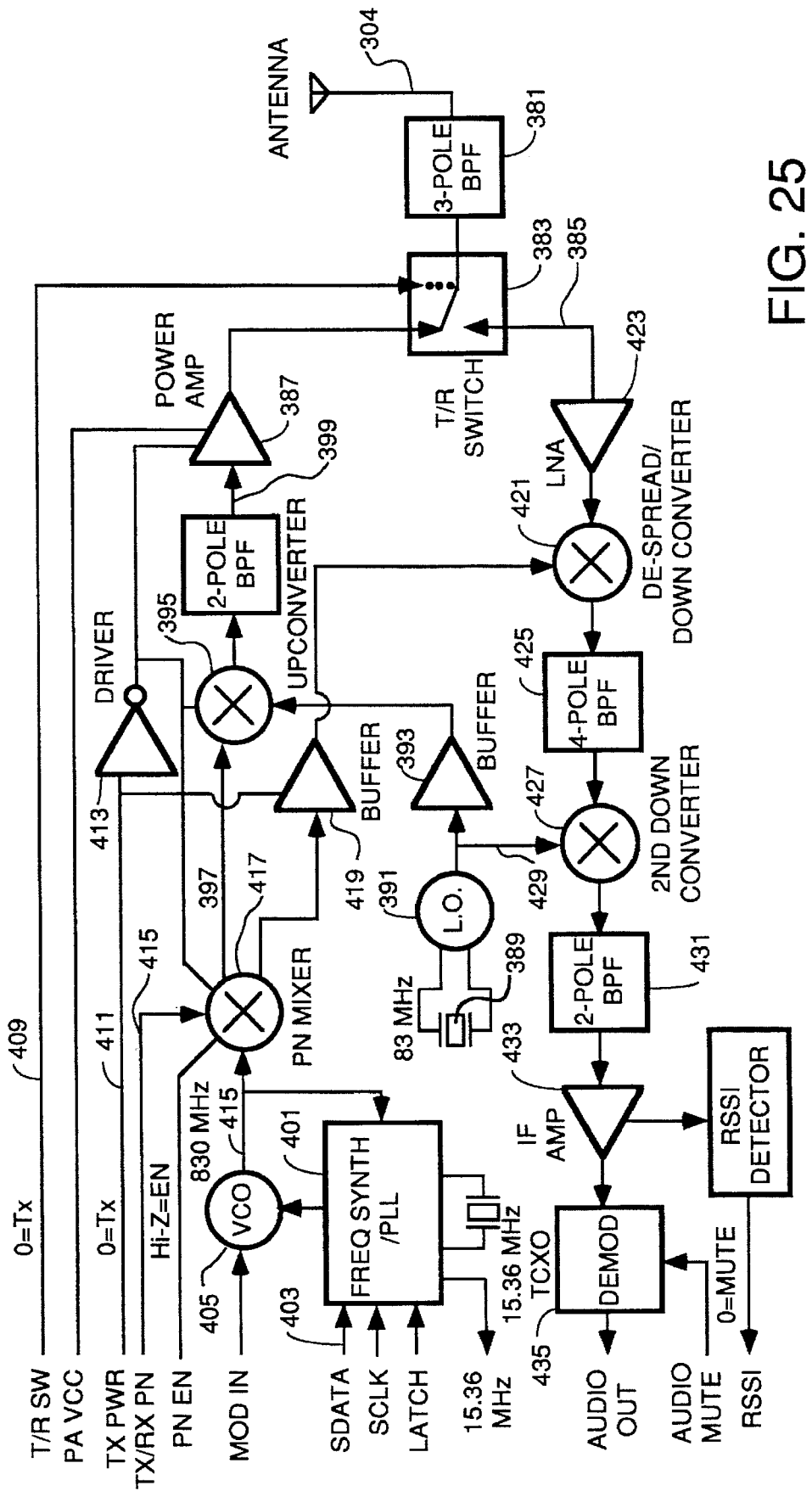
FIG. 25 is a block diagram of the spread spectrum transceiver used in the PID to communicate directly with the host computer.

A block diagram of the Wireless Logic spread spectrum transceiver is shown in FIG. 25. In alternative embodiments, a digital data only, or both digital and voice non-spread spectrum RF transceiver may be substituted for the digital and voice data spread spectrum RF transceiver disclosed in FIG. 25. The preferred transceiver of FIG. 25 uses a 3 pole bandpass filter 381 coupled to antenna 304 (elements have the same reference numbers used in previous figures generally have the same function and structure unless a duplication of a reference number has inadvertently occurred). A transmit/receive switch 383 couples the banpass filter and antenna either to the receive path 385 or the output 387 of the power amplifier output stage of the transmitter. A crystal 389 controls the frequency of a local oscillator 391 which drives a buffer 393 which provides a step up frequency of about 83 MHz for use by an up-converter mixer stage 395. The other signal to the up converter on path 397 changes in frequency around a base frequency of 830 MHz in accordance with the spread spectrum diversity scheme thereby causing the output frequency on path 399 to hop from one frequency to another at the input of the power amplifier 387. The frequency diversity scheme is implemented by a frequency synthesizer/phase lock loop which generates a frequency in accordance with digital SDATA on bus 403. Modulation of this output frequency from the frequency synthesizer is provided by a voltage controlled oscillator 405 which changes its frequency in accordance with a modulation signal on path 407. The output of the VCO on path 415 is input to a mixer 417 which mixes the signal with a transmit/receive polynomial signal on path 415. The transmit/receive polynomial signal on path 415 is a sequence of frequencies or digital data that controls frequency generation in the mixer for mixing with the signal on path 415 to implement the spread spectrum frequency hopping. The signal on path 415 is generated by the WLT9009 spread spectrum signal processor under control of a microprocessor (both not shown). In this case, the microprocessor is the host microcomputer 320 in FIG. 19.

Control of the position of the transmit/receive switch is provided by a signal on path, and transmit power control is provided by a signal on path 411 and a driver 413 which is coupled to the mixer 417, a buffer 419 and mixer 395. Buffer 419 serves to supply an output signal of the mixer 417 to a de-spread/down converter 421 in the receiver path which receives amplified signals from the antenna from an amplifier 423. The output of the down converter 421 is filtered in a 4-pole bandpass filter 425 which feeds a second down converter 427. The down converter 427 mixes the filtered signal with a sample of the signal generated b the local oscillator 391 on path 429. The output of the second down converter 427 is filtered by a 2-pole bandpass filter 431 and amplified by an IF amplifier for demodulation by demodulator into audio signals.

Figure 20:
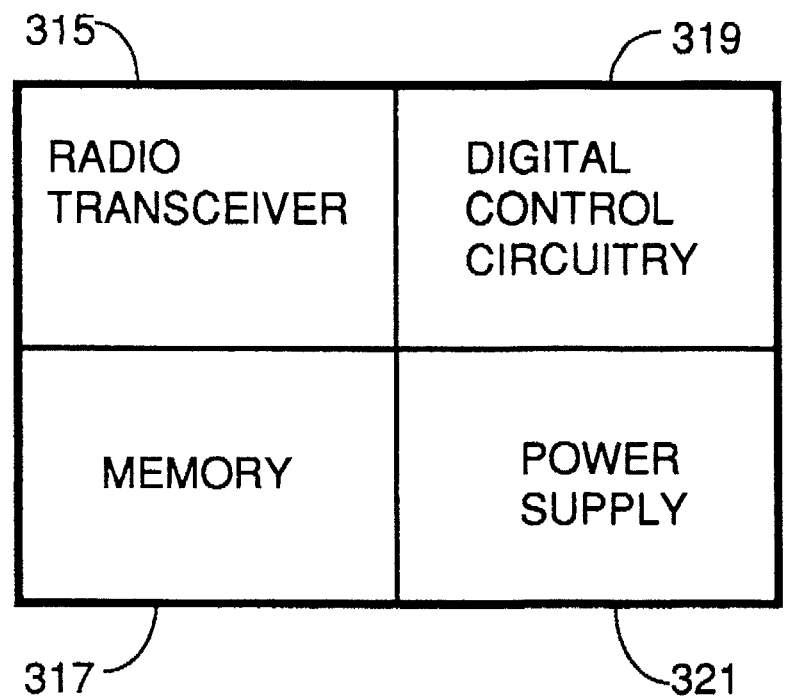
FIG. 20 is a block diagram of the basic sections of an RF ID tag.
Figure 44:
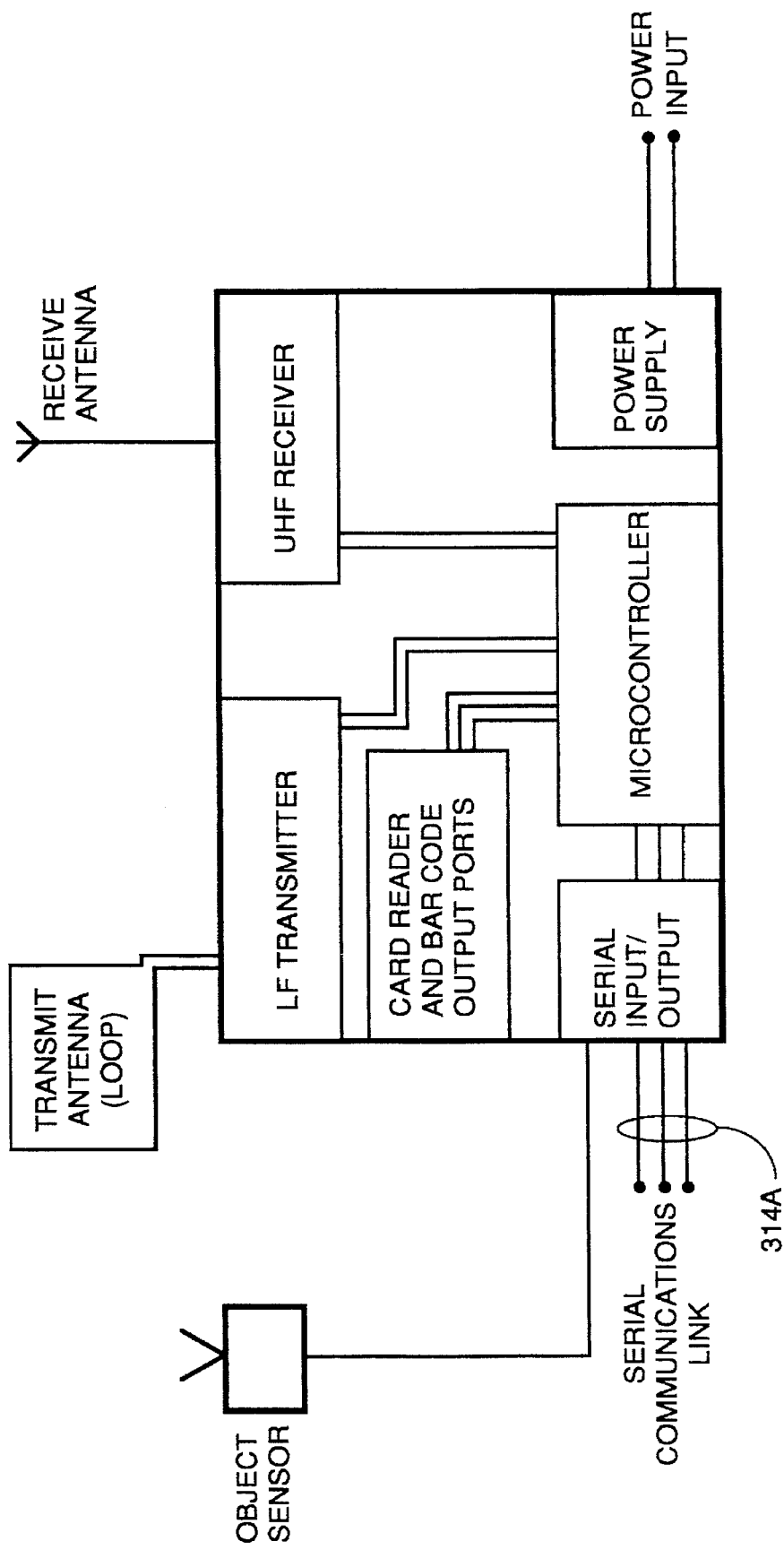
FIG. 44 is a block diagram of a typical circuit that may be used for the RF ID tag reader 314 in FIG. 19.

As an alternative to reading barcodes, the PID unit may also gather information from items to be scanned by use of radio frequency identification tags or transponders on items to be "scanned" and an RF ID tag reader/writer 314. FIG. 20 shows a block diagram of a typical RF ID tag or transponder circuit. Such RF ID tag systems are commercially available from Disys Inc. in Toronto, Canada as their 90 Series RF ID tags and from Hughes ID Corporation in Mission Viejo, Calif. Dysis publishes a "90 Series RF/ID System Applications Manual for CRM-90 Readers and 90 Series Tags, the details of which are hereby incorporated by reference. RF ID tag reader/writer circuits suitable for use as interface 314 in FIG. 19 are also commercially available from these two sources. RF ID tags are also currently commercially available from Atmel Corporation of Colorado Springs, Colo. and Eurosil, a Division of Daimler Benz located in Munich. Reader/writer systems are also available from Indala, a division of Motorola located in San Jose, and as two integrated circuit sets (one transceiver and one digital section) are commercially available from another division of Daimler Benz called AEG Telefunken. The details of these commercially available RF ID tags and RF ID tag readers are hereby incorporated by reference. A block diagram of a typical circuit that may be used for the RF ID tag reader 314 is shown in FIG. 44.

Today, low frequency RF ID tags operate at a frequency which is such that the size of the coil of wire needed for an antenna is too large to be integrated on an integrated circuit. Higher frequency tags currently under development will have antennas which are small enough to allow the entire RF ID tag to be integrated on a single integrated circuit die. Further, current RF ID tags can only be read by readers which have been configured to be compatible with the tag such that the reader understands the tags instruction set, data format and command syntax.

An RF ID tag is a small circuit which includes a radio transceiver 315 which is powered by power derived from rectification of incoming RF signals, the process of deriving suitable power from the incoming RF being performed by power supply section 321. The RF ID tag also has on-board nonvolatile memory 317 for storing data such as an identifier code which identifies the type of goods that the tag is attached to and a serial number identifying the particular tag. The memory is nonvolatile and may be both written and read by RF communication to the chip in the preferred embodiment, but in alternative embodiments, the memory may be fixed and unalterable such as ROM or even hardwired connections. Typically, the nonvolatile memory is of the ROM, EEPROM or anti-fuse variety. Several U.S. patents naming inventor Bruce Rosener and assigned to Unisys Corporation and Instant Circuit exist describing the structure of nonvolatile antifuze memory in an RF ID tag with no independent power source. These patents are U.S. Pat. Nos. 4,442,507 5,296,722 5,407,851, 4,796,074 and 5,095,362. The details of these patents are hereby incorporated by reference.

The RF ID tag also includes digital control circuitry which controls switching of the antenna connection, whether the tag is sending or receiving, and reading and writing the memory section. Typical instruction sets for the more sophisticated RF ID tags currently available include commands to Read Word n, Write Word n, Read Delayed and Turn Off such that the RF ID tag does not respond to interrogations.

The function of the RF ID tag is to receive an excitation signal from the reader 314, modify it in some way which is indicative of data identifying the particular tag that did the modification thereby identifying the particular item to which the tag is attached, then transmitted back to the reader. In the absence of stimulus from the reader, the tag is dormant and will not transmit data of its own volition.

Typically, the low frequency RF ID tags are very small and are affixed to a substrate upon which a coiled conductive trace serving as an antenna is formed by integrated circuit or printed circuit technology. The digital control circuitry also keeps the tag "locked" so that it cannot alter data in the memory or read and transmit data from the memory until the digital circuitry detects reception of the unlock sequence. The RF ID reader/writer unit 314 knows the unlock sequence for the RF ID tags to be unlocked for interrogation or writing data thereto, and transmits that sequence plus interrogation or other commands to the RF ID tags via a separate RF antenna embedded in the casing of the PID. The RF ID reader/writer unit 314 sends any received characters returned in response to the interrogation to the microcomputer 320 for storage in system memory 324 and possible later downloading to a host computer that may be doing, for example, invoice printing, inventory control etc.

The RF ID reader/writer 314 has the same architecture as the RF ID tag except that it includes an interface circuit to the microcomputer 320 and a power supply circuit. The interface circuit can be as simple as a straightforward bus interface or it could be an infrared link, a local area network link, and RF link or a PCMCIA interface.

Figure 21:
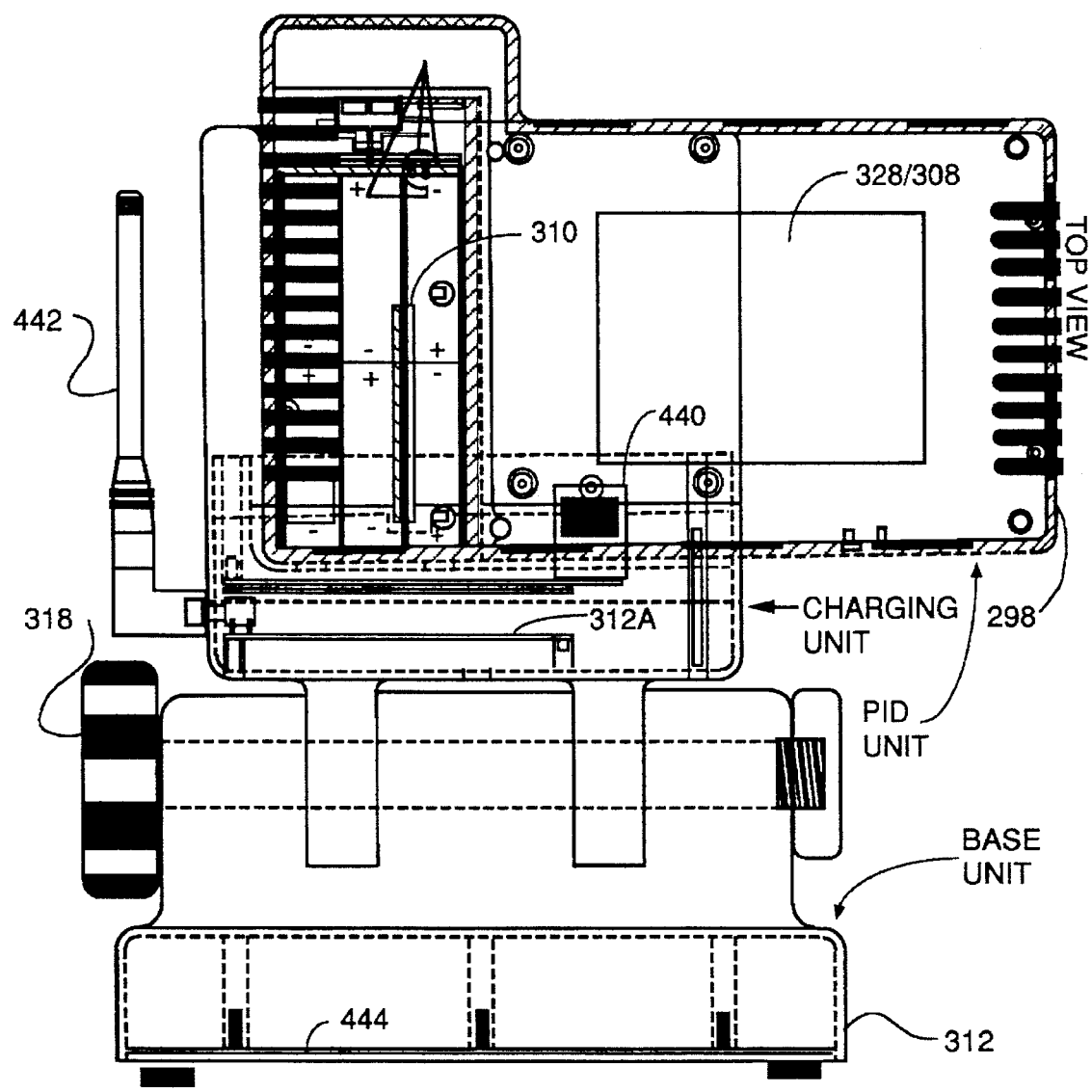
FIG. 21 is a diagram of the relative positions of the infrared transceiver in the charging unit and PID.

Data communication between the PID unit's microcomputer 320 and the charging unit 312 is through an infrared transceiver located in the PID unit symbolized by block 440 and a matching transceiver located in the charging unit. The preferred configuration of this arrangement can be best seen in FIG. 21 which is a frontal "see through" view of the PID unit mounted in the charging unit. The infrared transceiver 440 is seen as a rectangular module in the lower part of the PID unit which overlap a similar rectangular module in the charging stand. The base unit has its own RF transceiver module 312A mounted on a printed circuit board in the charging unit 316 and driving antenna 442. Printed circuit board 444 mounted in the bottom of base unit 312 is a charging unit controller to monitor the charge state of the rechargeable battery in the PID unit and to prevent overcharging.

Figure 22:
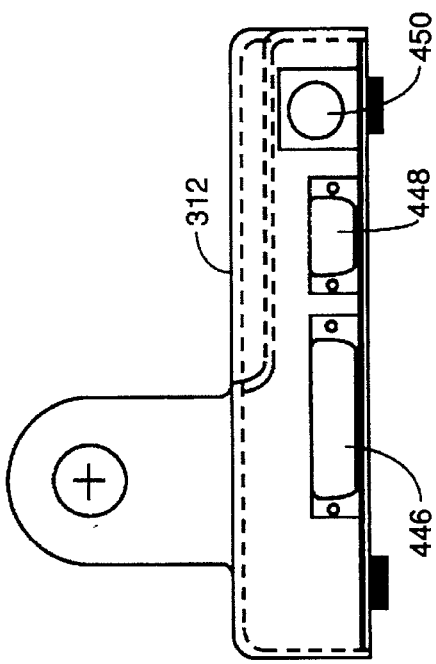
FIGS. 22 and 23 are side view diagrams of the base unit.

The base unit can turn the PID into a hard wired terminal for a host computer as can best be seen from FIG. 22 which is a side view of the base unit showing a parallel port 446, a serial port 448 and a keyboard port 450. The parallel and serial ports can be used to output data from the PID to the host computer or to input data from the host to the PID. Keyboard port 450 allows a standalone keyboard to be attached to the base unit for converting the combined unit into a point of sale type terminal where some information is scanned into the system by barcode scanning or RF ID tag interrogation and other data is entered by the keyboard. The portion of the base unit which docks with the PID can also pivot to change the angle of viewing of the touchscreen of the PID. Knob 318, when turned, changes the angle of view.

Figure 23:
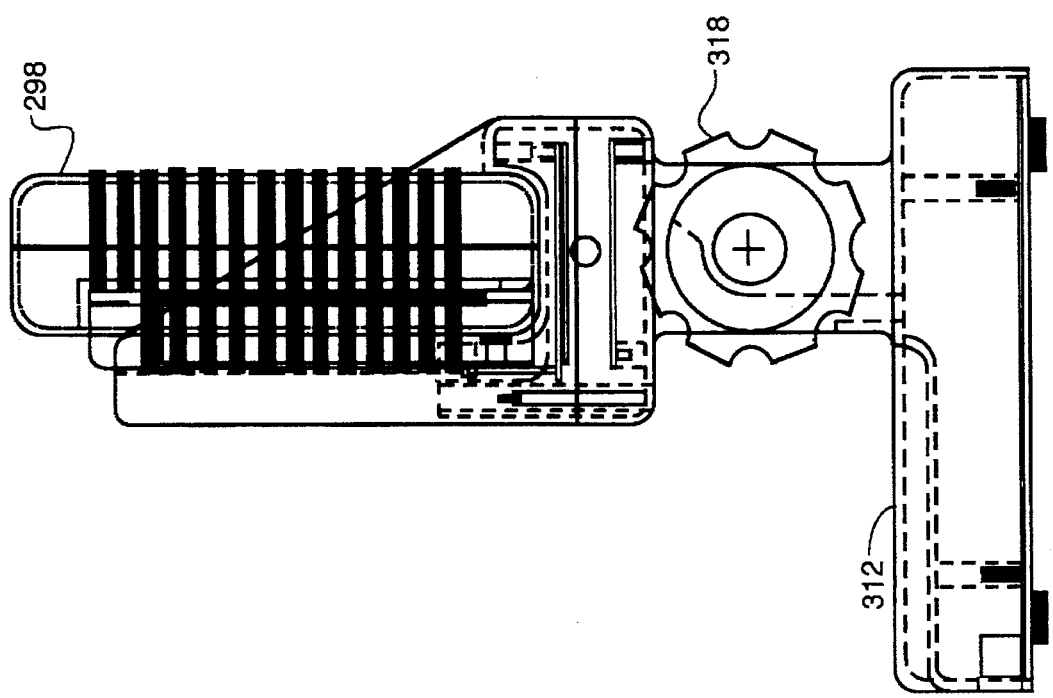

FIG. 23 is another side view of the PID unit as mounted in the base unit 312.

Returning to the consideration of FIG. 19, the infrared transceiver 440 is preferably a HSDL-1000 infrared module available commercially from Hewlett-Packard of Santa Clara, Calif., the details of which are incorporated by reference. In alternative embodiments, other infrared transceiver could also be used. The Hewlett-Packard infrared transceiver have a 1 cm to 1 meter operating range with a 30° viewing angle and a 2.4 KBd to 115.2 KBd data rate and has low power consumption and is Infrared Data Association compatible. The transceiver uses a high speed, high efficiency TS AlGaAs 875 nm LED, a PIN silicon photodiode and an integrated circuit to drive the LED and read data from the photodiode. The integrated circuit also includes amplifiers and a quantizer. The module interfaces with selected I/O chips which incorporate logic which performs pulse-width modulation/demodulation.

Figure 24:
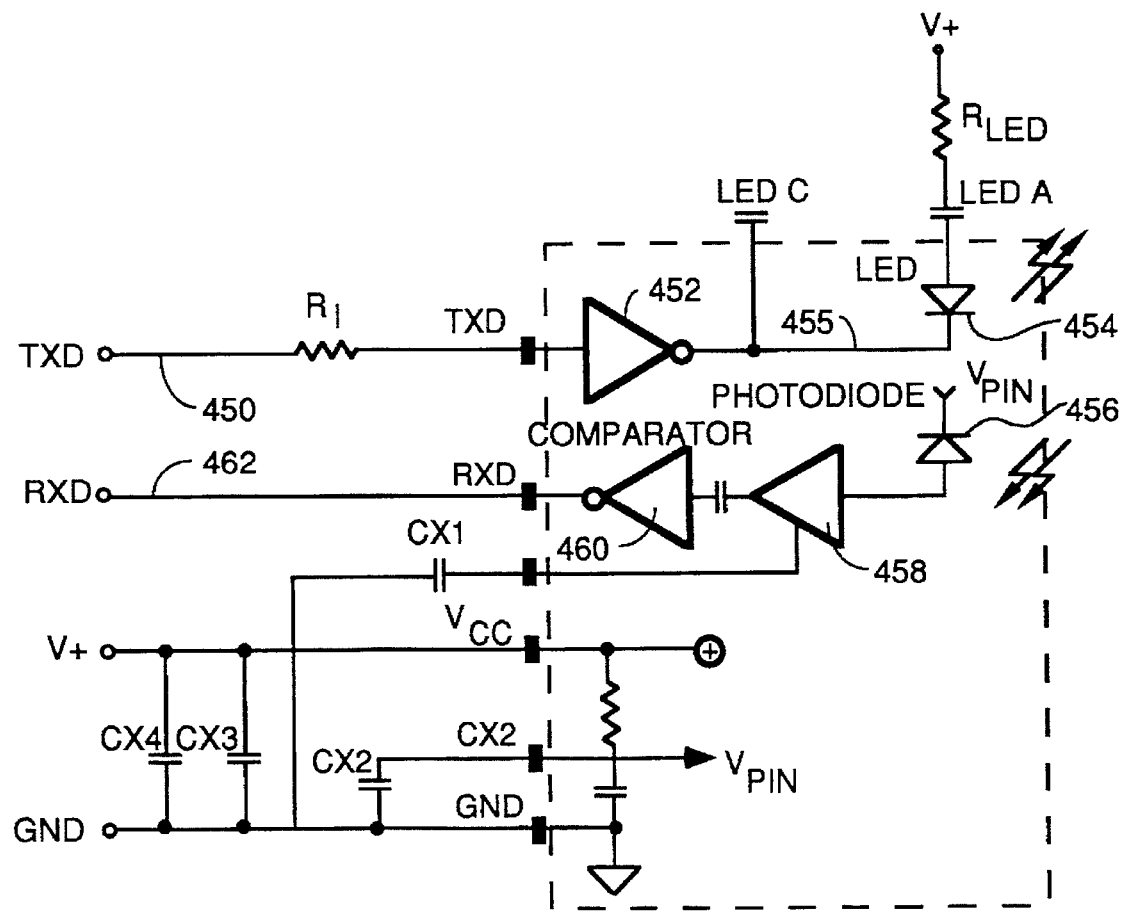
FIG. 24 is a block diagram of the infrared transceiver circuitry for communication of data between the PID and the base unit.

FIG. 24 is a schematic diagram of the HP infrared transceiver such as might be used for block 440 in FIG. 19. Transmit data enters on line 450 and is buffered by amplifier/driver 452. The output of driver 452 is active low and is connected to the cathode of the LED 454. The anode of the LED is coupled to the positive voltage supply through a current limiting resistor. When the driver output line 455 is driven low, the driver sinks current through the LED and a pulse width modulated light pulse is emitted.

The PIN photodiode 456 receives incoming light pulses and converts them to electrical pulses which are amplified by amplifier 458. The output of amplifier 458 is compared to a reference level by comparator 460 which has its output coupled to the receive data line 462.

Figure 26A:
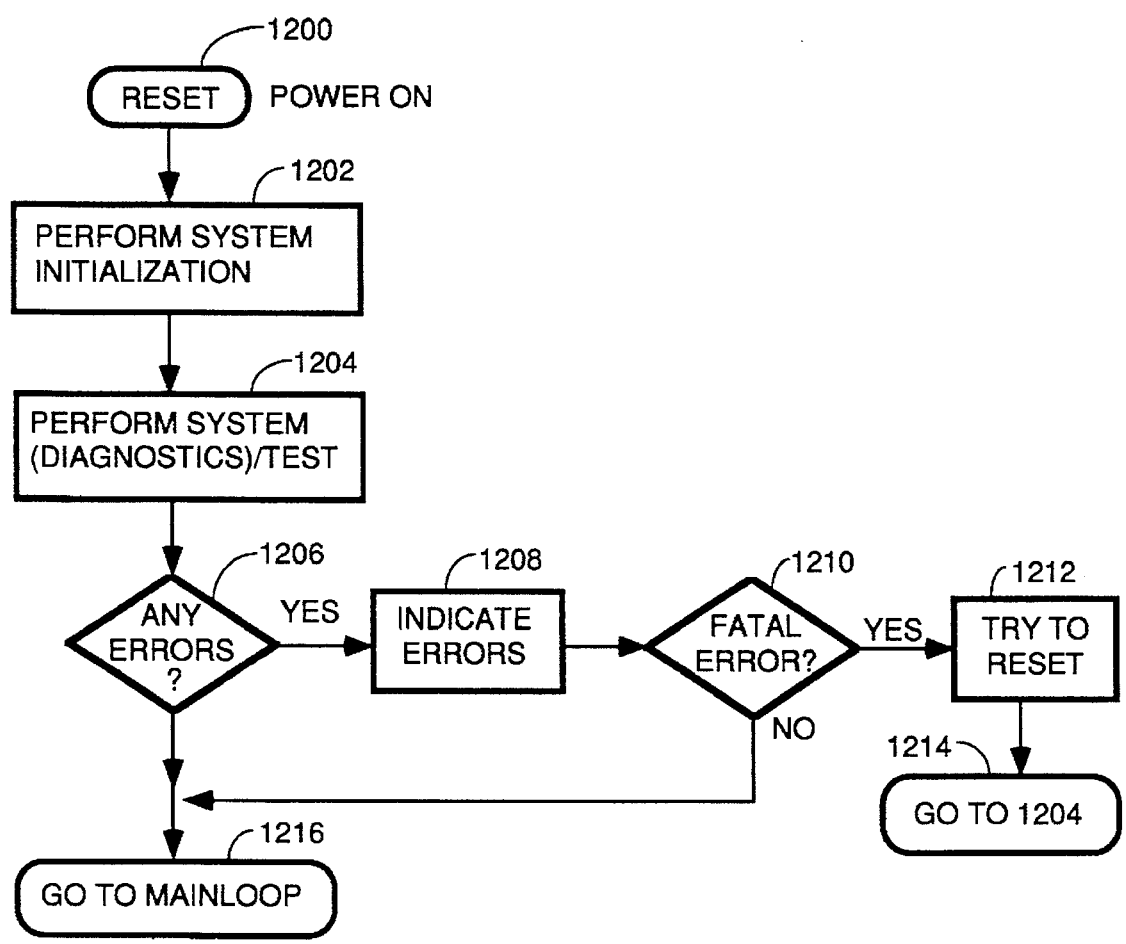
FIG. 26, comprised of FIGS. 26A, 26 B1, 26 B2, 26C–26P is a flow chart of the processing of the operating system program that coordinates activities by the microcomputer in controlling and communicating the other elements of the portable information gathering device.
Figure 26C:
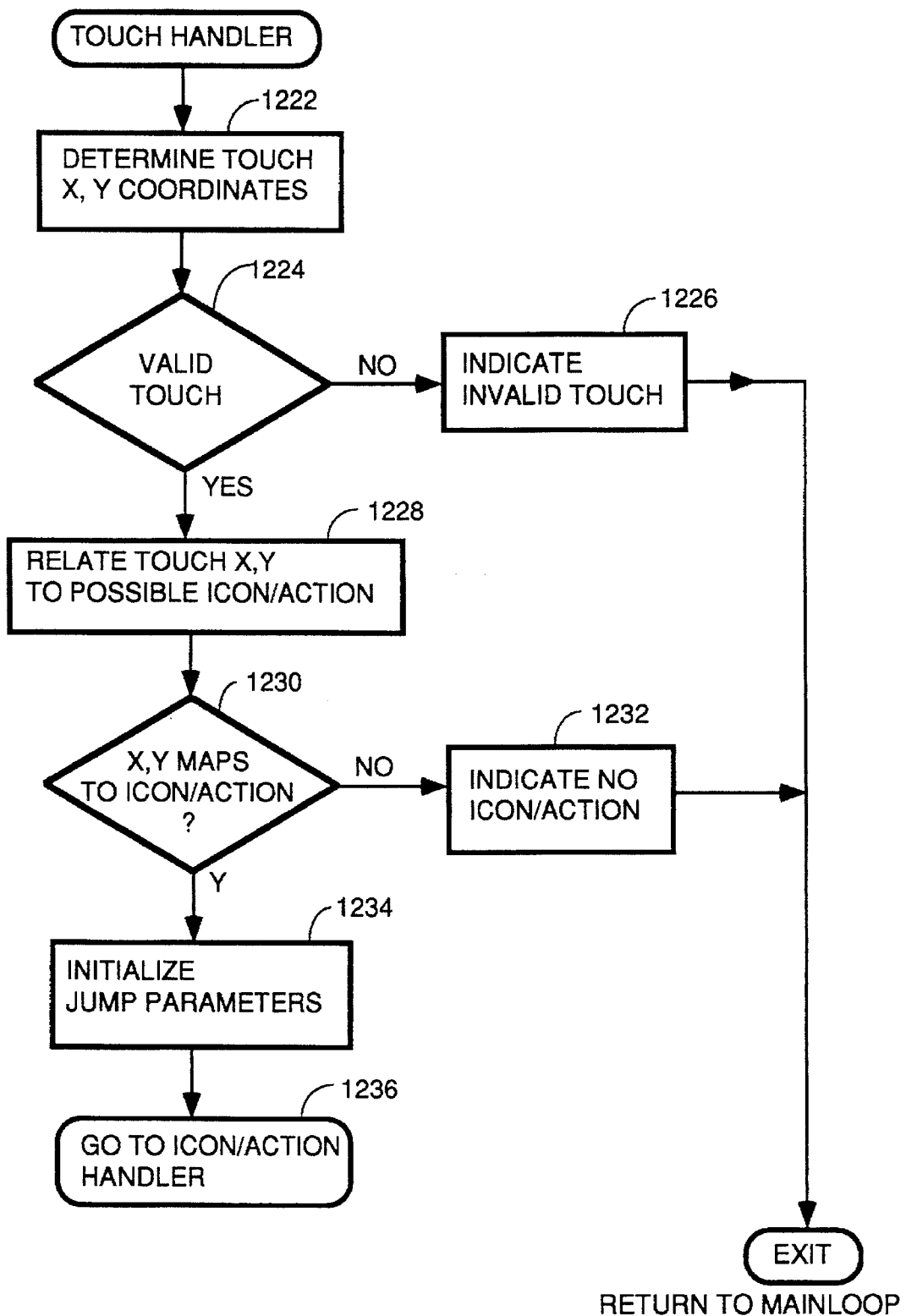
Figure 26D:
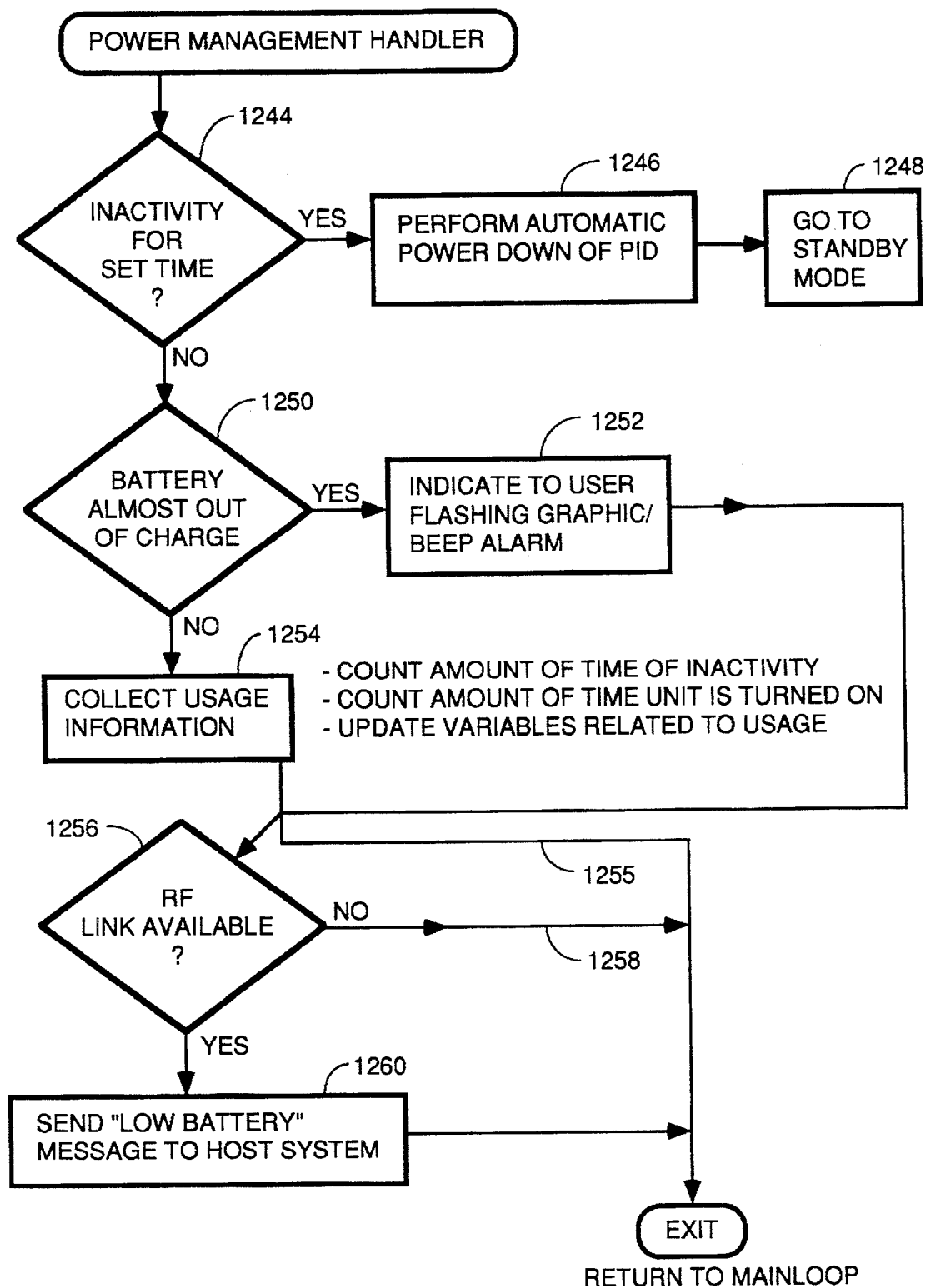
Figure 26E:
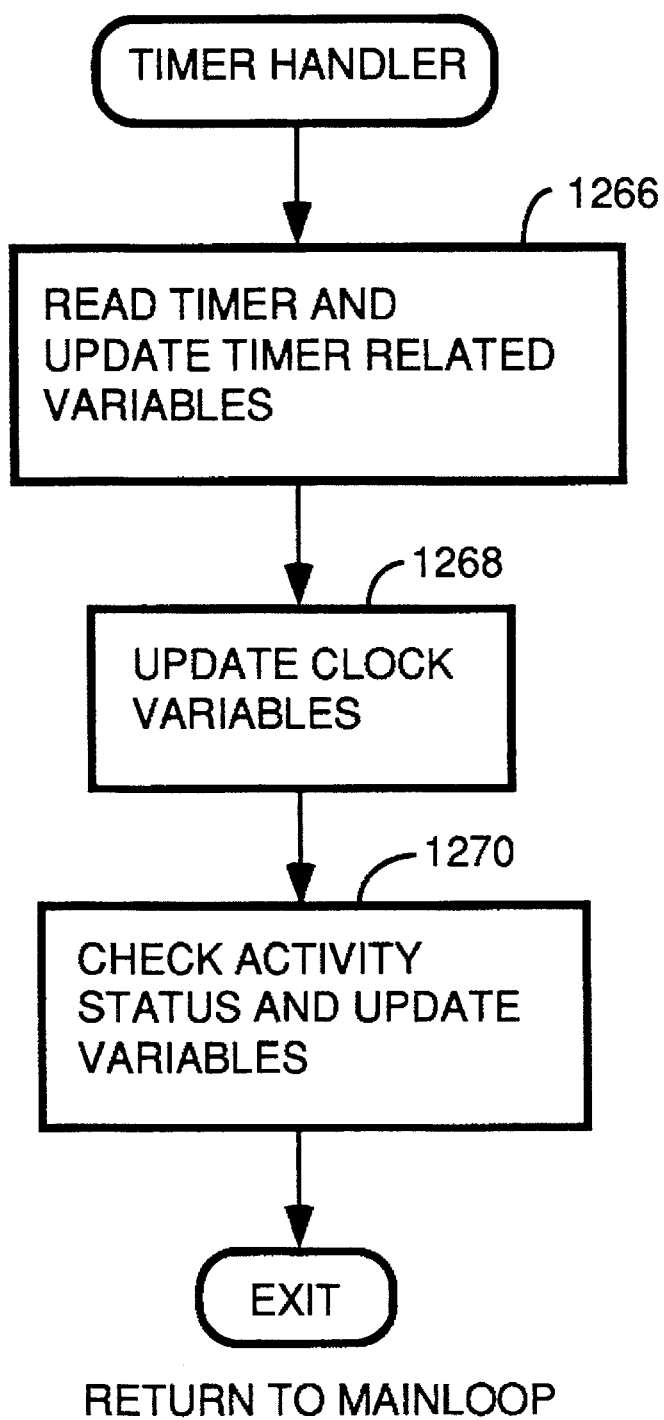
Figure 26F:
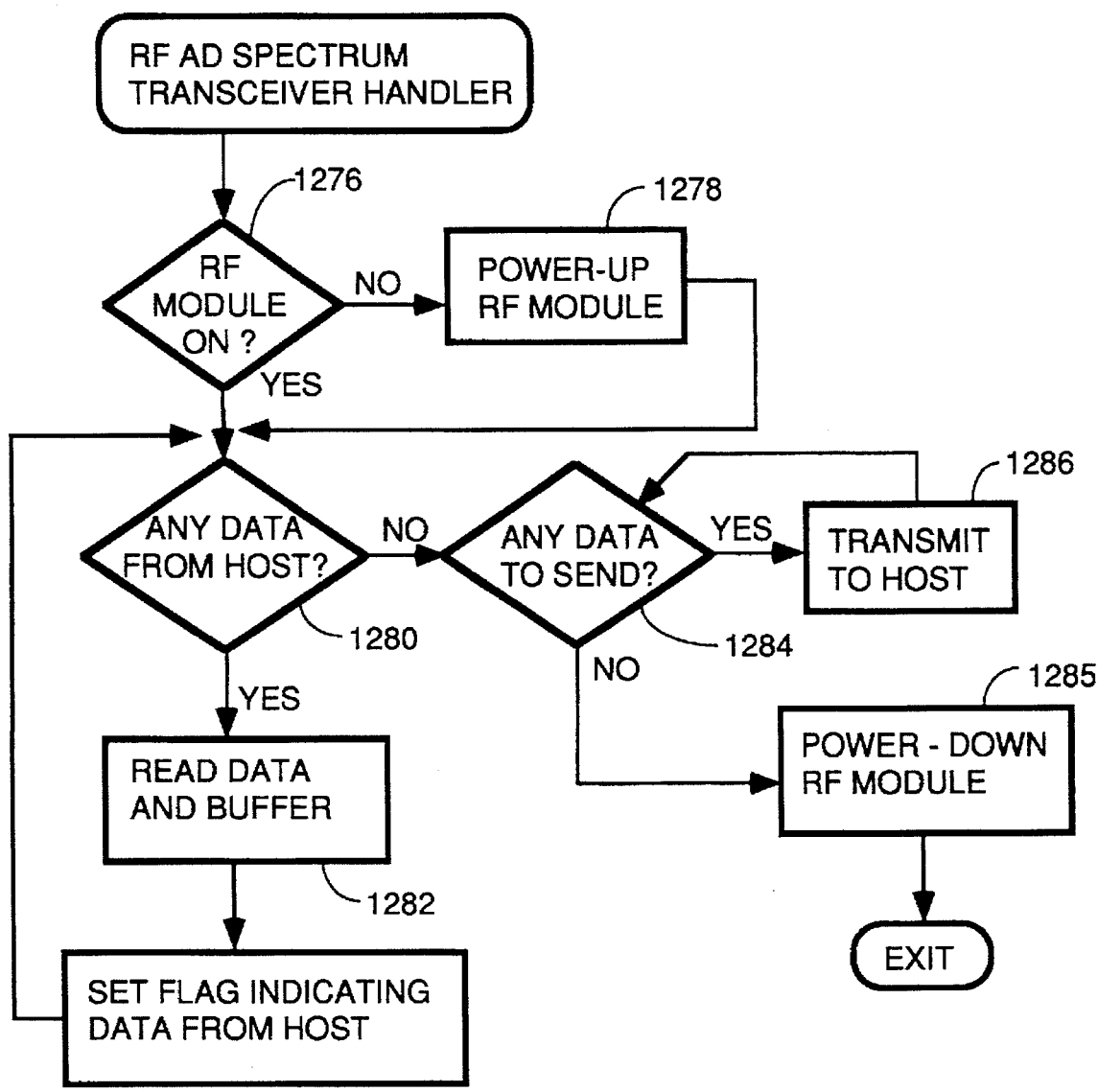
Figure 26G:
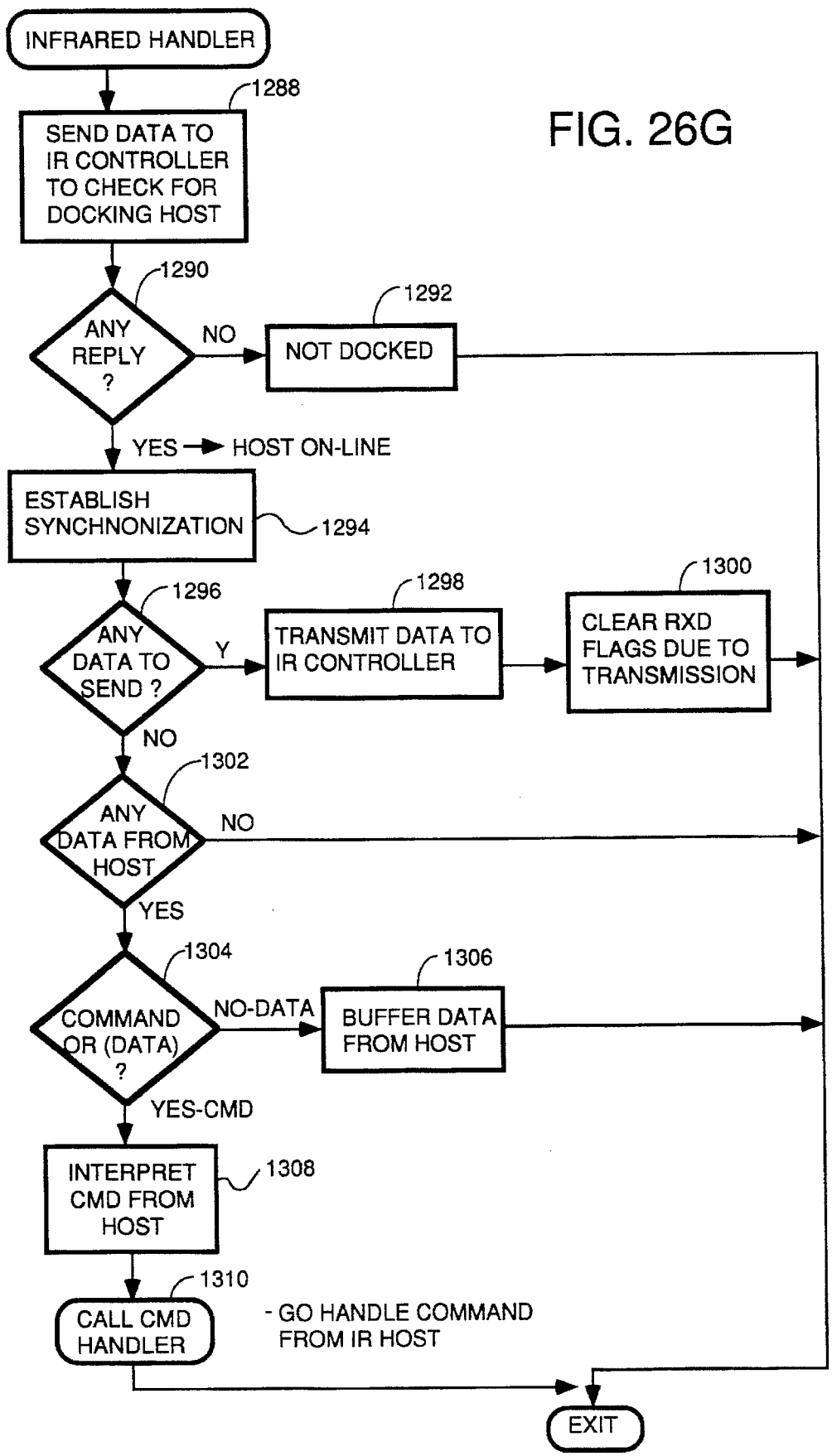
Figure 26H:
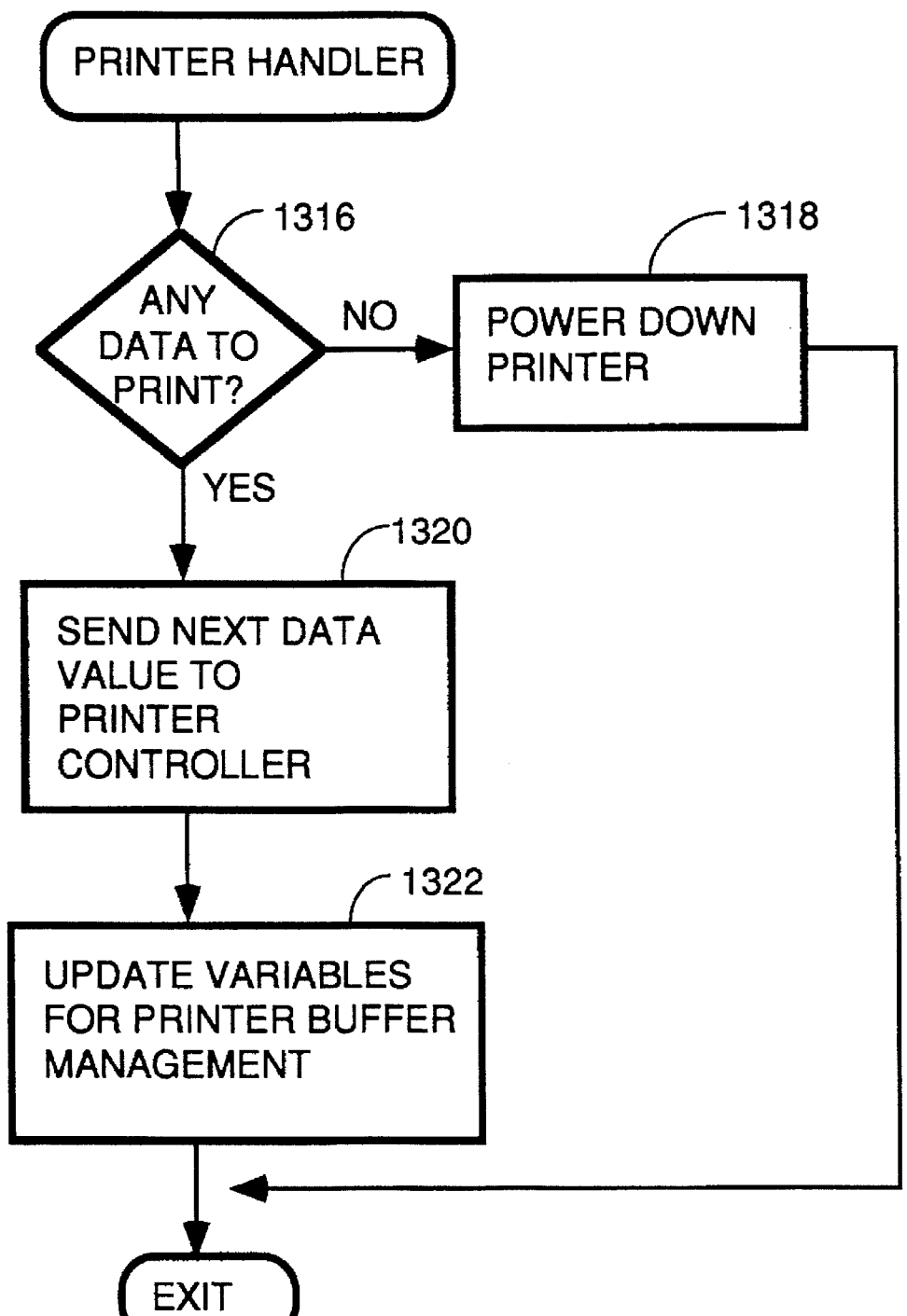
Figure 26I:
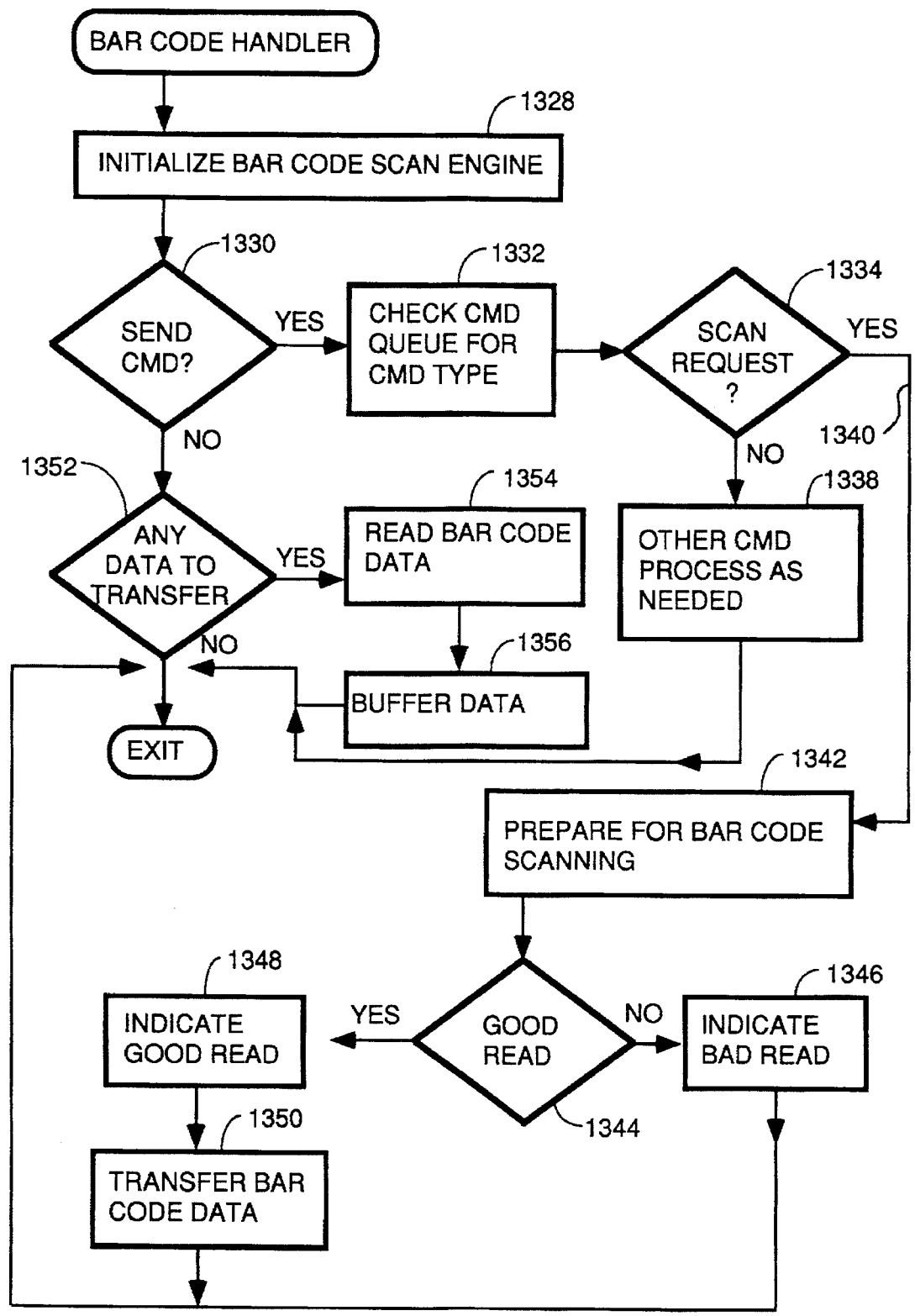
Figure 26J:
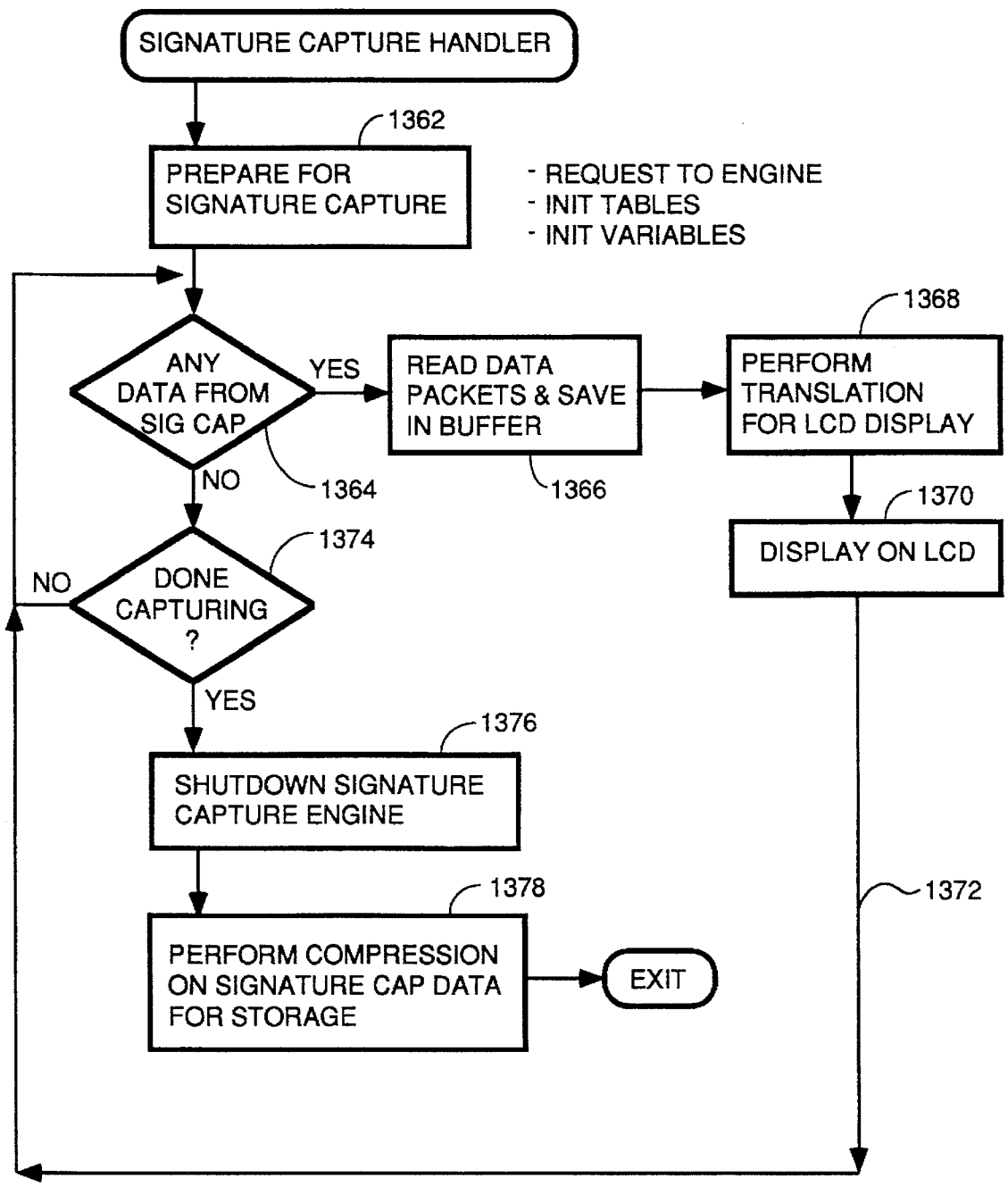
Figure 26K:
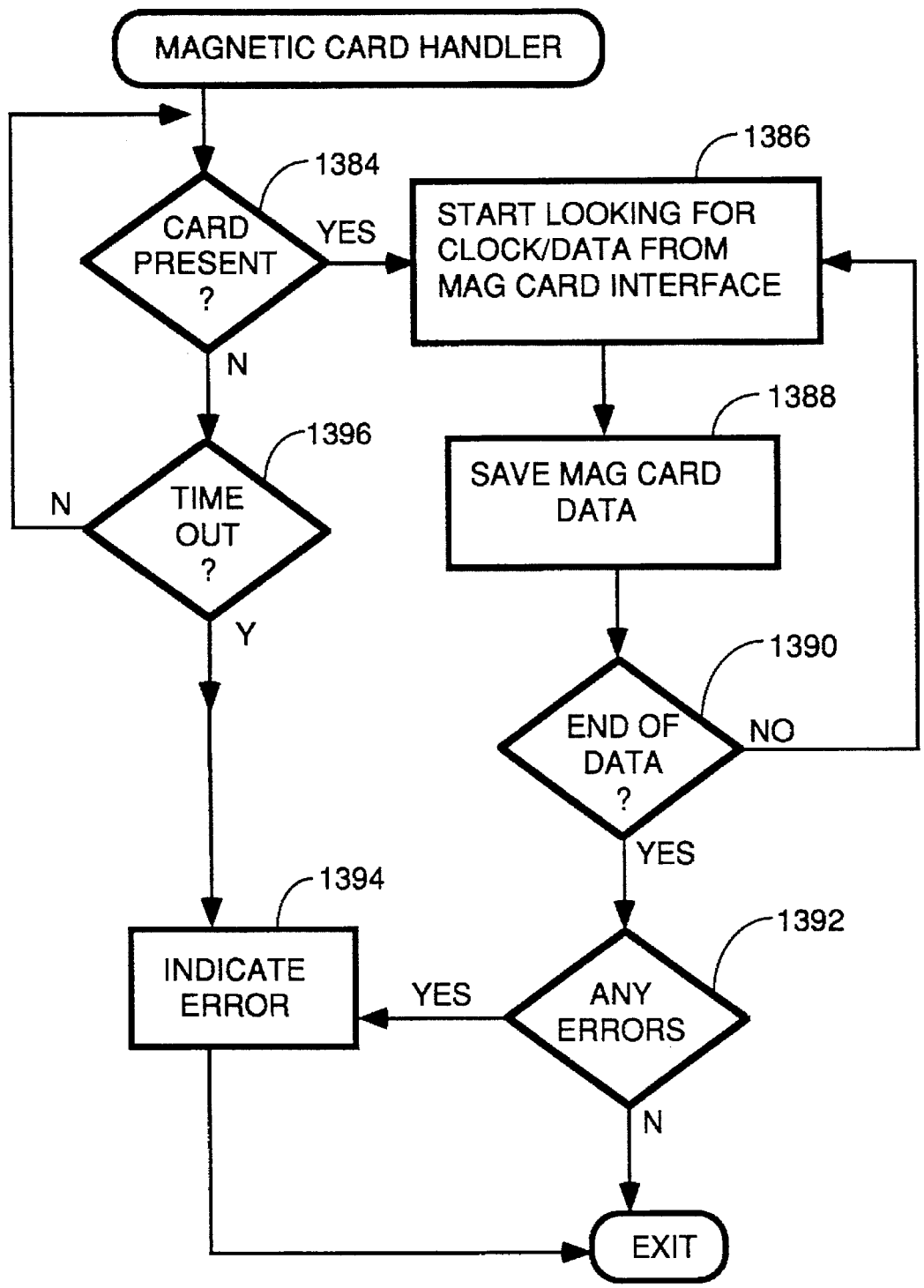
Figure 26L:
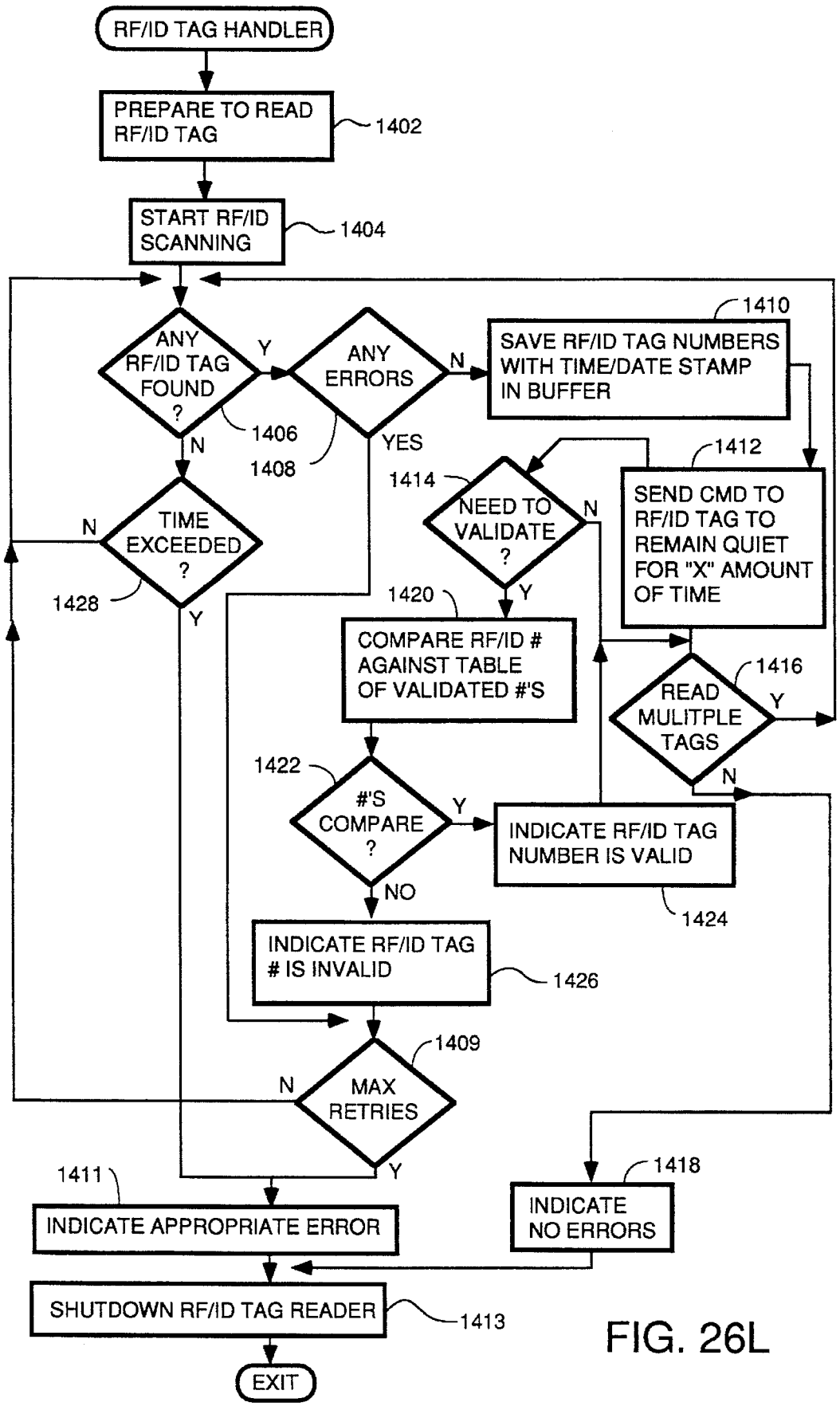
Figure 26M:
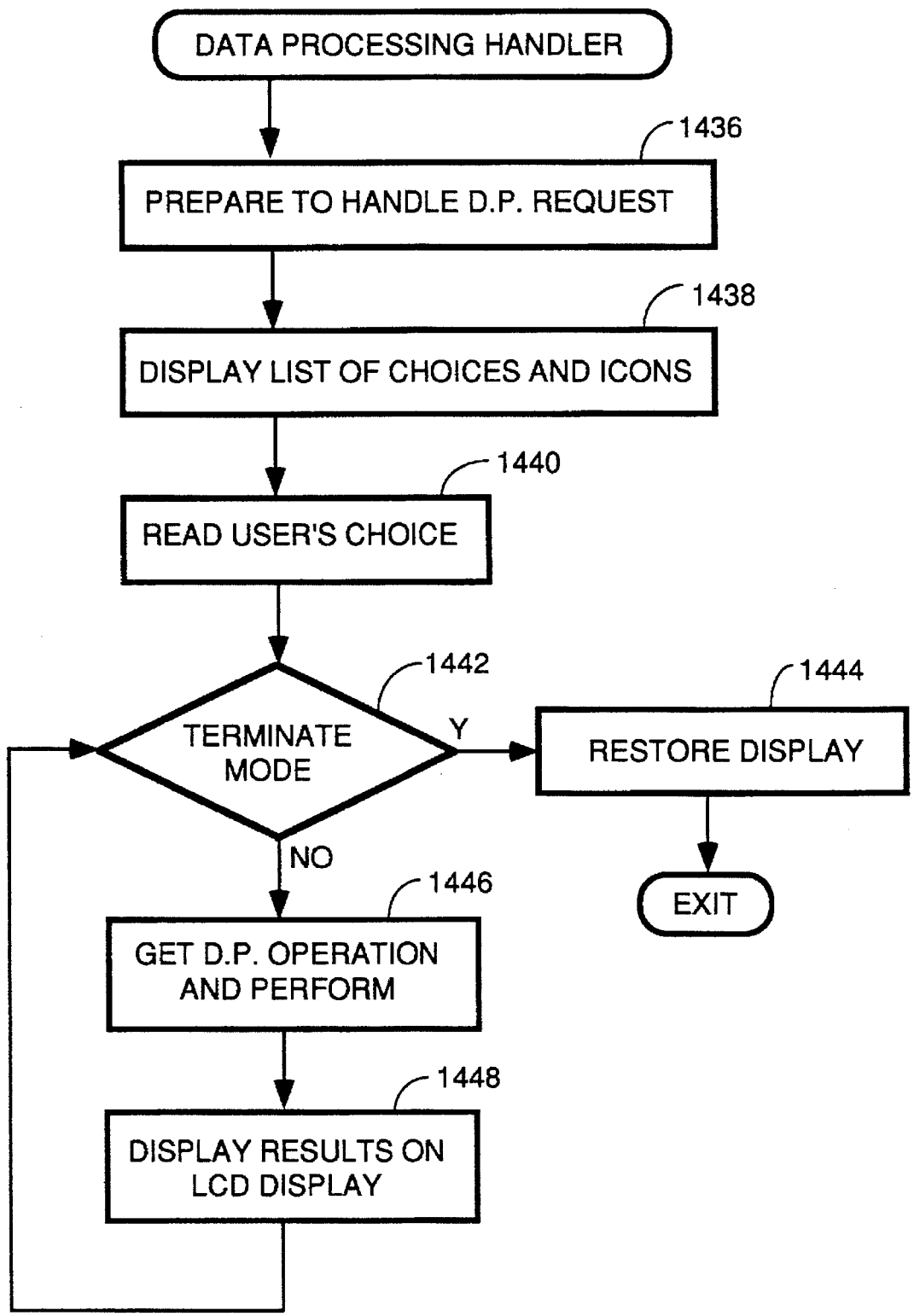
Figure 26N:
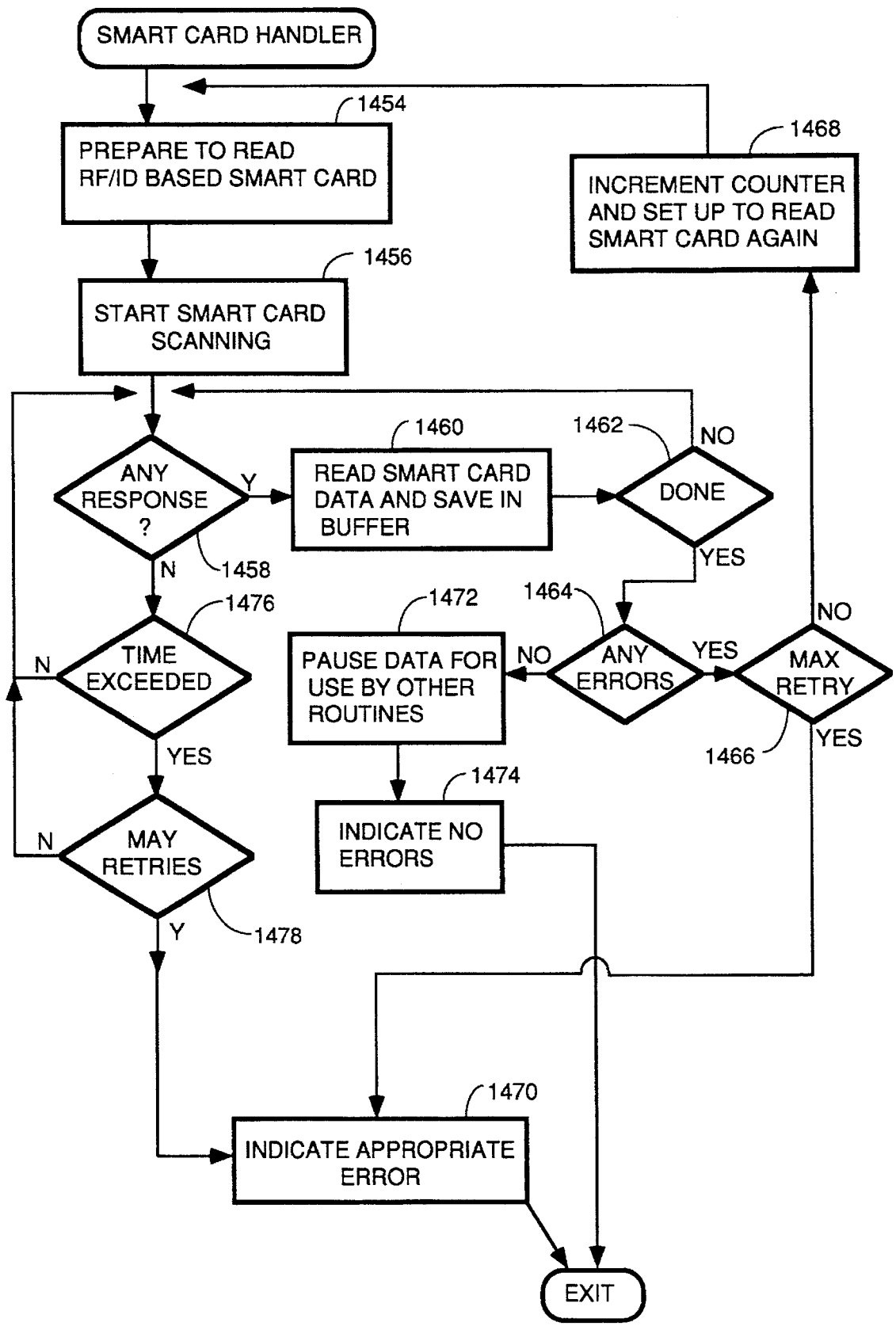
Figure 26O:
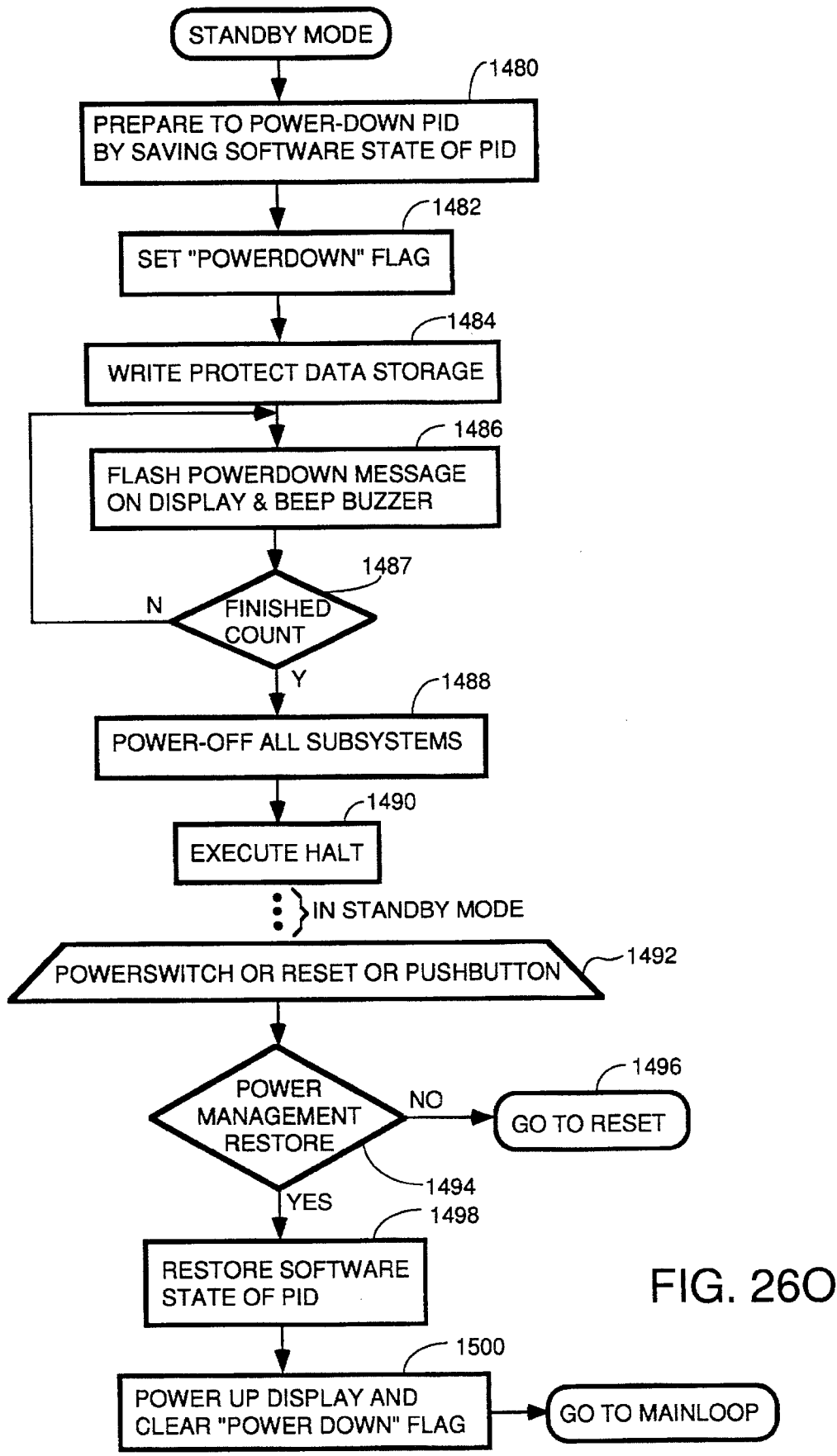
Figure 26P:
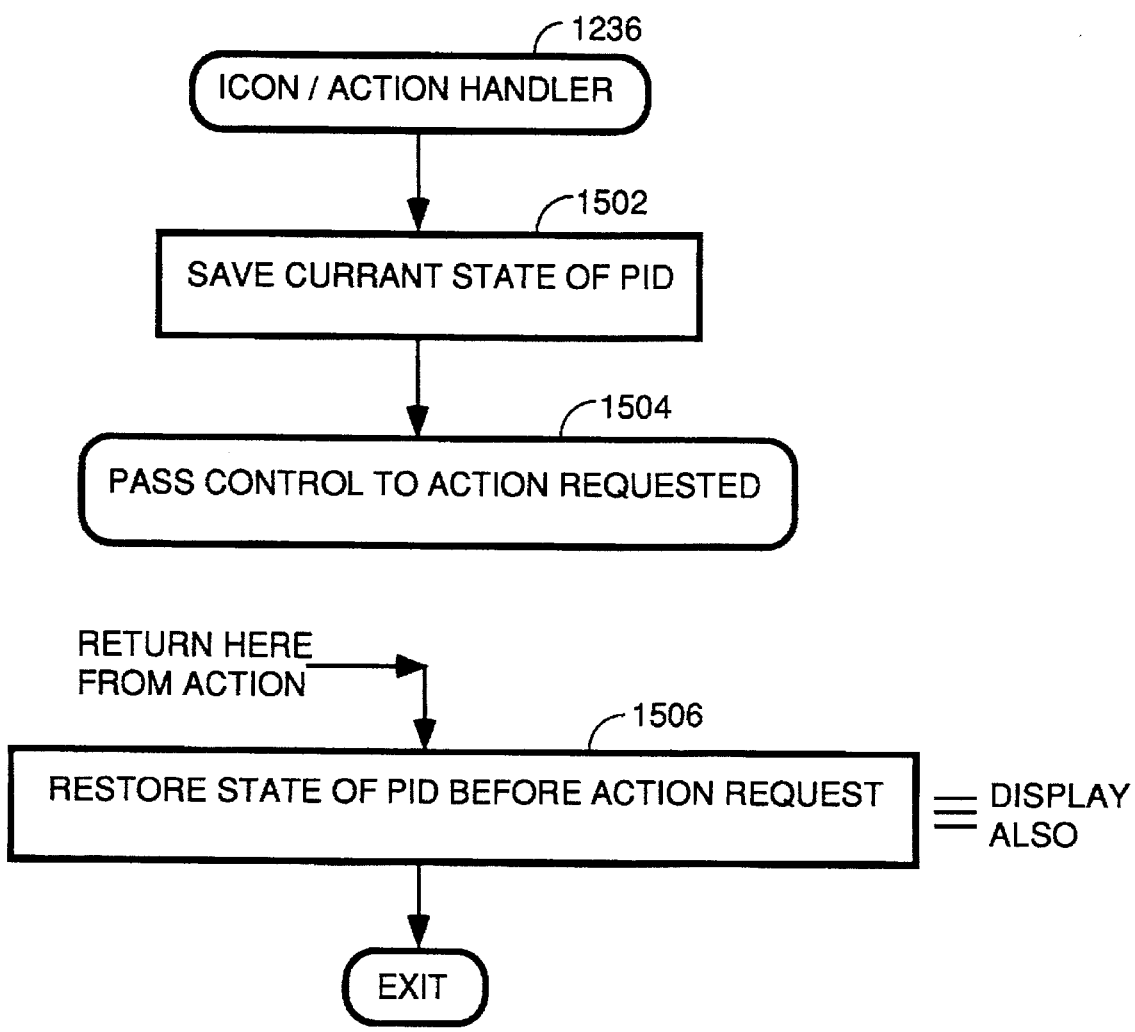

Referring to FIG. 26, comprised of FIGS. 26A–26P, there is shown a flow chart of the processing of the operating system program that coordinates activities by the microcomputer in controlling and communicating the other elements of the portable information gathering device. The processing of FIG. 26A is generally devoted to power on initialization and diagnostics. Specifically, the processing of block 1202 performs system initialization, and block 1204 performs system diagnostics and tests. The test of block 1206 determines if any errors were detected during the diagnostics. If not, processing enters the main loop process symbolized by FIGS. 26B(1) and 26B(2). If erros were detected during the diagnostics, block 1208 generates some sort of visual or audible indication that a boot error occurred, and test 1210 determines if it was a fatal error which would prevent accurate processing. If not, processing enters the main loop. If it was a fatal error, block 1212 tries to reset the processor, and block 1214 returns processing to the process of block 1204.

Referring to FIG. 26B, there is shown a flow chart of the main loop program. Test 1218 determines of there has been any touch of the touchscreen. If there has, processing is vectored to a touch handler subroutine symbolized by block 1220. Processing of the touch handler is shown in FIG. 26C. The first step in handling a touch of the touchscreen is to determine the x and y coordinates of the touch, as symbolized by block 1222. This is done by sequentially driving each row of open collector drivers on the touchscreen with a logic low signal. The columns have Vcc supplies and pull up resistors, and any touch will connect one pullup resistor and Vcc supply to one of the rows. The bottoms of the column lines are coupled to a buffer which is coupled to the data bus of the microcomputer. The buffer is sequentially read by the microcomputer as each row is driven low. The series of data vectors read from the buffer define the x and y coordinates of the touch. Block 1224 represents a process for testing for invalid touches that result in such errors as "ghost key" conditions. If such an error has occurred, block 1226 is performed to indicate an invalid touch such as by displaying a message to that effect or sounding a beep etc, as symbolized by block 1226 and then exiting to the main loop.

Block 1228 represents the process of mapping the x and y coordinates of the touch to the action desired by the user. To do this, the microcomputer looks up a table or database relating the icons or choices available for a particular display. Each display such as a menu, a display of a keyboard so that a user can type in alphanumeric information etc., will have its own table or database. The entries in this database will consist of one record for each icon or choice displayed on the associated display. Each record will comprise four fields: the x,y coordinates of the origin of a box on the display where the icon or choice is displayed; width and height parameters defining the size of the box in terms of the number of switch positions on the touchscreen that are encompassed by the box; an address of a routine that carries out the processing represented by the icon; and an address of the icon's graphics in system memory so that the icon can be redisplayed if necessary after some processing. Test 1230 represents the process of using the x,y coordinates of the touch to search the database for a matching icon. If no match is found, the process of block 1232 is performed to indicate no icon/action match has been found for the touch such as by a distinctive beep etc. and then exit to the main loop. If test 1230 found a match for the x,y coordinates of the touch, block 1234 is performed to initialize a jump parameter by writing the address for the handler routine for the matching icon in an address in memory that will be used as vector to the handler routine when a jump indirect instruction is executed as symbolized by block 1236.

Returning to the consideration of FIG. 26B, if no touch of the touchscreen was found in test 1218, test 1240 is performed to determine if any power management requests have occurred. Generally, because the portable information gathering device is battery operated, a timer will be used to timeout and shut the unit down or shut down power hungry circuits after a predetermined period of inactivity. If a power management request has occurred, processing is vectored to the power management handler routine, as symbolized by block 1242.

FIG. 26D is a flow chart of the power management handler. Test 1244 determines if there has been inactivity for more than a predetermined amount of time. If there has been inactivity for a predetermined time, block 1246 is performed to perform automatic power down of the portable information gathering device. The PID then goes into a standby mode where only essential circuits are powered up (only those circuits needed to wake the unit back up), as symbolized by block 1248. If there has not been inactivity for a predetermined time, a test 1250 is performed to determine if the battery is almost out of charge. If so, block 1252 is performed to indicate to the user that the battery is almost out of charge such as by flashing a graphic, beeping, displaying text message etc. Next, test 1256 is performed to determine if an RF link is available to the host computer. If not, path 1258 is taken to exit to the main loop. If an RF link is available, block 1260 is performed to send a "low battery" message to the host computer and then exit back to the main loop.

If test 1250 determines that the unit is not almost out of charge, block 1254 is performed to collect usage information such counting the amount of time in all inactive periods, counting the time the unit has been turned on, and updating variables related to useage. Then path 1255 is taken to exit back to the main loop.

Returning to FIG. 26B, if test 1240 determines that no power management requests have been made, test 1262 is performed to determine if any timer requests have been made. For some applications of the personal information gathering device such as UPS route work etc, time and date stamps on such things as electronic signatures captured from persons to whom deliveries have been made are useful. The microcomputer in FIG. 19 either includes its own clock/calendar/timer function to provide this data or it is provided by another peripheral chip (not shown). If a timer request has been made, processing is vectored to the timer handler, as symbolized by block 1264. The timer handler routine is symbolized by FIG. 26E. Block 1266 represents the process of reading the timer or time of day/date chip when a timer interrupt or other timer request occurs. After the timer count or time of day/date information is read from the timer, time and date variables in memory are updated for use in time and date stamping signature capture files etc. (in some embodiments, when a signature capture file is to be time/date stamped, a special access routine to the time of day/date circuit can be made to read the time and date). Next, block 1268 is performed in embodiments without time/date chips to calculate the time from the count obtained from the timer. Next, block 1270 is performed to check activity status and update activity variables. For example, a flag might be set every time a touch on the touchscreen occurs. Block 1270 represents the process of checking this flag each time a timer interrupt occurs to see if a touch has occurred and updating an activity variable such as a count of the number of interrupt intervals for which there has been no touch for purposes of deciding whether to go into automatic power-down mode.

Returning to FIG. 26B, if test 1262 determines that no timer requests have been made, test 1272 is performed to determine if any RF requests have been received from the RF transceiver 307 in FIG. 19. If so, processing is vectored to the RF handler symbolized by block 1274 and FIG. 26F. Test 1276 determines if the RF transceiver module is on. If not, block 1278 applies power to the RF module. If the RF module is on, test 1280 is performed to determine if any data has been received from the host computer. If so, block 1282 is performed to read the data and store it in a buffer memory in the PID for later use. Then the processing of block 1283 is performed to set a flag indicating that data has been received from the host computer, and then processing returns to test 1280 to test for whether more data needs to be transmitted from the host computer. If no data has been received from the host computer, test 1284 is performed to determine if any data needs to be transmitted to the host computer. If not, the routine of block 1285 is performed to power down the RF spread spectrum transceiver module and then the routine exits back to the main loop. If there is data to be transferred to a host computer elsewhere, block 1286 is performed to transmit the data to the host computer via the RF transceiver 307, and then the routine exits.

Returning to FIG. 26B, if test 1272 finds no RF requests, test 1284 is performed to determine if any infrared communication requests from the IR transceiver 440 in FIG. 19 are pending. If so, processing is vectored to the infrared handler routine as symbolized by block 1286 and FIG. 26G. Referring to FIG. 26G, block represents the process of sending out inquiry data to the infrared controller 440 in FIG. 19 to ascertain whether the portable information gathering device is docked with a base unit or docking host computer. Test 1290 determines of there was any reply to the inquiry transmission. If not, the routine concludes that the PID is not docked, and the routine exits back to the main loop, as symbolized by block 1292. If a reply is received, the base unit or docking host is on line and the process of block 1294 is performed to establish synchronization. Next, test 1296 determines if there is any data to send. If so, block 1298 is performed to transmit the data from the memory or microcomputer to the infrared controller. Then block 1300 is performed to clear the receive data flags to indicate that data is being transmitted. Then the routine exits. If test 1296 determines that there is no data to be sent, test 1302 is performed to determine if any data from the docking host or base unit has been received. If not, the routine exits. If so, test 1304 is performed to determine if the data received from the docking host or base unit is a command or data. If it is data, block 1306 is performed to buffer the data from the docking host or base unit in system memory, and then the routine exits to the main loop. If test 1304 determines that the received data is a command, block 1308 is performed to interpret the command from the docking host or base unit (docking host refers to a host computer or satellite computer other than the base unit 312 with which the PID can dock for direct transfer of data by infrared transmissions). After the command has been interpreted in block 1308, block 1310 is performed to call a command handler routine which is appropriate to the command received.

Returning to the consideration of FIG. 26A, if test 1284 determines there are not infrared requests, test 1312 is performed to determine if there are any outstanding printer requests. Typically, the tests in the main loop of FIG. 26A represent either interrupts from the various peripherals, timed interrupts to handle each peripheral in its own time slice or sequential polling of the peripherals. If test 1312 determines that it is time to perform the printer service routine, processing is vectored to a printer handler, as symbolized by block 1314 and FIG. 26H. Test 1316 determines if there is any data to print. If not, block 1318 is performed to power down the printer and the routine exits back to the main loop. If there is data to print, block 1320 is performed to send the next data value to the printer controller for printing. Then block 1322 is performed to update variable for printer buffer management, and the routine exits to the main loop.

Returning to the consideration of FIG. 26B, if test 1312 determines that there is no outstanding request for printer service, test 1324 is performed to determine if there are any outstanding requests for service to the barcode scan engine. If there are, processing is vectored to the bar code handler routine symbolized by FIG. 26I and block 1326. The first step in this process is to initialize the bar code scan engine, as symbolized by block 1328. Typically, this will involve powering up the barcode scan engine, or setting the illumination intensity for the range of scanning desired. Next, the test of block 1330 is performed to determine if any command needs to be sent to the bar code scan engine. Typically, such commands include commands received from the user by, for example, touching a specific area on the touchscreen, to scan a barcode, change barcode symbology types etc. If test 1330 determines that a command is to be sent, typically by checking a flag that gets set when a command is issued by the user, block 1332 checks the command queue for command type to determine what type command is to be sent. Then test 1334 is performed to determine if the command was a scan request. If not, path 1336 is taken to block 1338 to process whatever other type of command is to be sent as needed and send it to the barcode scan engine. If the command was a scan request, path 1340 is taken to block 1342 where processing to prepare for barcode scanning is performed. This processing typically entails clearing a temporary buffer or storage area to make room for the decoded data to be received from the barcode scan engine. Next, test 1344 is performed to determine if the read was or was not good. If not, block 1346 is performed to generate some visible or audible indication of a bad read. If the read was good, i.e., a successful decoding operation was performed, the processing of block 1348 is performed to make some visible or audible indication of a good read. Then block 1350 is performed to transfer the decoded alphanumeric information decoded from the barcode scan engine into the system memory.

Returning to test 1330, if no command is to be sent to the barcode scan engine, test 1352 is performed to determine if there is any decoded alphanumeric data to transfer to the PID system memory from barcode scan engine. Typically this occurs when a successful decode occurs while the microcomputer is busy processing handler routines for other peripheral units. If there is no such data, the routine exits back to the main loop. If there is decoded data waiting in the barcode scan engine, block 1354 is performed to read the decoded alphanumeric barcode data from the barcode scan engine. Then, the process of block 1356 is performed to buffer the data into the PID memory.

Returning to the consideration of FIG. 26B, if the test of block 1324 determines that no processing of the barcode scan engine is required, the test of block 1358 is performed to determine if the user has requested a signature capture mode. If so, processing is vectored to the process symbolized by block 1360 and FIG. 26J. The first step in this process is symbolized by block 1362 where the signature capture circuitry 308B in FIG. 19 is prepared for operation. This preparation for signature capture involves powering up the circuitry and initializing tables in PID memory to prepare to receive the packets of data and initializing variable such as good read and bad read flags etc. Next, test 1364 determines if there is any data from the signature capture circuitry that needs to be transferred. Typically, the signature capture circuitry sets a flag when it has data ready for transfer, and test 1364 checks this flag. If there is data waiting, block 1366 is performed to read the data packets from the signature capture circuitry 308B and save them in the PiD memory. Next, block 1368 is performed to perform the necessary resolution transformation to translate the signature capture data at 1024×1024 resolution to 320×240 resolution of the LCD display, or, in alternative embodiments, whatever resolution is present in the graphics printer on board the PID. Next, block 1370 is performed to display the signature data received so far on the LCD display of the PID. Then, path 1372 is taken back to the test 1364 to get the next data packet. The process repeats continuously like this as the various switches on the touchscreen close and new packets of data are generated. If the test 1364 determines that there is no more data present in the signature capture circuitry 308B to deliver, test 1374 is performed to determine if the signature capture circuitry is done capturing data. If not, processing returns to test 1364. If signature capture is done, block 1376 is performed to shut down the signature capture engine. Then block 1378 is performed to perform compression on the signature capture data for storage.

Returning to consideration of FIG. 26B, if test 1358 determines that no signature capture processing request is pending, test 1380 on FIG. 26B is performed to determine if there are any requests to read magnetic cards such as when a user selects credit card for payment for an order. If such a request exists, the processing of FIG. 26K is performed as symbolized by block 1382. The first step of this process is symbolized by test 1384 to determine if a magnetic stripe card is present in the PCMCIA slot (or other credit card slot in other embodiments). This is determined by reading a card present signal generated by a sensor in the card slot. If a card is present, block 1386 is performed to start looking for dock/data from the magnetic card interface 512 in FIG. 19. Next, block 1388 is performed to save the magnetic card data in the PID buffer memory, and then test 1390 is performed to determine if the end of all data has been received from the magnetic card interface. If not, the process of block 1386 is performed again to wait for the next data from the card interface. If all data has been received, test 1392 is performed to determine if any errors have been sensed. If not, the routine is exited. If so, block 1394 is performed to indicate that an error has occurred. If test 1384 indicates that no card is present, test 1396 is performed to determine if a time out condition has occurred indicating that no card has been inserted in the time alloted after a credit card request is made. If timeout has occurred, block 1394 is performed. If not, processing returns to test 1384.

Returning to the consideration of FIG. 26B(2), if test 1380 determines that there is no request pending for magnetic card processing, test 1398 is performed to determine if user requests have been made to scan an RF ID tag such as by pushing the SC button on the front panel of the PID. If so, the processing of FIG. 26L is performed as symbolized by block 1400 to handle the RF ID tag read request. The first step in this process is to prepare the reader to read the RF ID tags. Typically, this process will involve applying power to the reader if it is in standby mode, checking to see if a system code has been installed and installing one if no system code has been installed and configuring the reader if it has not already been configured. The details of the configuration depend upon the type of the reader in use, and are not critical to the invention. The system code prevents the reader from misinterpreting data from other RF ID tags.

Next, block 1404 is performed to start the RF ID tag scanning. This involves sending interrogation signals out to any RF ID tags within range. Test 1406 determines if any RF ID tags were found within range that replied to the interrogation signal. If so, test 1408 is performed to determine if any errors occurred. Typically, an error might involve a reply from a tag that does not have the right system code, a bad read or a CRC error.

If no error occurred, block 1410 is performed to save the RF ID tag numbers with a time/date stamp in the PID memory or in a buffer memory in the reader.

If an error was found in test 1408, processing is vectored to test 1409 to determine if a maximum number of retries has been attempted. If the maximum number of retries has occured, block 1411 is performed to generate an indication as to which error occurred, and then block 1413 is performed to shut down the RF ID tag reader.

If test 1409 determines that the maximum number of retries has not occurred, then processing returns to test 1406.

Returning to the consideration of block 1410, after the RF ID tag numbers have been stored in memory, block 1412 is performed to order the RF ID tag to remain quiet for a predetermined amount of time. Then test 1414 is performed to determine if there is a need to validate the RF ID tag(s) that responded. If not, test 1416 is performed to determine if multiple tags have to be read. If so, processing returns to test 1406. If not, block 1418 is performed to generate an indication that no errors occurred, and then block 1413 is performed.

If test 1414 determines that validation is needed, block 1420 is performed to compare the RF ID tag number against a table of validated tag numbers. Then, test 1422 is performed to determine if the number of the RF ID tag was found in the table. If so, block 1424 is performed to indicate that the RF ID tag number is valid, and then processing returns to test 1416. If test 1422 does not find the tag's number in the table of authorized numbers, block 1426 is performed to indicate that the RF ID tag number is invalid. Then, test 1409 is performed.

Returning to the consideration of test 1406, if no RF ID tag was found, test 1428 is performed to determine if a predetermined time has been exceeded with no reply from a tag. If not, processing returns to test 1406. If the time has been exceeded, processing proceeds to block 1411.

Returning to the consideration of FIG. 26B(2), if test 1398 determines that no request to scan an RF ID tag is pending, test 1432 is performed to determine if there any pending requests for data processing. If so, processing is vectored to the data processing handler, as symbolized by block 1434. The data processing handler is depicted in FIG. 26M. The data processing handler handles some aspects of the graphical user interface by displaying menu choices, icons or both and reading and executing choices made by the user. The first step in this process is symbolized by block 1436 where preparations are made to handle any data processing requests such as powering up the touchscreen scanning circuitry, or, if for example a PCMCIA interface card for interfacing a large keyboard is inserted in the PCMCIA slot for desktop operations, powering up and initializing the PCMCIA card. Generally, the process of block 1436 will involve powering up any circuitry necessary in the process of handling the data processing request. Next, block 1438 is performed to display a list of menu choices and/or icons from which the user can indicate what action or function is desired. Block 1440 is then performed to read the user's choice such as what menu selection was touched or entered by keyboard or what icon was touched. Next, test 1442 is performed to determine if the data processing mode is to be terminated. If so, the display is restored by block 1444. If test 1442 determines that the data processing mode is to be continued, block 1446 vectors processing to a subroutine or other process which implements the requested data processing operation and executes the operation. The results are then displayed on the LCD display in block 1448.

Returning to the consideration of FIG. 26B(2), if test 1432 determines that no data processing requests are pending, test 1450 is performed to determine if there are any pending requests to process smart cards. If not, processing returns to the top of the main loop, and the processing of FIGS. 26B(1) and 26B(2) is repeated. If there is a pending smart card request, processing is vectored to the smart card handler as symbolized by block 1452. The smart card handler routine is depicted in FIG. 26N. This handler assumes that the smart card to be processed has an RF ID tag embedded therein so the card can be read outside the PCMCIA slot so long as it is within range of the reader. Those skilled in the art will appreciate the modifications necessary to adapt the smart card handler of FIG. 26N to a handler that can read smart cards that have contacts. The first step in the process is to prepare to read the RF ID tag based smart card, as symbolized by block 1454. Typically this involves powering up reader 517 used for the smart card (or reader 314 in embodiments where this reader is shared for reading both smart cards and products to be purchased). Then block 1456 is performed to start scanning for the smart card transponder. This involves sending out an interrogation signal. Test 1458 determines if there is any response. If there is, block 1460 is performed to read the smart card data received from the card's RF ID tag and save in a buffer in the smart card reader or in PID memory 324. Test 1462 is then performed to determine if all data has been received from the smart card. If not, processing returns to test 1458. If all data has been received, test 1464 is performed to determine if there are any errors in the received data (such as CRC errors). If there are errors, test 1466 is performed to determine if a predetermined maximum number of retries has been accomplished. If not, block 1468 is performed to increment a retry counter and set up to read the smart card again. Processing then returns to block 1454.

If test 1466 determines that a predetermined maximum number of retries has been performed, then block 1470 is performed to indicate the appropriate error has occurred, and then the handler routine is exited back to the main loop.

Returning to the consideration of test 1464, if this test indicates that no errors in the received data have been detected, block 1472 is performed to parse the data for use by other routines, i.e., separate out the various data elements from the string of bits received from the RF ID tag and get the appropriate data elements to the routines that need this data. Then block 1474 is performed to indicate no errors occurred in the received data.

Returning to the consideration of test 1458, if there was no response from any smart card transponder in response to the interrogation signal, test 1476 is performed to determine if a predetermined timeout period has expired. If not, processing returns to test 1458. If the timeout period has been exceeded, test 1478 is performed to determine if a predetermined maximum number of retries has occurred. If not, processing returns to test 1458. If so, the processing of block 1470 is performed and the handler is exited.

Returning to the consideration of FIG. 26D, when processing is vectored to the standby mode, as symbolized by block 1248, the processing of FIG. 260 is performed. Referring to FIG. 260, the first step is preparing to power down the PID by saving the software state thereof, i.e., the various register states, display data, program counter etc are saved in nonvolatile memory, as symbolized by block 1480. Then block 1482 is performed to set a "powerdown" flag. Next, the data storeage area where the machine state was stored is write protected in block 1484. Block 1486 then flashes a power down message on the display and an audible indication such a s beep is sounded to indicate the PID is going into a powerdown countdown. A downcounter is then started counting down from a predetermined number and test 1487 is performed to determine if the count in the count down counter has reached 0 yet. If not, processing returns to block 1486 and, after that processing, test 1487 is performed again. When the countdown finally reaches 0, block 1488 is performed to power off all subsystems, and block 1490 is performed to execute a halt instruction in block 1490. The PID then stays in standby mode until the power switch or reset button or any pushbutton on the unit is engaged as symbolized by block 1492. Test 1494 is then performed to determine if the power management function has been restored. If not, processing is vectored to a reset routine that resets all registers and the program counter to zero and performs the same initialization and diagnostics as are performed at power up, all as symbolized by block 1496. Then block 1498 is performed to restore the software state of the PID to the state it was in when the unit entered standby mode. Finally, block 1500 powers up the display and clears the powerdown flag, and the routine is exited to the main loop.

Returning to the consideration of FIG. 26C, after initialization of the jump parameters processing proceeds to the icon/action handler in block 1236. The icon/action handler is symbolized by the processing of FIG. 26P. Block 1502 of the icon/action handler routine saves the current state of the PID in the manner described above with reference to step 1480. After the machine state is saved, control is passed to a routine that implements the action requested in block 1504. Whatever routine is requested then is executed, and, after completion, control is returned to block 1506 where the state of the machine is restored as it existed before execution of the routine to carry out the requested action including the state of the display. The routine is then exited to the main loop.

Figure 27:
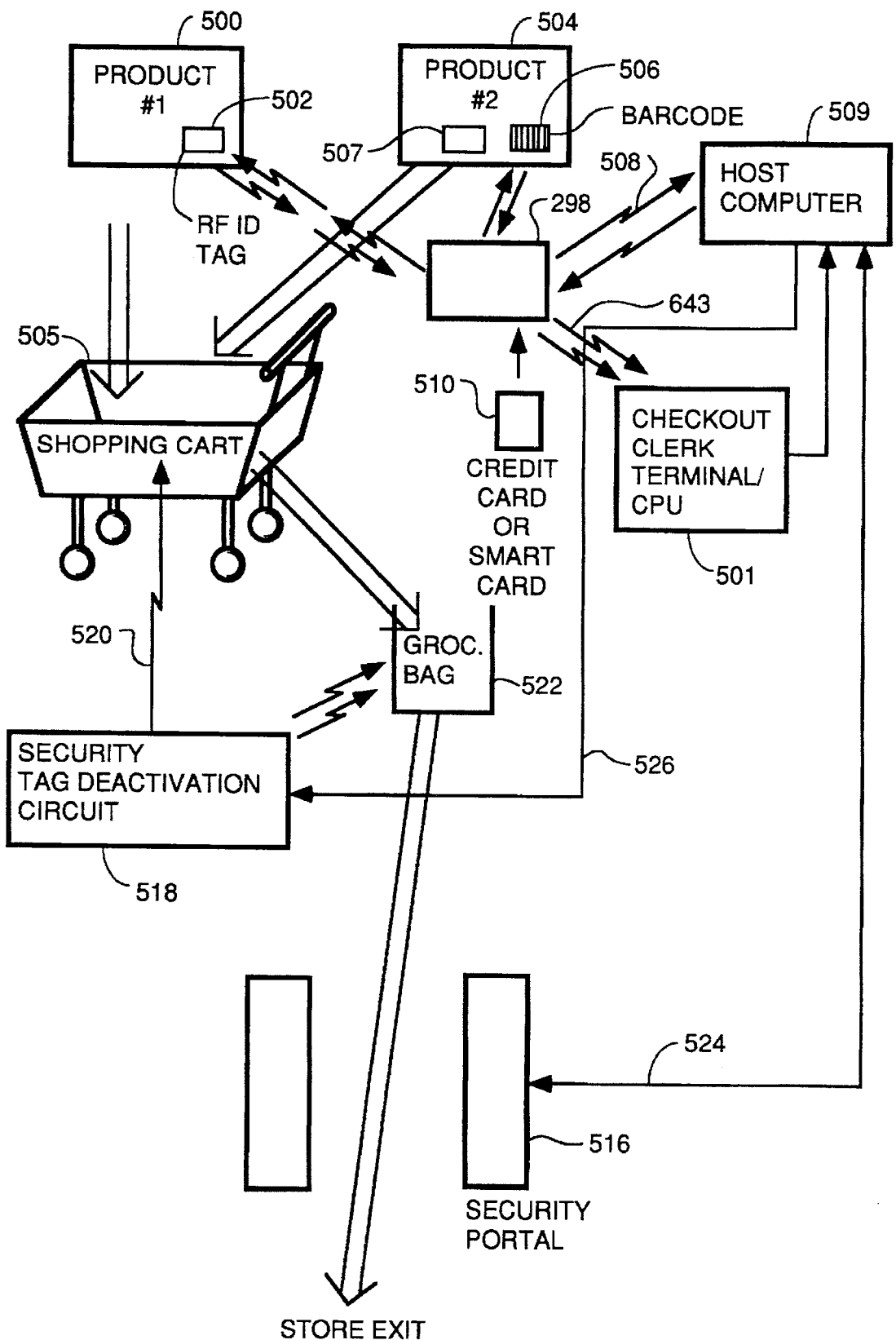
FIG. 27 is a diagram of a method of using a PID in a new, faster, more convenient way of shopping.

Referring to FIG. 27, there is shown a conceptual diagram of how the personal information device 298 can be used in a supermarket setting. In this method, a first product 500 has an RF ID tag 502 embedded therein or attached thereto. A second product 504 has no RF ID tag, but has a barcode 506 thereon. For security purposes, the items with barcodes on them will also have a magnetized security tag 507 affixed thereto.

In the case of mixed shopping for products with both barcodes and RF ID tags, the PID 298 can be carried with a shopper as he or she goes down the aisles of the supermarket and selects products and puts them into shopping cart 505. The PID display can optionally display a shopping list as described above to aid the shopper. When the shopper picks a product off the shelf, the product's identification information is input by the PID either by scanning the products's barcode or by interrogating the product's RF ID tag. The product ID information is stored in the memory of the PID and, optionally, may be used to alter the display of a shopping list to show that item as "checked off".

At checkout time, the product identification data stored in the PID memory is downloaded to the host computer 509 of the store as symbolized by RF transmission 508. The data regarding the products the customer wants to purchase can also be downloaded by a hardware link to a local area network coupled to the store host computer. This can be done either via a LAN interface to the store computer integrated on a PCMCIA card which is slipped into the PCMCIA slot of the PID at checkout time, or the PID can be slipped into a base unit at the checkout stand like base unit 312 which downloads the stored information via the infrared link between the PID and the base unit. The information downloaded into the base unit is then downloaded to the store computer via a LAN interface to the store computer's local area network built into the base unit or via an RF interface to the LAN or the host computer itself.

After the data is downloaded to the store's host computer, the store computer maps each item's identification to the current price for that item and sends back an itemized listing to the PID for printing by the PID printer or display on the PID display. The total cost of the goods is displayed. The user then pays for the goods with cash, check, credit card or smart card. In the case where the user pays by credit card or smart card, the user places the credit card or smart card 510 into the PCMCIA slot of the PDA. The PCMCIA slot has one or two magnetic heads built into it to read the data off the magnetic stripe of a credit card. In some embodiments, only one magnetic head will be used and the card will have to be placed in the slot with the proper orientation to get the stripe over the magnetic head. In embodiments where two magnetic heads are used, the card can be placed in the slot in any orientation so long as the magnetic stripe is facing the magnetic heads. The magnetic heads are positioned so as to not interfere with entry or exit of a PCMCIA card. The magnetic heads of the magnetic stripe reader are coupled to a magnetic stripe reader interface circuit 512 in FIG. 19 of conventional design such as is already known in credit card readers used in many retail point of sale facilities. The software that control microcomputer 320 receives the credit card number, user name, expiration date or whatever information is stored on the credit card magnetic strip and downloads this information to the host computer through one of the communication paths described above. The host computer then initiates a call to the credit card purchase authorization computer and receives credit authorization for the purchase in a conventional manner. If credit authorization is declined, the host computer transmits a message to the PID via LAN or RF link for display on the PID display indicating that credit has been declined. The user then pays by some other means.

In case the user wishes to pay by smart card, the user places his smart card into the PCMCIA slot. The PCMCIA slot has a set of electrical contacts that are positioned in the slot so as to not interfere with entry or exit of a PCMCIA card but so as to contact the contacts on the back side of a smart card. These contacts are coupled to a conventional contact type smart card interface circuit 512. This interface circuit sends data to and receives data from the smart card at whatever signal levels and format are used by the smart card and in whatever communication protocol is used by the smart card. More precisely, the communication protocol is implemented as part of the software which controls operation of the microcomputer 320. This software queries the smart card to determine whether the balance of the user's bank account or some other prepurchased credit amount stored in the memory of the card is sufficient to cover the total charge for the user's current purchases. If it is, the software writes data to the smart card to cause it to debit the amount of the purchase from the balance on the card and then communicates the fact that the goods have been paid for to the host computer of the store by one of the communication paths described above.

In alternative embodiments, the PCMCIA slot of the PID can also accept smart cards which do not have contacts but which have embedded therein RF ID tags to store the balance data. FIG. 28 is a block diagram of such a card. The smart card 602 of FIG. 28 is extremely simple in that it only has embedded therein an RF ID tag 604 with all the circuit elements shown in FIG. 20. Since the function of the smart card is simply to store data indicating how much money the card carrier has available for purchases, and since the RF ID tag has such a memory and the circuitry to read and write it, there is no need for a microprocessor or other circuitry to be integrated on the smart card to read and write the memory. In the smart card 602 of FIG. 28, the RF ID tag 604 is used to record the remaining balance and the microprocessor 320 of the PID does all the calculations.

Figure 29B:
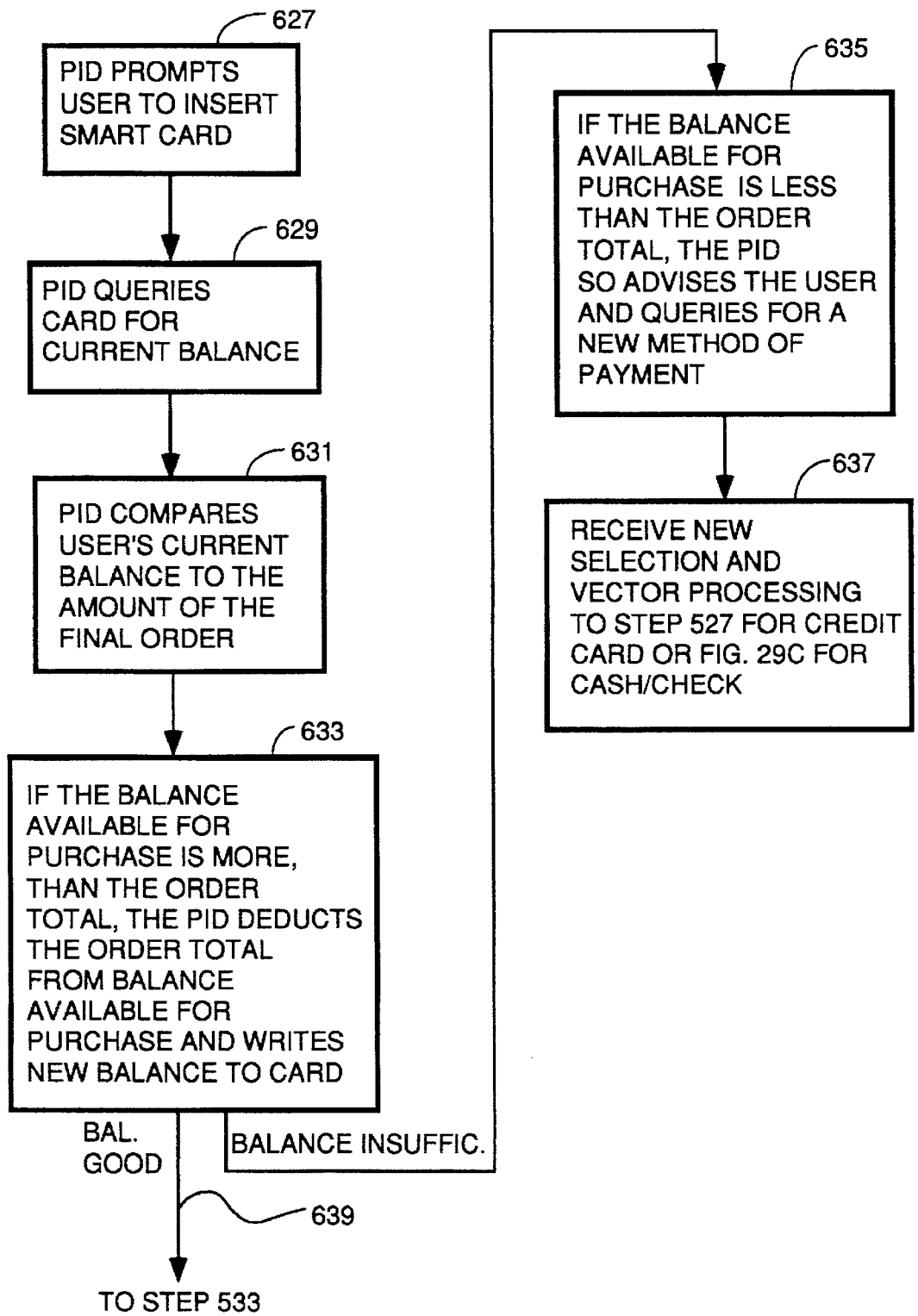
Figure 29C:
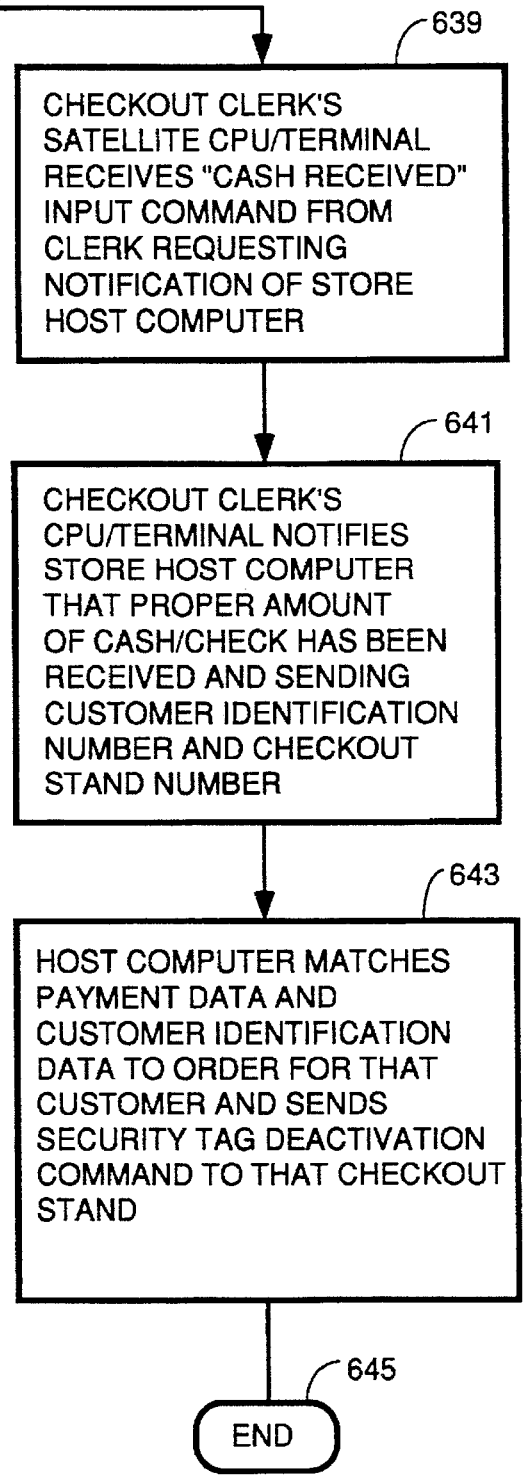

FIG. 29 is a flow chart of the process carried out in the PID by the application program that interfaces with the host computer 509 and by the application program in the host to interface with the PID and a credit card purchase authorization center. The first step in this process is receipt of some indication from the user that shopping is finished as symbolized by block 519. This can be any signal such as a touch at a specific place on the touchscreen displaying a "shopping finished?" query, docking the PID with a base unit at the checkout station, etc. Next, the identification codes of the items to be purchased read by the PID through the barcode scan engine or the RF ID tag interrogation circuit are downloaded to the host computer, as symbolized by block 521. Block 521 also represents the process of downloading the customer's identification data to the store host computer. The host computer then maps the product ID's to the current price for the product and generates an invoice with a total. The data of the invoice is then sent by the host computer 509 back to the PID 298 or a base unit into which the PID is plugged either by RF link 508 in FIG. 27 or through a LAN and LAN interface circuit plugged into the PCMCIA slot of the PID. The process of receiving the data describing the items purchased and their individual prices and the order total at the PID is symbolized by block 523. Block 525 symbolizes the process carried out by the PID of displaying the descriptions of the goods to be purchased and the order total on the touchscreen and/or printing the information received from the host computer. Block 525 also symbolizes the process carried out by the PID of querying the user for the type of payment or for any changes in the order. If the user desires to make no changes, he or she selects a mode of payment. If the user wishes to add or delete an item, a process similar to the process described in FIG. 35A, steps 605, 607 and 609 is carried out. The user then selects the method of payment by pressing one of four or more special display areas on the touchscreen labelled cash, check, credit card and smart card, and this selection is sent to the host computer, all as symbolized by block 540. If the user selected an option to pay the checkout clerk by cash or check, processing is vectored to the process symbolized by the flowchart of FIG. 29C carried out by the satellite CPU/terminal 501 in FIG. 27 operated by the clerk and the store's host computer. If user selected an option to pay by credit card, processing continues to block 527. If the user selects an option to pay by smart card, processing is vectored to the processing of FIG. 29B.

If the user elects to pay by credit card, the user places credit card 510 in FIG. 27 into the PID PCMCIA slot. The magnetic heads in the PCMCIA slot then read the magnetic strip on the back of the credit card. The magnetic strip card reader 512 in FIG. 19 then sends the data to microcomputer 320 where it is recorded in system memory 324, all as symbolized by block 527. This can be done preferably by sending the card data to the base unit 312 via the infrared transceiver 440 in FIG. 19 and from there via a LAN interface or RF link built into the base unit to the host computer. This leaves the PCMCIA slot free to read the card. In other embodiments, the card data is sent to the host computer via a LAN interface or RF LAN link to the host computer built onto a PCMCIA card, all as symbolized by block 529.

After, the data read from the card is then sent to the host computer 509 in FIG. 27, it is used by the host to automatically initiate contact with a credit card purchase authorization center by modem or direct link as symbolized by block 531. The host computer sends the order total and the merchant identification number to the authorization center and receives back an authorization code as symbolized by block 533.

In alternative embodiments, the user can swipe his or her card through a card reader on the terminal of the checkout clerk and the checkout clerk or the card reader can initiate the transaction with the card processing center seeking purchase authorization. This process is also symbolized by block 531, and, in this embodiment, blocks 527 and 529 may be eliminated and block 531 should be rewritten to indicate that the clerk's card reader located at the checkout location initiates the credit card purchase authorization call.

If the user selected payment by smart card in step 540, the processing of FIG. 29B is performed. First, the PID prompts the user to insert a smart card in the modified PCMCIA slot 300 of the PID. As noted earlier, the PCMCIA slot 300 has been modified to not only include magnetic heads for reading magnetic strips on credit cards, but also includes a set of electrical contacts to contact the electrical contacts on the back side of conventional smart cards. Step 627 symbolizes the process of checking the PCMCIA slot for the presence of a smart card, and if no card is present, displaying a prompt on the touchscreen asking the user to insert the card.

Block 629 represents the process carried out by the PID of querying the smart card for its current balance. In the preferred embodiment, this is done by the conventional electrical contact smart card interface 514 in FIG. 19 under control of the microcomputer 320. In an alternative embodiment, if the smart card has an RF ID tag embedded therein which stores the account balance, the smart card will be queried by a noncontact smart card interface 517 in FIG. 19. This interface is a radio frequency transceiver like the RF ID tag reader/writer interface 314 but on the frequency of the smart card. In alternative embodiments, the noncontact smart card interface 517 can be combined with the RF ID tag reader/writer interface 314, and if the smart card RF ID tag and the RF ID tags on the items to be purchased are on different frequencies, the microcomputer 320 can send a command to the RF ID tag transceiver 314 to cause it to switch to the appropriate frequency before interrogating the RF ID tags in the items to be purchased or the RF ID tag in the smart card.

Block 631 represents the process carried out by the PID of receiving the current balance available for purchases data transmitted to it by the smart card either from the RF ID tag embedded therein or through the electrical contacts and comparing this balance available for purchases to the order total. If the order total is less than the balance available for purchases, step 633 is performed to deduct the order total from the balance available for purchase and writes the new balance data to the smart card via smart card interface 514 or 517. If the balance available for purchase is insufficient, process is vectored to block 635. If the balance available for purchase is sufficient, path 639 is taken to step 533 on FIG. 29A where the host receives a "payment received" signal from the PID and generates a security tag deactivation signal.

If the balance available for purchase is less than the order total, block 635 is performed by the PID to advise the user of an inadequate balance and query for a new method of payment. This is typically done by displaying on the touch-screen of the PID a message saying "inadequate balance, please select a new method of payment" and displaying areas on the touch screen that can be touched to select credit card or cash/check. Block 637 represents the process of receiving the user's selection of a new method of payment and vectoring processing to the right place. In the case where the user has selected payment by credit card, processing is vectored to block 527 in FIG. 29A. If the user has selected cash or check, processing is vectored to the processing of FIG. 29C.

Referring to FIG. 29C, there is shown a flowchart which represents the process carried out by the checkout clerk's terminal or satellite CPU 501 in FIG. 27 and the store host computer 509 of receiving an input signal from the clerk that the customer has paid for the order with cash or a check and sending a signal deactivating the security tags. Block 639 represents the process in the clerk's terminal or satellite CPU of receiving a command from the clerk indicating that cash or an approved check has been received and requesting that the host computer be notified of this fact. Block 641 represents the process carried out by the clerk's computer/terminal of sending notification to the host computer 509 that the proper amount of cash or a check for the proper amount has been received by the store and the amount of cash or check received. Block 641 also represents the process of sending the customer's identification number and the checkout stand number to the host computer for matching the payment data to the order number and order total and for informing the host computer where the security tag deactivation command should be sent. The clerk can enter the customer number manually or obtain it from the PID through the PID's link to the host computer through the local area network of the store or through the PID's linkup to the checkout clerk's computer/terminal 501, depending upon the embodiment. In FIG. 27, the lightning bolts 643 represent an embodiment where the PID is coupled to the clerk's terminal/computer 501 directly and from there to the host computer. Lightning bolts 643 represent either a hardwired connection via a serial or parallel data port in the PCMCIA slot of the PID, a LAN connection to the host and indirectly to clerk's computer/terminal 501 or a simple radio link between an RF ID tag in the PID storing the customer's customer ID number and an RF ID tag interrogator in the clerk's computer/terminal 501.

Block 643 in FIG. 29C represents the process carried out in the host computer of matching the payment data and customer identification data to the pending order, and if a match is found and the amount received is correct, the host computer sends a security tag deactivation signal to the security tag deactivation circuit 518 in FIG. 27 located at the checkout stand where the customer made the payment. This command causes all the RF ID tags to be written with data indicating the item has been paid for and causes all magnetic security tags to be demagnetized. Processing is then vectored to the end routine which readies the store host computer and clerk's CPU/terminal for the next customer.

Once the goods have been paid for by whatever means, the host computer of the store then sends a command to a security tag deactivation circuit 518 at the checkout station to transmit a security code 520 to the RF ID tags on the goods in the basket to disarm them. The RF ID tags receive this security code and change security data stored therein so as to respond differently to a security query than they otherwise would. The security tag deactivation circuit 518 also includes a magnetic pulse generator that demagnetizes magnetized security tags such as tag 507 so that they will not set off security alarms at the store exits. The process of sending the security tag deactivation signal to the security tag deactivation circuit 518 via data path 526 in FIG. 27 is symbolized by block 533.

Security tag deactivation is done as follows. Typically, the purchased goods are placed in shopping bags such as bag 522 as the checkout clerk is waiting for the purchase authorization code to be obtained. These bags are placed in a well in the security tag deactivation circuit. When the clerk is done bagging, he so indicates by entering a code to the computer which then sends a signal via data path 526 to the security tag deactivation circuit 518 to deactivate the security tags if the host has either received a purchase authorization code or the clerk indicates via his terminal that cash or check has been received. The security tag deactivation circuit 518 then generates a magnetic pulse to demagnetize all magnetic security tags and then sends the security code to all RF ID tags although this can also be done while the goods are still in the basket also. To prevent RF ID tags in baskets in line behind the shoppers basket from replying to the product identification code inquiry or from being deactivated, the cart currently in the checkout process can be shielded from carts in front of it and behind it in some applications by pushing it into a checkout area which has RF shielding built into the walls thereby preventing stray inquiry and security deactivation transmissions from reaching tags on products not currently being checked out. However, in the preferred embodiment, the transmission power of the RF ID tag reader at the checkout station is lowered so that only RF ID tags within a small effective range reply to the interrogation signals and RF ID tags outside this range do not receive enough power from the transmitter to activate. The effective range is set so as to not include carts ahead of or behind the cart being checked out.

The exits of the store have a security portal 516 which can detect any magnetized security strips that pass therethrough in a still magnetized state. The security portal also has a motion detector to detect when anything is moving through the portal and an RF ID tag security interrogation circuit which generates an RF signal that interrogates any RF ID tags passing through the portal. Any RF ID tag on an item that has not been paid for returns a code to the security portal 516 in response to the security authentication transmission which sets off an alarm and/or notifies the host computer via signal line 524. In the preferred embodiment, the RF ID tags attached to products will have a Turn Off command in their instruction set which will be invoked when the goods are paid for. In these embodiments, the security portal will interrogate all RF ID tags passing through the portal and will notify security if any reply is received. In another alternative embodiment, each RF ID tag will store its own serial number of that RF ID tag, and the PID will download the tags serial number in addition to the product class code or serial number of the product to which it is attached. These tag serial numbers will be downloaded to the host computer which will send them to the security portal. The security portal then interrogates all tags passing therethrough and asks for their tag serial numbers. The replies are then compared to the serial numbers of the tags that have been paid for to determine if there is any variance.

Figure 30:
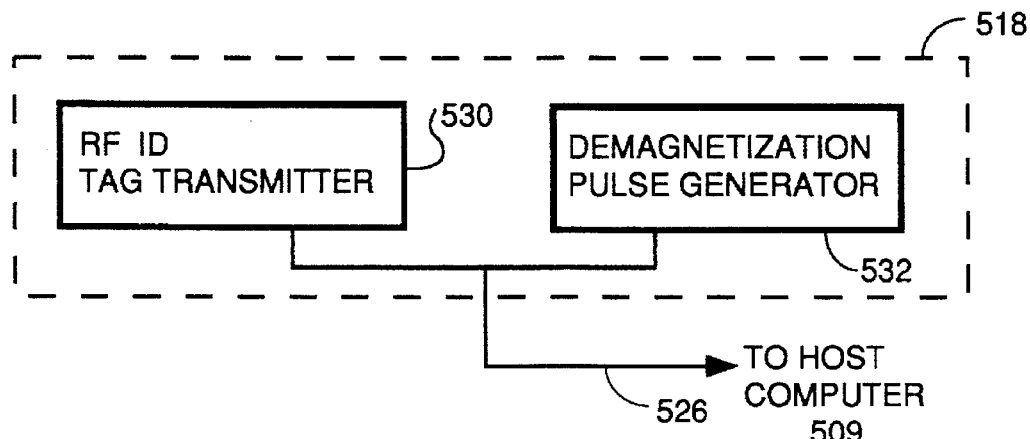
FIG. 30 is a block diagram of a security tag deactivation circuit.

Referring to FIG. 30, there is shown a block diagram of the security tag deactivation circuit 518 in FIG. 27. This system is comprised of an RF ID tag transmitter 530 and a demagnetization pulse generator 532, both under control of host computer 509.

Figure 31:
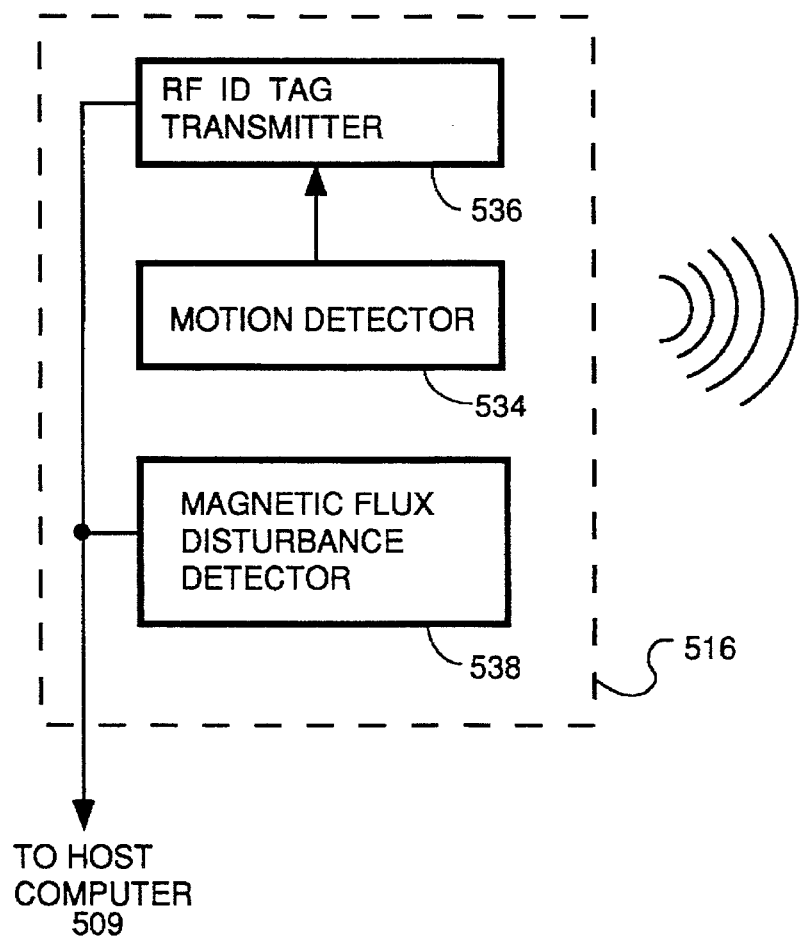
FIG. 31 is a block diagram of a security portal for use at the store exits for a store using the PID method of shopping.

Referring to FIG. 31, there is shown a block diagram of the security portal 516. This unit is comprised of a conventional motion detector 534, which may be of the ultrasonic or infrared type, and an RF ID tag transmitter 536. The system also comprises a conventional magnetic flux disturbance detector of the type currently used in security portals of retail outlets that use magnetized security tags.

Figure 32:
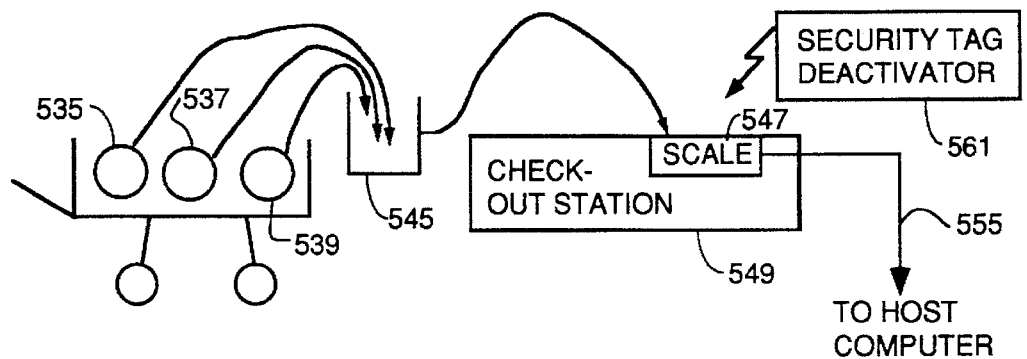
FIG. 32 is a block diagram of a method of using PID's for shopping and implementing security via weighing the total order.
Figure 33:
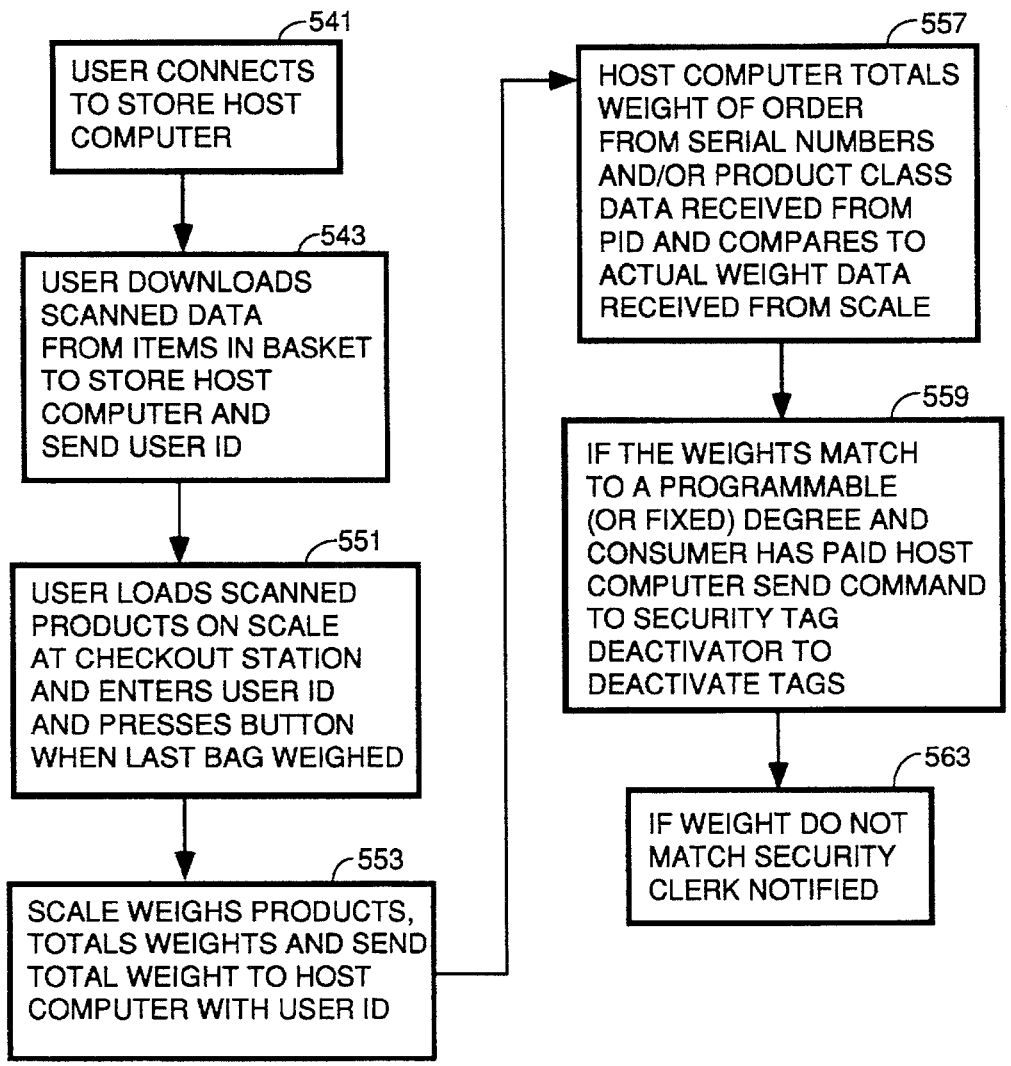
FIG. 33 is a flow diagram of the security method carried out by the PID and host computer using weight of total order verification.

An alternative security method is illustrated in FIG. 32. In this method, the weight of the items in the basket is used as an indicator as to whether all items in the cart have been paid for. In this method, the items in the cart to be purchased, represented by circles 535, 537 and 539, all have RF ID tags embedded therein or placed thereon in a permanent fashion. Hopefully, each item will have been scanned by the PID as the user places them in the cart. Each RF ID tag records in its memory not only the product identification code identifying the class that the product belongs to but also a serial number of the particular item. For items of uniform weight, the product ID is enough, but for items of unique weight such as packages of meat, frozen turkeys, produce, clothing items, hardware, tools, batteries, etc., the serial number will be mapped in the memory of the host computer to the specific weight of that particular item. The scanned information gathered by the PID about the particular items the user wishes to purchase and downloaded to the host computer of the store will include both the product ID's as well as the serial numbers of the particular items to be purchased. The method carried out by the PID and host computer to carry out this security method is as shown in FIG. 33. First, the user connects to the store host computer in block 541. This can be done either by docking the PID with a charging unit that has either a hardwired or RF connection to the host LAN or by a LAN connection which is either RF or hardwired through a PCMCIA interface circuit in the PCMCIA slot of the PID. PCMCIA form factor hardwired and RF LAN interface cards are known, and the details thereof are hereby incorporated by reference. Once the connection is established to the host computer, the user downloads the data gathered from the RF ID tags of the items scanned in the step symbolized by block 543.

The user then loads the products from his cart into a bag or other container 545 and loads the bag on an electronic scale 547 at the checkout station. The user also enters his user ID number on a keyboard (not shown) at the checkout station 549 and presses a button to cause the scale to weigh the bag and another button to tell the scale when the last bag has been weighed. This process of loading the scanned products in bags on the scale 547, entering a user ID number and pressing the button when the last bag has been weighed is symbolized by block 551. When the button for the last bag has been pushed, the scale 547 totals the weight of the order and sends the total to the host computer via LAN or direct connection 555, as symbolized by block 553.

Block 557 symbolizes the process where the host computer calculates the total weight of the scanned items by using the product serial numbers and/or product class data received from the PID and compares this weight to the actual weight data of the items in the bags placed by the user on the scale 547 sent to the host by the scale.

Block 559 represents the process of making the determination in the host computer if the weight of the order calculated from the serial number and product class data is close enough to the actual weight. If it is, the consumer has been honest, and the host computer can send a command to a security tag deactivation transmitter 561 to deactivate the security tags as soon as the user pays for the goods. Payment is then processed as in earlier described embodiments. Once the host computer is satisfied that the user has paid for the goods, the host computer sends a command to the security tag deactivator 561 to deactivate the security tags. The transmitter sends a transmission to the RF ID tags on the products in the bags to cause them to alter the data stored in their internal nonvolatile memories to indicate the goods have been paid for. The entry and exit ports of the store all are equipped with security portals like the portal 516 (although no magnetic disturbance detection circuitry is necessary). As the consumer passes through the portal, the RF ID security tags are queried, and if any returns a signal that it has not been paid for, an alarm is sounded and a security guard stops the consumer.

If the process of block 559 indicates a mismatch in weights has been found, the host computer sends a message to alert a security clerk at the checkout stations to request an audit of the contents of the bags. The host computer also sends an itemized list of the items that have been scanned and downloaded to the host by this user for use by the security clerk. The security clerk audit message and sending of detail data is symbolized by block 563.

Figure 34:
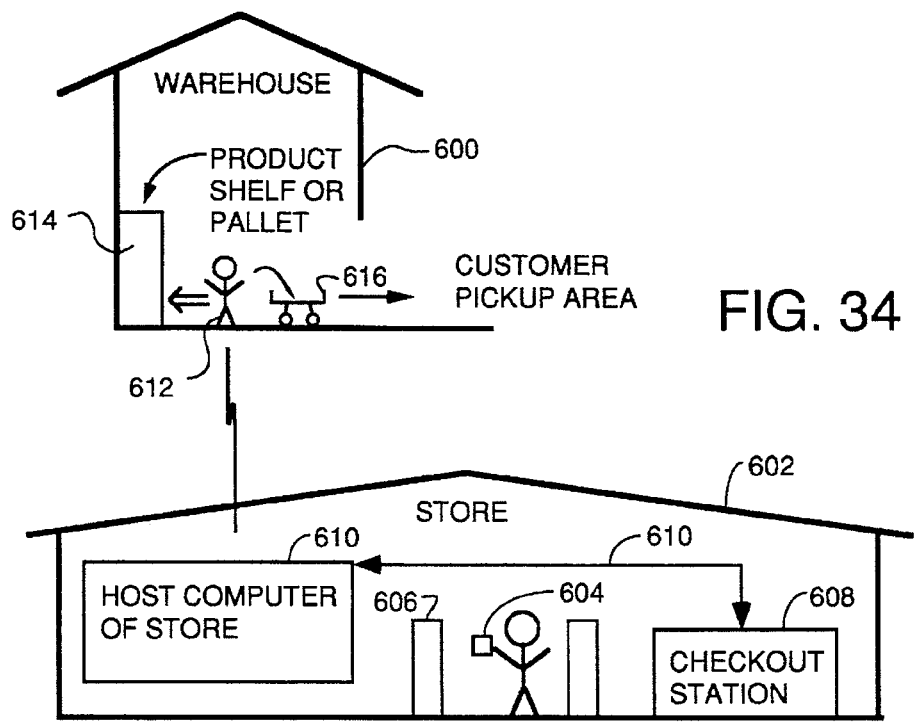
FIG. 34 is a diagram of a method of shopping using PID's and having the store bag the purchased items for the customer to implement another form of security.

Referring to FIG. 34, there is shown a symbolic diagram of how the PID disclosed herein can be used to implement an entirely new form of shopping that cuts down on store labor requirements. In this form of shopping, the customer does not pick and place his or her own groceries in a shopping cart as this is done for the customer in an inventory storage warehouse 600. The customer enters a store 602 either with his or her own PID 604 or checks out a PID from a vending machine or recharging cradle which releases a PID when the customer places a valid credit card into a credit card reader on the machine. Such a machine is not shown in FIG. 34, but is known and in public use in the Netherlands by Dutch grocery company Royal Ahold.

In the Royal Ahold system, as described in a January 1995 article in IDSystems at page 76, a customer enrolls with the store, presumably to have various background checks made on the honesty and credit worthiness of the customer. If the customer is invited to join the program, the customer is issued a magnetic stripe card for use when the customer enters the store. This card is used to access a handheld barcode scanner device from a dispenser. The dispenser is linked to the store computer and downloads the identity of the customer and the serial number of the scanner provided to the customer from the dispenser. As the customer shops, he or she scans the items on the shelves that the customer wishes to purchase and places them in his or her shopping cart. A plus button is pushed on the handheld scanner each time an item is scanned. A minus sign button allows the user to delete an item from an order. A button with an equals sign provides a display of the current order total. When finished shopping, the customer returns the handheld scanner to the dispenser which generates an itemized barcoded receipt. Then the barcoded receipt is taken to a special checkout area where a scanner reads the barcodes and uses the information to look up the order total so that payment can be collected.

Figure 35A:
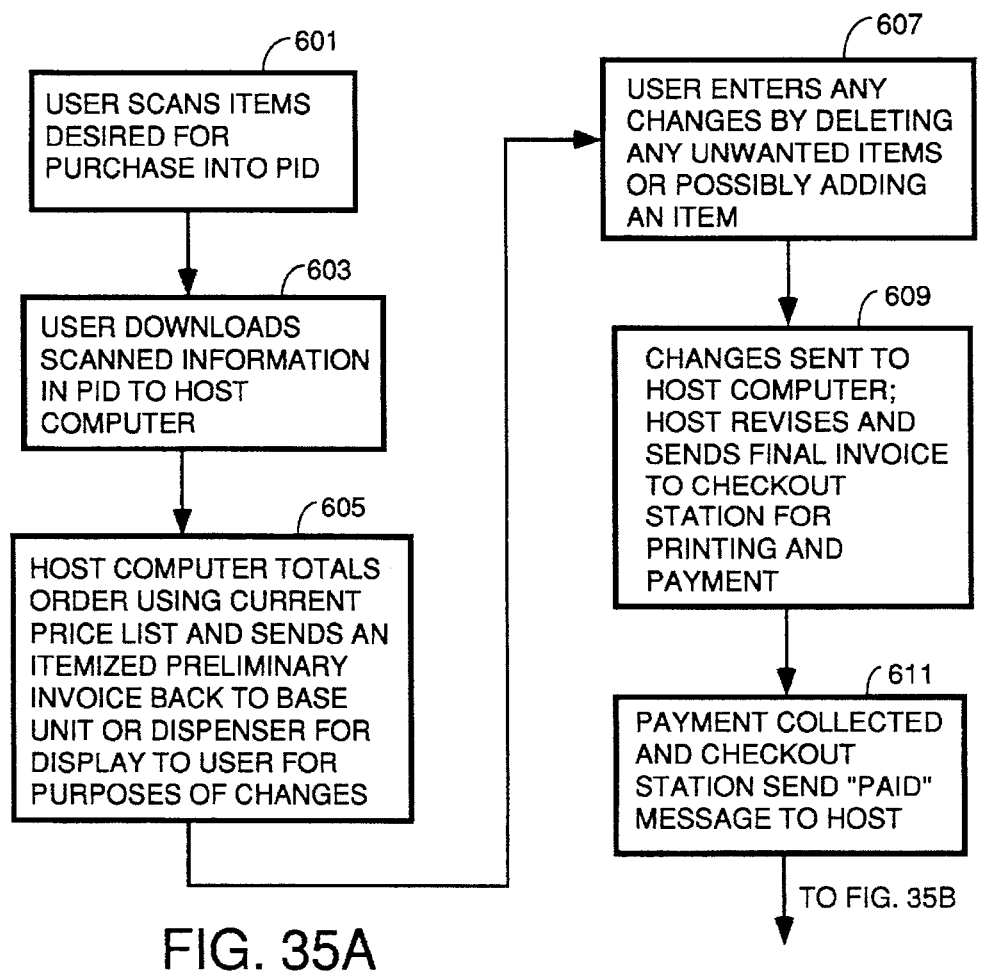
FIGS. 35A and 35B are a flow chart of the process carried out by the PID, store host computer and a satellite computer at the bagging location to implement the method of security shown in FIG. 34.
Figure 35B:
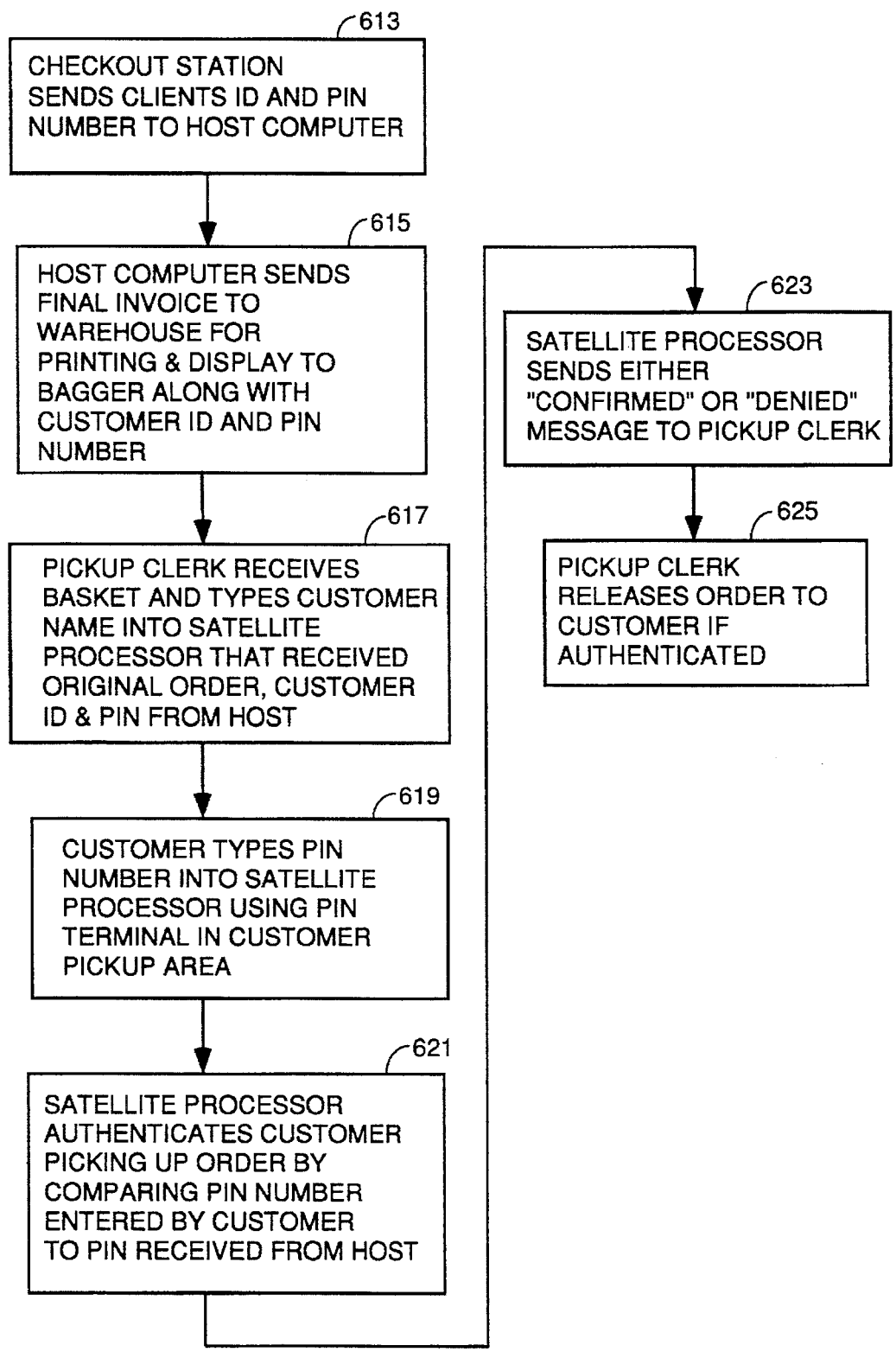

Referring to FIGS. 35A–35B, there is shown a flow chart of the processing which occurs in the computer system which supports this new method of shopping. Discussion of FIGS. 35A–35B will be simultaneous with the discussion of FIG. 34.

Returning to the consideration of FIG. 34, after the consumer has obtained a handheld scanner, the consumer uses the scanner to gather data about the items the user wishes to purchase. Typically, the store will have shelves 606 upon which one item of each category is placed for scanning. Alternatively, the store can have pictorial and textual displays for each product on the shelves 606 with barcode information identifying the product on each display. Each display can also have an RF ID tag attached thereto for loading information to the PID upon being interrogated thereby. The customer will stroll down the aisles and study the displays and either scan the barcode on any display of a product he wishes to purchase or interrogate the RF ID tag on the display. This selection process is symbolized by block 601 in FIG. 35A. Alternatively, the user can use one of the pre-stored shopping lists or a custom designed shopping list which is displayed on the display of the PID as a checklist for scanning needed items.

In the case of an RF ID tag on a product display, each display will have an RF shield around it to prevent other RF ID tags from replying to the inquiry. To scan the item, the user places the PID inside the RF shield and gives the interrogate command.

In the case where the user already has a shopping list made out and does not care to browse, the entire shopping list can be recalled from a database in the PID of items previously scanned in that store on previous visits. The entire shopping list can then be downloaded into the base unit and then to the host without wasting time walking around in the store. This has the potential to save large amounts of time for busy consumers.

Once the user has scanned all the items that are to be purchased, the user goes to a checkout station 608 and docks the PID and downloads all scanned information to the store's host computer 610 as symbolized by block 603. In the preferred embodiment, the customer docks the PID with a base unit 312 at the checkout station 608 and then downloads the scanned information into the base unit via the infrared link previously discussed. The base unit then downloads the scanned information to the host computer via a local area network link or an RF link as symbolized by data path 610. Alternatively, the customer can return the PID to a dispenser unit at the checkout station 608 which then downloads the scanned information to the host computer, all as symbolized by block 603.

The host computer totals the order and generates an itemized, electronic preliminary invoice and sends the information back to the base unit or dispenser for display to the user for any necessary changes, all as symbolized by block 605. The user then enters any changes by deleting items from the list or possibly adding some items, all as symbolized by block 607. Items can be deleted by highlighting the item using a pointing device such as a light pen, touchscreen or mouse. If the user wishes to add an item, an add command is given by touching a particular area of the display. The user is then presented with a display of the broad categories of products, e.g., breads, dresses, tools, fruits and vegetables, cleaning products, jams and jellies, etc. The user then picks an area and a submenu of more narrow categories is displayed. After a subcategory is picked, or if the general area is not broad enough to warrant subcategories, a list of items in the selected category and subcategory are displayed. The user then highlights the desired item and gives an add command to the base unit or dispenser at the checkout station. The item is then added, and the user is queried as to whether any other items are to be added. If not, the user so indicates, and the changes are sent to the host computer for revision of the invoice and final order totalling. The final invoice with changes incorporated is then sent by the host computer to the checkout station 608 for printing and payment by the customer, all as symbolized by block 609.

Payment for the order is then collected in one of the manners described above with reference to FIGS. 29A, 29B or 29C, and the checkout station sends a "paid" message to the host computer, all as symbolized by block 611.

Block 613 of FIG. 35B represents the process of the checkout station sending the customer's identification data (name) and PIN or personal identification number to the host computer via the data path 610. This data is needed by the host computer for transmission to the warehouse for use in authenticating the customer when the customer picks up his order.

The host computer then sends the final invoice to the warehouse 600 for display to a bagger 612 and printing, as symbolized by block 615. The bagger retrieves the printed copy of the order or uses a video display (not shown) to pick the items on the order one by one from shelves or pallets, symbolized by block 614. The bagger then places the order in bags placed in cart 616 along with the printed invoice containing the customer name and an unprinted PIN number, and wheels the cart out to a customer pickup area where a pickup clerk receives the basket. The pickup clerk types in the name of the customer into a satellite processor which received the original order data, customer ID data and PIN number from host computer, as symbolized by block 617. The pickup clerk then calls for the customer and asks that the customer type his PIN number into a special PIN terminal in the customer pickup area coupled to the satellite processor, as symbolized by block 619. The satellite processor then authenticates the customer picking up the order by comparing the PIN number typed in by the customer to the PiN number received from the host computer, as symbolized by block 621. If the PIN numbers match, the satellite processor informs the pickup clerk by displaying an authentication message, or sends a denied message if the PIN numbers do not match, as symbolized by block 623. If the customer is authenticated, the pickup clerk releases the bags of groceries to the customer, as symbolized by block 625.

Figure 36:
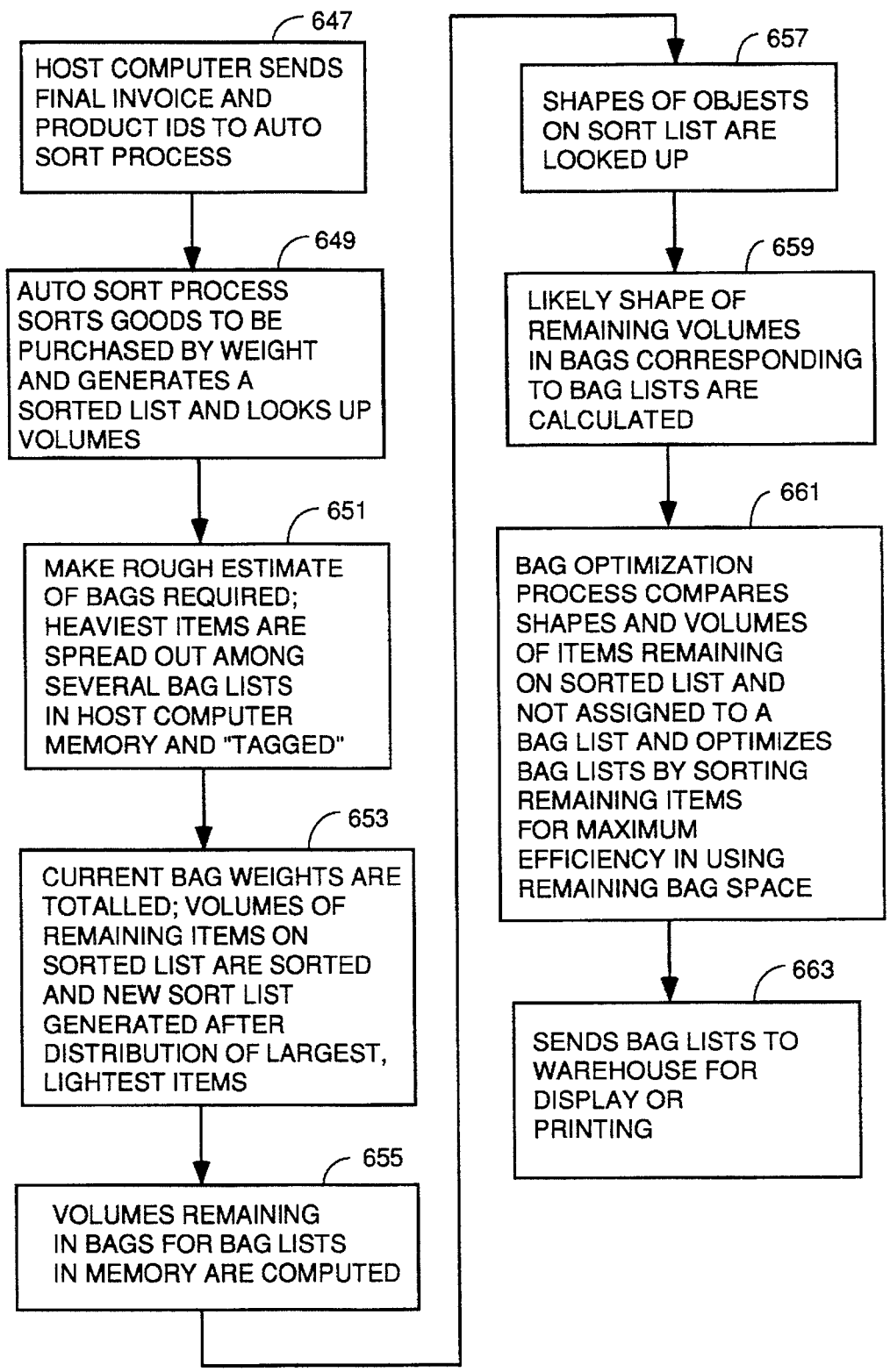
FIG. 36 is a flowchart of an autosort routine to maximize the efficiency of the use of the volume in the bags by placing heaviest items in the bags first and then doing a sort of Tetris game in comparing the volumes and shapes of the remaining items and trying combinations that will maximize the efficiency of use of the bag volume.

Referring to FIG. 36, there is shown a flow chart of an automated sorting process to maximize efficiency in using space in the shopping bags used to pack the purchased items to reduce bag usage. The process of FIG. 36 starts out at block 647 with the host computer sending the final invoice and product identifications to the autosort process. The autosort process can be carried out either on the host computer or on the satellite computer at the warehouse location where bagging of the purchased items is to take place. Block 647 symbolizes getting the final invoice items to wherever the autosort process is to be carried out.

In block 649, the autosort process looks up the weights and volumes of all the items on the final invoice using their product identification codes and/or serial numbers downloaded from the PID. The list of items on the final invoice is then sorted by weight, and a sorted list of items ordered by weight is then generated, all of which is symbolized by block 649.

In block 651, the autosort process makes a rough estimate of the number of bags that will be required by totalling the volume of all items on the final invoice. A bag list is then started in memory for each bag to be packed based upon the estimate of the number of bags required. The sorted list generated in block 649 is then used to spread out the heaviest items among the bags on the bag list. This is done by spreading out among the various bag lists the product ID data for the heaviest items on the final invoice. The items assigned to bags are then "tagged" on the list sorted by weight with the bag numbers of the bags in which these items are supposed to go.

Block 653 represents the process of calculating the current bag weights to determine which bags are the heaviest so far with the heaviest items distributed by the process represented by block 651. Then the list sorted by weight in the process represented by block 653 is modified by removing therefrom the items already distributed to the various bag lists. Block 653 also represents the process of using the volumes of the remaining items on the newly modified list sorted by weight which are not already assigned to bags and resorting the list in ascending order using as a sort key an index calculated by multiplying volume times a volume weighing factor times the weight times a weight weighing factor. The weighing factors are selected so that the resulting sorted list will have the largest, lightest items first and the smallest, heaviest items last. The purpose behind this extra sort is to avoid concentrating too much weight in one bag simply because that happens to be the most efficient use of the bag volume. To achieve this end, block 653 also represents the process of distributing the largest, lightest items from the index sort list to the bag lists having the heaviest weight. The distribution is such that the largest, lightest item is distributed to the heaviest bag, the next item on the index sort list is distributed to the next heaviest bag and so on until some user programmable (in some embodiments, the number can be fixed) number of additional items has been added to each bag list. After the largest, lightest items are distributed in this manner to the bag lists, the items so distributed are removed from the index sorted list, and the remaining items on the list are used as the new sort list for purposes of processing in block 655.

Block 655 represents the process of computing the volumes remaining in the bags on the bag list using the known volumes of the bags and the volumes of the items distributed to each bag list. In some simple embodiments, the volumes of the items on each bag list may be totalled and subtracted from the bag volume. In more complicated embodiments, the shapes of all items on each bag list can be looked up and a 3-D model of the contents of the bag built in memory followed by a calculation of the remaining volume in each bag.

Once the remaining volumes in each bag are calculated, the process of block 657 is performed. This process looks up the shape of each object remaining on the sorted list generated in block 653 and prepares them for the modelling process to be performed represented by block 661. The process of block 659 calculates the likely shapes of the remaining volumes in the bags on the bag list based upon the shapes of the objects already distributed to the various bags on the bag list. Finally, the modelling process of block 661 tries various combinations of the items on the list of remaining items to be assigned to the bag lists based upon their shapes more or less like an automated Tetris game to try to optimize use of the remaining bag space. More precisely, the bag optimization process compares the shapes and volumes of the items remaining on the list that have yet to be assigned to a bag list and builds 3-D models trying to optimize bag lists by sorting the remaining items to the various bag lists based upon a criteria of maximum efficiency in using remaining bag space. The bag optimization process then sends the optimized bag lists to the warehouse or bag packing location for display and/or print for use by baggers in retrieving the purchased goods and placing in the bags in the order stated on the bag lists, as symbolized by block 663.

Figure 37:
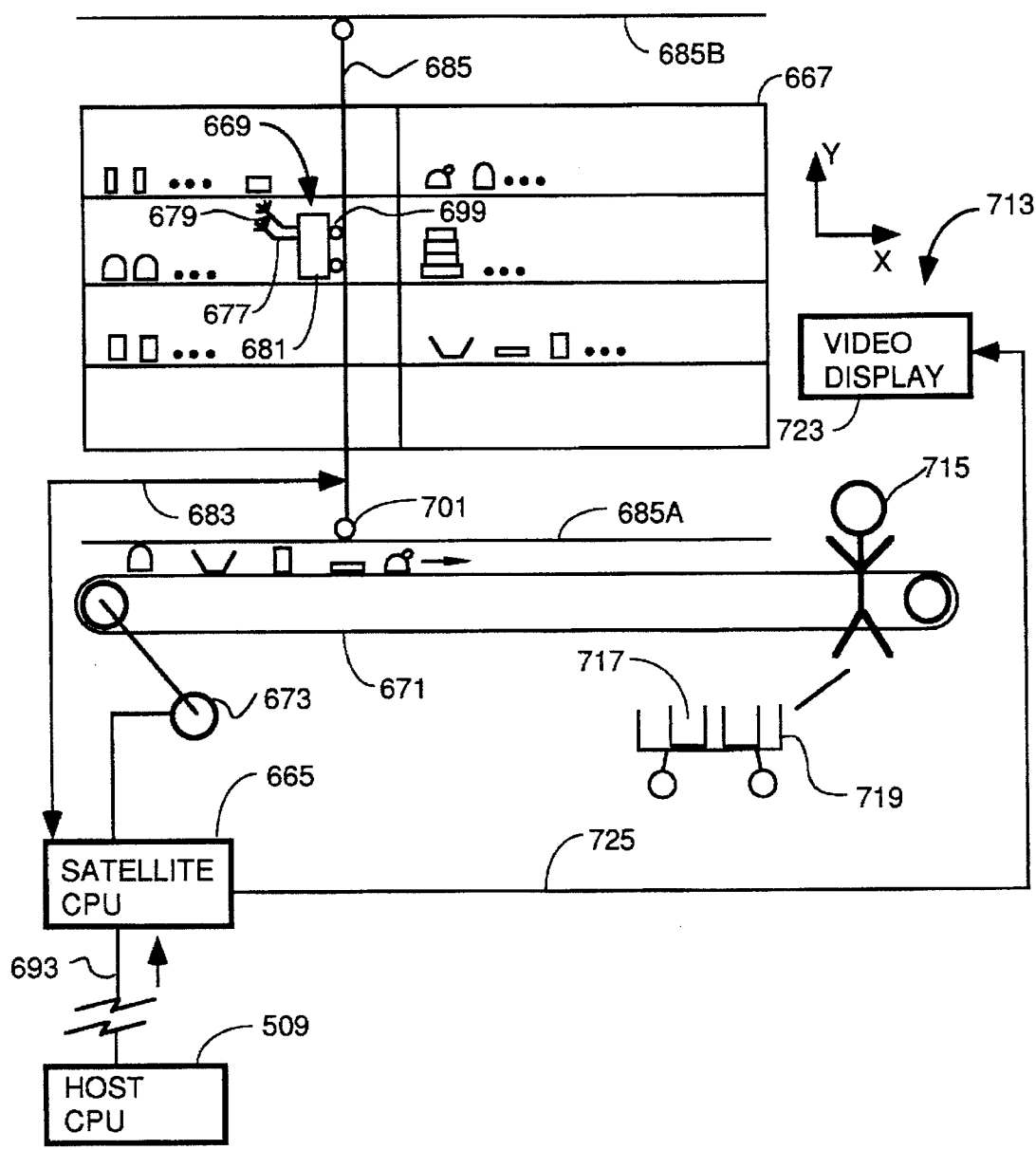
FIG. 37 is a diagram of a way of bagging purchased items that have had the bag volumes optimized, bagging being done by store personnel or a robot mechanism.
Figure 38:
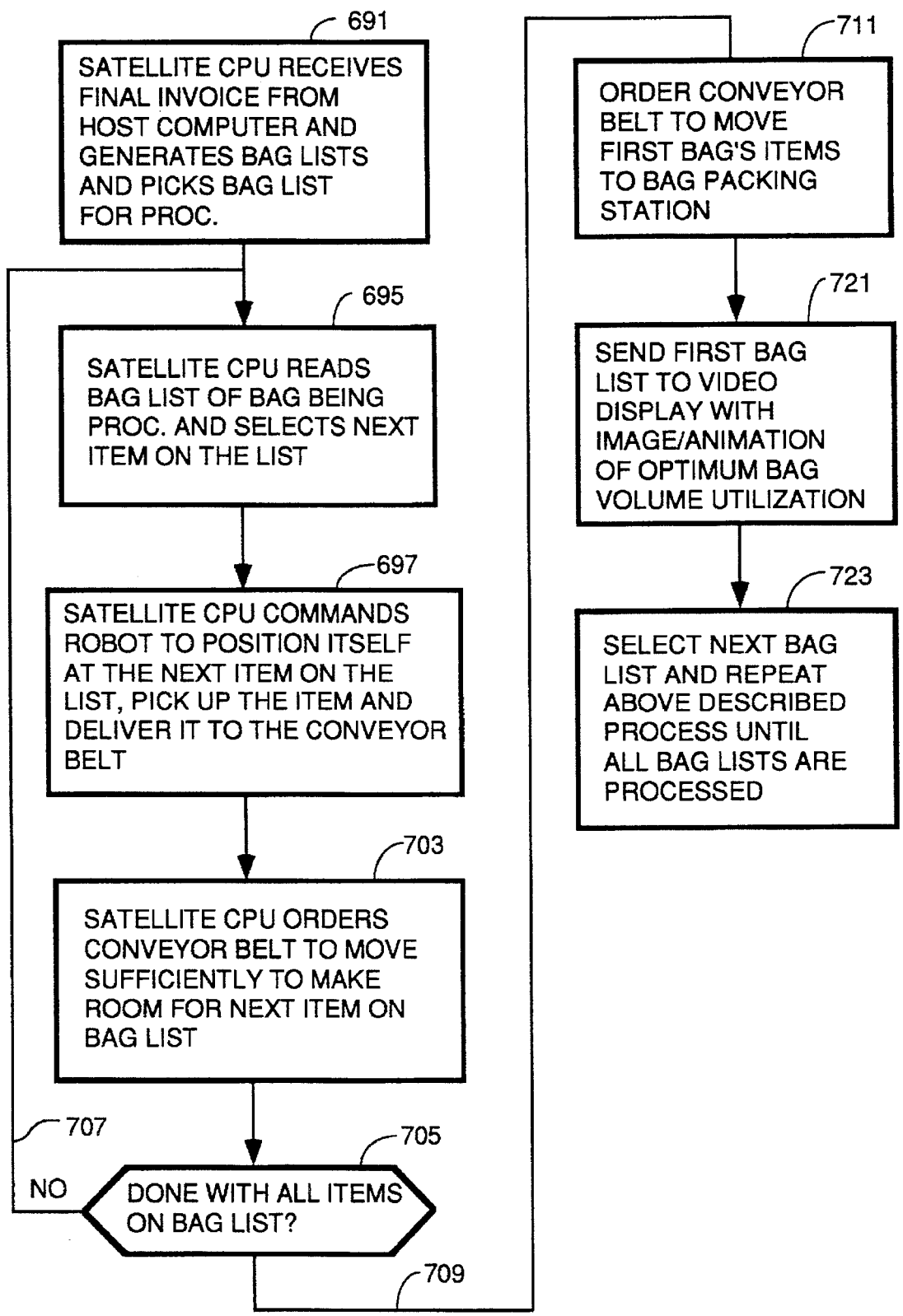
FIG. 38 is a flow chart of the process represented by FIG. 37 and carried out by a robot that using optimized bag lists to take items off shelves in the proper order and deliver them to a person or another robot for bagging.

Referring jointly to FIGS. 37 and 38, there is shown, in FIG. 37, a semi-automated bagging apparatus, and, in FIG. 38 a flow chart of the process carried out by a satellite CPU 665 in FIG. 37 to implement a semiautomatic bagging process. In FIG. 37, the goods in the store inventory are stored on an array of shelves 667 or in bins. The shelves or bins are within range of a computer controlled robot picker 669. The purpose of the robot picker is to pick up items off the shelves under control of the satellite CPU 665 and place the items on a conveyor belt 671 for delivery to a bagging station 675. The conveyor belt 671 is driven by motor 673 which is under control of satellite processor 673 although in some embodiments, the conveyor can simply run continuously with no computer control or its movements can be controlled manually.

In the embodiment shown, the robot picker 669 is shown as a pair of robot arms 677 and 679 driven by a control mechanism 681. In alternative embodiments, the robot mechanism can be eliminated, and each type of product in inventory can be stored in a bin with an eject mechanism designed to dispense one item at a time onto conveyor belt 671 under control of the satellit processor 665. The eject mechanisms can be similar to the types of mechanisms used in vending machines but scaled to the proper size and engineered to take into account the delicacy of the product. For example, the delivery mechanism for the egg bin may be substantially different from the delivery mechanism for the canned peaches bin. For example, the delivery mechanism for the egg bin may be simply another smaller conveyor belt that moves egg cartons out over the main conveyor belt 671 and gently slides them onto the conveyor belt 671. The delivery mechanism for the canned peaches may a pneumatic tube that shoots cans of peaches onto the belt 671 like torpedoes with a suitable velocity or other control mechanism such that the cans do not bounce off the belt.

The control mechanism 681 is coupled to the satellite CPU 665 by data path 683, and rides up and down the Y axis along vertical rail 685. The vertical rail rides horizontally along a pair of rails 685A and 685B. The vertical movements of the control mechanism 681 along rail 685 and movements along of the vertical rail 685 along the horizontal rails 685A and B are controlled by satellite CPU 665. The satellite CPU also controls the movements of the robot arms 677 and 679 to pick up an item of merchandise from the shelves after the robot has moved to the position of the item on the shelves.

Processing of the system shown in FIG. 37 is as follows. In FIG. 38, block 691 represents the process of the satellite CPU 665 receiving the final list of items to be purchased on the final invoice from the host computer 509 via data path 693 and generating the bag lists and then selecting a bag list for processing. The bag lists are generated in the manner described in the flow chart of FIG. 36 or in any other process of optimizing the efficiency of usage of the volume of the bags. In alternative embodiments, the bag lists may be generated by the host computer and sent to the satellite CPU.

In block 695, the satellite CPU reads the bag list for the bag currently being processed and selects the next item on the list. Block 695 is the first step in a DO loop that is repeated until all items on the bag list have been processed. The process of block 695 starts with the heaviest item on the bag list the first time through the DO loop as the heaviest item will be the first item on the bag list. It is desirable to place the heaviest item first on the bag list so that it goes in the bottom of the bag so as to not crush lighter items below such as loaves of bread, eggs etc.

Next, block 697 is performed where the satellite CPU commands the robot 669 to position itself at the position on the shelves of the next item on the bag list (the item selected in block 695 for the current pass through the DO loop). To do this, the satellite CPU looks up the coordinates on the shelves of items of the type currently being processed and generates suitable X and Y axis translation commands and sends them to motor controllers driving wheels 699 and 701 so as to cause the robot to be positioned at the location of the stock of items of the type currently being processed. Block 697 also represents the process carried out by the satellite CPU of generating suitable control commands to the robot 669 to cause it to pick up an item of the type currently being processed and place it on the main conveyor belt 671. The details of how this is done are not critical to the invention and any conventional robot technology that can accomplish this task will suffice. Preferably, the robot will have machine vision capabilities to be able to locate an item of the desired type in the location where these type items are stored even though the stock is being depleted and the position of the next item to be picked up is changing. In alternative embodiments, a new item will be moved to a centralized pickup point at known coordinates within the space designated in the memory of the satellite CPU for items of that type each time an item of that type is removed from the storage area. In this way, the robot can be "dumber" and less expensive in that it need not have machine vision technology since it only needs to know one place from which pickups are made for each type item.

In block 703, the satellite CPU orders the conveyor belt 671 to move sufficiently to make room for the next item on the bag list to be deposited on the conveyor belt. In alternative embodiments, where the belt 671 is not under control of the satellite CPU 665, such as where it is moving at all times, step 703 may be eliminated.

Block 705 represents the process of testing to see if the satellite processor has caused the robot to pick up the last item on the current bag list being processed. If not, path 707 is taken back to the process of block 695 where the next item on the bag list is selected for processing. If the last item on the current bag list has been picked up, path 709 is taken to the process of block 711. Block 711 is a process wherein the satellite CPU generates suitable motor control commands to the motor controller for motor 673 to cause it to move the conveyor belt such the first bag's items are moved to the bag packing station 713.

In the embodiment shown in FIG. 37, a human bagger 715 stands at the bagging station and removes items from the belt 671 and packs them into bags such as bag 717 in cart 719. Block 721 represents the process by which the satellite CPU assists the human bagger in these duties by sending the first bag list to video display 723 with an image or animation of the optimum bag volume utilization developed by the autosort process of FIG. 36. Since the arriving items on belt 671 will be in the order in which they are to be packed in the bags, the video display, in the preferred embodiment, can be driven via data path 725 with an animation similar to the animation used in the Tetris video game showing the bagger how to place that item in the bag for greatest efficiency in using the bag volume. This display or animation can be triggered by an RF ID tag reader that reads the item's RF ID tag as the bagger removes it from the belt, looks up the serial number of the item in the bag list and its planned position in the bag and then generates an animation and picture of the bag in its current state of fill or in the planned filled state with the position and orientation of the item just picked off the belt highlighted. The animation or video display can take many forms and the details are not critical to the invention. In some embodiments, the video display and the picture of how the bag is supposed to be packed can be eliminated altogether, and the experience of the bag person can be relied upon to make the most of the bag volume.

Block 723 represents the process of selecting the next bag list and repeating the above described process until all bag list are processed. The bagger or another employee then rolls the filled bags in cart 719 out to the customer pickup area.

In an alternative embodiment, the human bagger 715 can be eliminated and a robot bagger substituted. The robot bagger can used conventional machine vision technology or the conveyor belt can be controlled using machine vision or some other known techniques such breaking of infrared beams across the belt so as to stop the belt when the item to be picked off the belt by the robot bagger is precisely located in the position the robot bagger is expecting to find the item. The robots used in automobile manufacturing are one example of the types of robots that could be used for the robot bagger.

Figure 39:
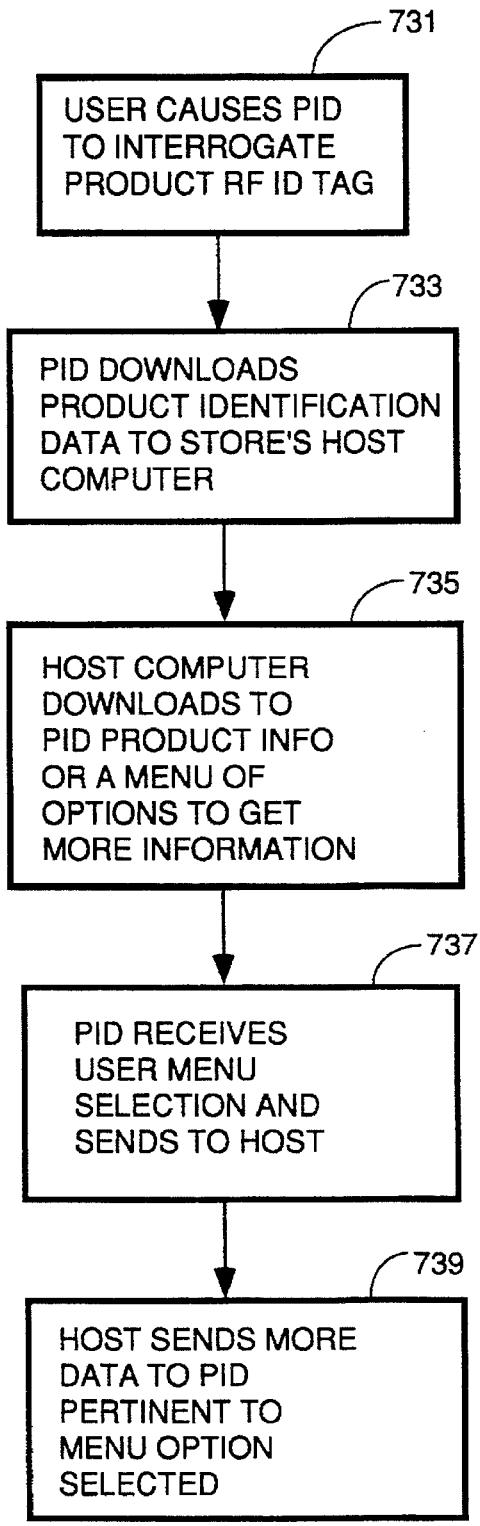
FIG. 39 is a method of shopping using PIDs' to obtain more information about a product from the store host computer.

Referring to FIG. 39, there is shown a flow chart of a process carried out by the PID (Personal Information Device) and host computer in support of answering user inquiries for more information about products they are contemplating buying. Block 731 represents the process carried out by the PID of receiving a command from a user to interrogate the RF ID tag of a particular product about which the user desires to have more information. For example, a user might be shopping for software and might want to know the compatibility, machine hardware requirements, capabilities etc. of a particular software program. Instead of having to rely on obtaining this information from a salesperson who may not know, may be misinformed or who may not be able to clearly communicate the desired information, the user may obtain the information directly from the store's host computer.

Interrogation of only the RF ID tag of the product in question as opposed to RF ID tags of products on the shelf next to it can be accomplished by lowering the transmit power of the RF ID tag reader 314 so that it can only read tags within a very short range, for example about 3 inches.

The user then removes the product from the shelf, holds it next to PID and gives the interrogate command. Any RF ID tag that is not within 3 inches will not receive enough power to operate and will not respond. In the preferred embodiment, the RF ID tag reader will have a command in its instruction set by which the microcomputer 320 in FIG. 19 can set its power.

After the PID interrogates the RF ID tag of the product in question, the PID downloads the product class and/or species identifier to the host computer in any known manner such as by direct serial or parallel connection, PCMCIA LAN connection, RF LAN connection, infrared LAN connection etc., all as symbolized by block 733.

Block 735 represents the process of the store host computer downloading to the PID product information about the product or a menu of options to get more information in various categories about the product. For example, the store host computer might download a menu that includes selections for "consumer safety information", "% of total calories from fat", "nutritional information", "other related products", "uses and manner of using" and so on. Block 737 represents the process carried out by the PID of receiving a user menu selection and sending this menu selection to the host computer. Block 739 represents the process of the host receiving the menu selection and sending more data to the PiD in the category corresponding to the menu selection. The PID can display this information on its touchscreen display or print it out.

In an alternative embodiment, a product information kiosk can be set up in a store so that customers can bring products about which they have questions to the kiosk to obtain more information. In this embodiment, the kiosk could incorporate an RF shield to prevent unwanted RF ID tags from responding. However, in the most inexpensive embodiment, the kiosk will be located sufficiently far from any other products in the store and the RF ID tag reader power will be set low enough such that only the tag on the product about which the user desires more information will reply. The kiosk will not only have an RF ID tag reader in it but will also have a video display and/or printer coupled to the store host computer by a local area network. In another alternative embodiment, the product information kiosk can contain its own computer that stores all necessary information thereby eliminating a connection to the store's host computer. In this embodiment, the process of FIG. 39 is carried out except the RF ID tag reader in the PID is not used and the RF ID tag reader in the product information kiosk is substituted. The user will typically bring the product to the kiosk or bring a small display card associated with the product with an RF ID tag encoded with the product's class and/or species information. The RF ID tag of the product or display card will then be read by the kiosk's RF ID tag reader, and the product information sent to the store's host computer or the computer in the kiosk. The desired information or a menu of categories for which more information is available is then displayed and/or printed in the kiosk.

Figure 40:
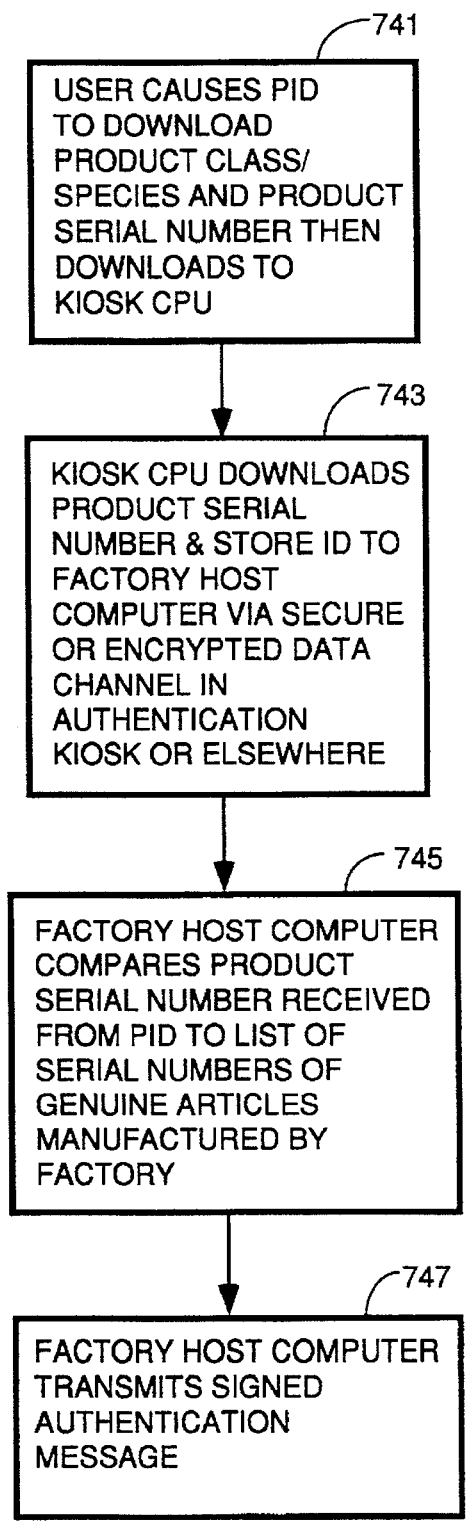
FIG. 40 is a flow chart of a process carried out by a PID, an authentication kiosk and a factory host computer of authenticating an item to be purchased as genuine.

Referring to FIG. 40, there is shown a flow chart for processing carried out by a PID, an authentication kiosk and a factory host computer to authenticate a pad or product which a user is contemplating buying as being not counterfeit. The problem of counterfeit goods has been on the rise. The counterfeit airplane pads business is so lucrative that many drug dealers are quitting the drug business to sell counterfeit airplane pads. This extremely dangerous since several plane crashes have been caused by failure of counterfeit pads such as bolts, turbofan compressor blades etc. In FIG. 40, a part which is available for purchase is placed next to the user's PID and an RF ID tag attached to or embedded in the product itself (or its secure packaging) is interrogated by the PID. That is, the user gives a command which causes the PID to interrogate the RF ID tag of the product and download the product class/species identifier and the product's serial number. Then the user takes the PID to an authentication kiosk in the store and downloads the product serial number from the PID to a computer in the kiosk, all as symbolized by block 741. In alternative embodiments, the user can simply take the product to be authenticated to the authentication kiosk and have the kiosk computer read the RF ID tag on the product directly.

Block 743 represents the process of the kiosk computer downloading to a factory host computer the product serial number (and possibly its class/species identifier) and the location of the store or other outlet to which the reply is to be sent by the factory host computer. This transmission is sent via a "secure communication means" (as that term "secure communication means" is used in the claims). The "secure communication means" can be either: (1) a secure data communication channel from the authentication kiosk or elsewhere to the factory host computer, or (2) a means of encrypting the serial number and store or other outlet ID information using a single key encryption algorithm and transmitting the encryption key to the factory host computer via a secure data communication channel in an authentication kiosk or elsewhere, and then transmitting the encrypted serial number data and store ID to the factory host computer via an unsecure data communication channel such as the public telephone network in an authentication kiosk or elsewhere, or (3) a means for encrypting the serial number and store or outlet ID information using a public key encryption scheme and then transmitting the public key and the enciphered serial number and outlet ID to the factory host computer using an unsecure data transmission channel in an authentication kiosk or elsewhere. Preferably, the public key encryption scheme is used as the "secure communication means" since this does not require a secure communication channel. Secure communications means of the three types named above are known and will not be discussed in great detail here. The details of how the secure communication with the factory host computer is made is not critical to the invention, and any secure communication mechanism will suffice to practice this embodiment. However, some discussion of the public key system will follow.

Block 745 represents the process carried out by the factory host computer. This process involves decrypting the received serial number and outlet ID data (or using the plain text message containing this data sent over a secure channel) and comparing the product serial number received from the PID to the serial numbers of all genuine articles manufactured by the factory.

Block 747 represents the process carried out by the factory host computer of transmitting a secure, "signed" authentication message back to the outlet ID identified in the secure message received from the PID. If a match is found between the serial number received from the PiD and the serial number of a genuine article, an "authenticated" message is sent back to the outlet ID listed in the secure message received from the PID via secure communication means. If no match is found, a "counterfeit" message is sent back. The "authenticated" or "counterfeit" messages are "signed" as that term is used in the public key cryptography systems (or the equivalent in the secret, single key crypto systems) so that the receiver will know that the "authenticated" or "counterfeit" message actually came from the factory. To understand this latter concept, please consider the following.

In conventional single key cryptography systems such as the U.S. Government DES standard, a single key is used to both encrypt and decrypt the plain text message. This means that the single key must be sent from the sender to the recipient by a secure communication channel. In electronic, instantaneous communication of the type contemplated here, the availability of a secure channel to get the key to the factory host computer is a problem. Public telephone lines, which are likely to be the only instantaneous source available to send data to the factory host computer from most outlets, are not secure. A new program called Nautilus which is available on the Internet can convert a PC having a Sound Blaster card into an untappable telephone such that if a PC so equipped is placed at both ends of the telephone connection, a secure communication channel exists. It is within the teachings of the invention to use a single key system with such a secure channel.

A more elegant solution is the public key crypto system exemplified by the PGP cryptography software commercially available from ViaCrypt of Phoenix, Ariz. for MAC, DOS and Unix platforms. In the public key system, each user has two keys: one which is public and which can be sent by unsecure channels such as public telephone lines, and the other of which, the secret key, is private and is known only to the user. Each key unlocks the code that the other key makes. Knowing the public key does not help one deduce the secret key. The public key protocol provides secure communications without the need for the same kind of secure channels that the single key systems require.

Figure 41:
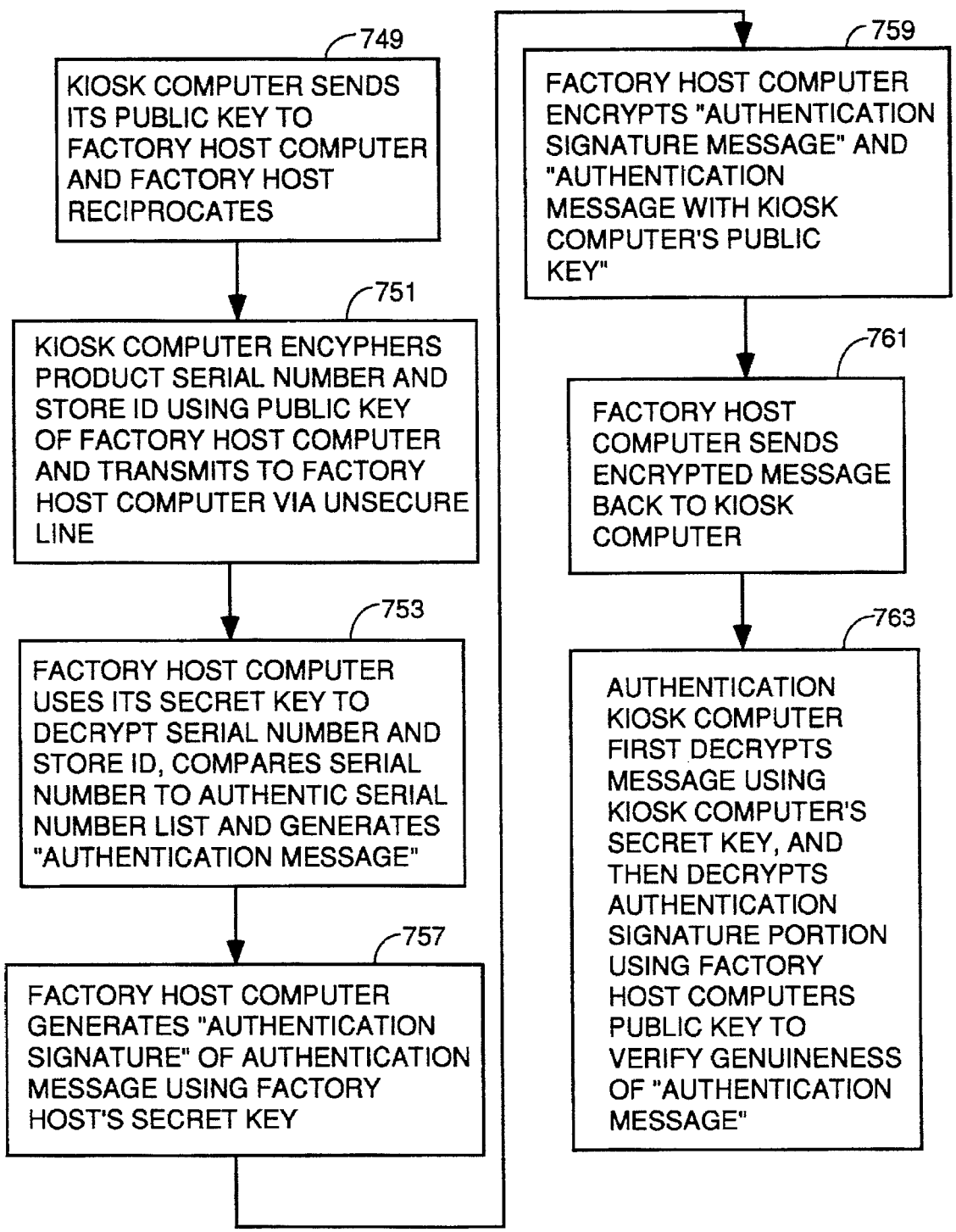
FIG. 41 is a flow chart of a process carried out by a computer in an authentication kiosk and a factory computer for public key encrypted secure authentication communications.

Referring to FIG. 41, there is shown a flow chart of the process carried out by the authentication kiosk computer and the factory host computer to authenticate a part's serial number in secure fashion using the public key crypto system. Block 749 represents the process of the kiosk computer sending its public key to the factory host computer via an unsecure channel such as by modem and public telephone line and the factory host computer reciprocating by sending its public key back to the kiosk computer. The kiosk computer then encyphers the product serial number obtained from the PID or the product itself and the store ID using the factory host computer's public key and sends the encyphered data to the factory host computer via an unsecure telephone/modem connection, as symbolized by block 751. Nobody can decrypt this message, not even the computer in the authentication kiosk because only the factory host computer knows the factory host computer's secret key.

Block 753 represents the process carried out by the factory host computer of authenticating the product serial number received from the authentication kiosk. The factory host computer uses its secret key to decrypt the product serial number and store ID message and compares the product serial number to the list of authentic serial numbers of products manufactured by the factory. If a match is found, the factory host computer generates a "This product is authenticated" type message. If no match is found, the factory host computer generates a "This product is counterfeit" message.

Block 757 represents the process carried out by the factory host computer of generating an authentication signature of the authentication message using the factory host computer's secret key. To do this, the factory host computer "hashes" the authentication message to generate a "fingerprint" of the message and then encrypts the "fingerprint" using the factory host computer's secret key. The encrypted "authentication signature" will be sent to the authentication kiosk computer where the factory host computer's public key will be used by the authentication kiosk's computer to decrypt it. This will prove, if decryption is successful, that the message is authentic as having come from the factory host computer.

Block 759 is the process carried out by the factory host computer of appending the "authentication signature" to the "authentication message" and then encrypting the combined file with the public key of the authentication kiosk's computer. Block 761 represents the process carried out by the factory host computer of sending the encrypted message generated in block 759 to the kiosk computer via unsecure modem/phone line connection.

Block 753 represents the process carried out by the authentication kiosk computer to decrypt the message and verify that it is genuine, i.e., that it actually came from the factory host computer. To do this, the authentication kiosk computer first decrypts the received message using the kiosk computer's secret key to get back to the plain text of the "authentication message". Then, the kiosk computer decrypts the signature portion of the file using the factory host computer's public key. If this decryption is successful, the "authentication message" is genuine as it could only have come from the factory host computer as only the factory host computer has access to the factory host computer secret key.

Figure 42:
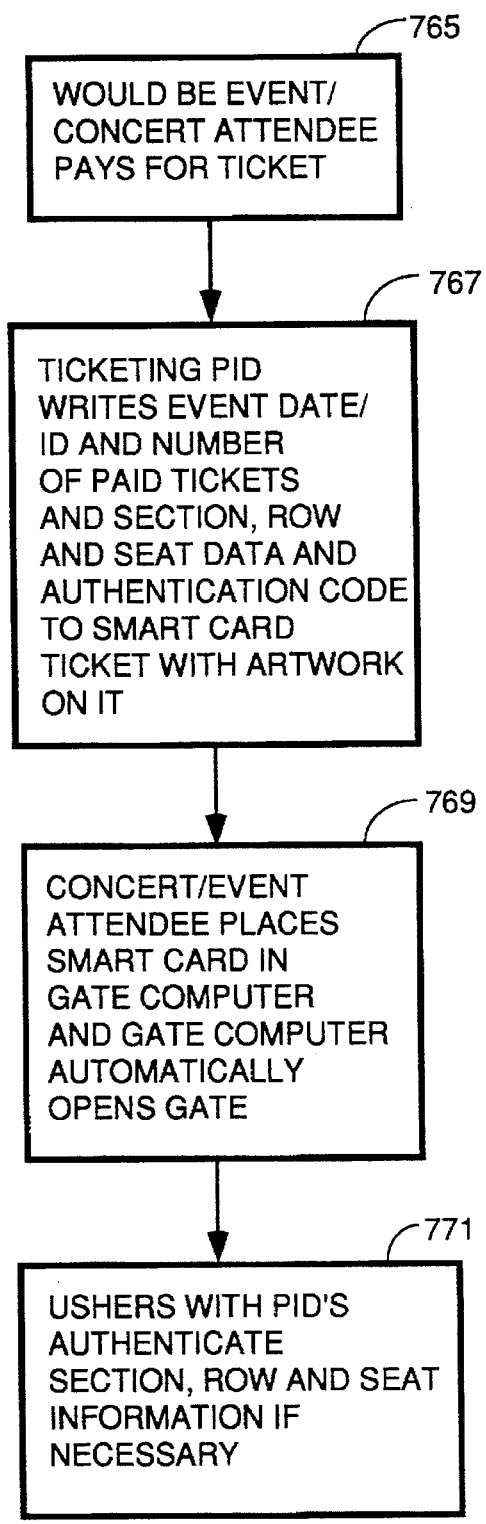
FIG. 42 is a flow chart of a method carried out by PIDs that issue smart card event tickets, gate computers at the event and possibly PID's carried by ushers to use smart cards as event tickets.

FIG. 42 represents a process of using PID's and smart cards for collectible concert/event tickets. Block 765 represents the process of a would-be concert/event attendee paying for tickets to the event. In block 767, the ticketing PID or a desktop computer with an RF ID tag reader/writer writes data to an RF ID tag embedded in a smart card which will serve as the event ticket. The data written to the RF ID tag will include the event identification and date, the number of paid tickets (in some embodiments of this process, one smart card per ticket holder will be issued), and the section, row and seat number information as well as an "authentication signature" code similar to the authentication signature generated in block 757 in FIG. 41 and generated in a similar way using a hash of the data written to the RF ID tag.

The data written to the RF ID tag can be encrypted in some embodiments using the public key of the gate computers that will authenticate the tickets at the event. The gate computers then decrypt the event data, number of seats etc. using the secret keys of the gate computers. All gate computers will share the same secret key.

If authentication that the tickets came from the computer that issued them and not a counterfeiter, each RF ID tag may be written with an authentication signature. This is done by the computer that issued the tickets by hashing the event data written to the RF ID tag in the ticket and encrypting it with the secret key of the computer that issued the ticket. The gate computers will then authenticate the ticket by decrypting the authentication signature using the public key of the computer that issued the tickets.

The smart card tickets will be the size of trading cards and will have event related artwork printed thereon or other art of collectible value such as a picture of Cal Ripken as a rookie.

Block 769 represents the process carried out by a computer at the event gate to authenticate the ticket. Preferably, a PID carried by an usher at the event entrance will be used to read the RF ID tag of the smart card ticket of each attendee and decrypt the data thereon and authenticate it or simply to authenticate it in the way described above. This process can also be done by a gate computer that controls an electrically operated door to admit the attendee by authenticating the ticket and automatically opening the gate if the ticket is authentic.

Ushers with PID's can then authenticate the section, row and seat information if necessary, as represented by block 771.

Referring to FIG. 43(A), 43(B) and 43(C), there is shown a PCMCIA/mag stripe credit card/smart card receiver apparatus. The card receiver apparatus 773 is a molded plastic framework have guide slots 775 and 777. Guide slot 775 is sized to receive a PCMCIA card of type I, II or III configuration. Guide slot 777 is sized to receive a PCMCIA card sized plastic card guide insert 789 which has a guide slot therein for a credit card 781. The back edge of the receiver apparatus has a PCMCIA bus 779 comprised of a plurality of pin formed therein which mates with female ports of a PCMCIA bus connector on the back edge of a PCMCIA card inserted into slot 775. A plurality of pins 781 form a connector which electrically connects the PCMCIA bus and other electrical components in the receptacle to the PID. The other electrical components comprise a pair of one or two channel magnetic heads 783 and 785 and, in some embodiments intended for use with conventional smart cards, a set of electrical contacts (not shown). The electrical contacts are mounted on the card guide insert in the proper position to make electrical contact with the electrical contacts on the back side of a smart card. The magnetic heads are mounted to a printed circuit board 787 which parallels the plane of the underside of the card receiver 773 when it is mounted in the PID. The positioning of the magnetic heads on the printed circuit board and the position of the printed circuit board relative to the card guide insert is such that when a credit card is slid into the card guide insert, the magnetic head will be directly under the magnetic stripe on the card and close enough to read the magnetic transitions recorded on the magnetic stripe and convert them to signals which can be decoded by the conventional magnetic stripe card reader interface 512 in FIG. 19 into ASCII characters. The card guide insert 789 has a pair of slots 791 and 793 formed therein which are sized and positioned so as to form an opening above the magnetic heads when the card guide insert is inserted into the receiver apparatus 773 such that no part of the card guide insert lies between the magnetic heads and the magnetic stripe on the credit card. Two magnetic heads are used so that no matter what orientation in which the card is inserted, one of the magnetic heads will be positioned under the magnetic stripe.

Referring to FIG. 44, there is shown a block diagram of a typical RF ID tag reader from the class of devices that can be used as the RF ID tag reader 314 in FIG. 19 (hereafter referred to as the reader). The reader has a range of from a few millimeters to several meters depending upon size of the RF ID tag (hereafter referred to as a transponder), operating frequency, and whether the transponder is a passive or active type. The reader is connected to the microcomputer 320 in FIG. 19 via a serial data communications link 314A. Transponders of a passive variety are those discussed above which generate power to operate the circuits therein from an excitation signal transmitted from the reader. There is another class of transponder however of an active class which some form of energy source independent of the reader such as a small primary cell such as a lithium battery.

Although the invention has been disclosed in terms of the preferred and alternative alternatives of doing the same functions described herein. All such alternatives are intended to be included within the scope of the claims appended hereto.

What is claimed is:

1. A portable information gathering apparatus comprising:
a housing small enough to be carried by hand;
a barcode scan engine mounted in said housing which is capable of scanning barcodes and decoding and outputting alphanumeric characters encoded in said barcodes;
a display mounted in said housing;
a memory mounted in said housing;
a touchscreen input device mounted in said housing and superimposed over said display for receiving user input;
a microcomputer mounted in said housing and coupled to and programmed to control said barcode scan engine, said display, said memory and said touchscreen input device, and programmed to receive decoded alphanumeric characters from said barcode scan engine and store them in said memory, and programmed to display data on said display and to receive data from said touchscreen input device and use said data received from said touchscreen input device to control operation of said microcomputer;
an RF ID tag reader coupled to and controlled by said microcomputer, wherein said RF ID tag reader comprises a transmitter which can send RF transmissions which both supply power and commands to a passive, RF ID tag in the form of an integrated circuit which has no power supply of its own, said RF transmissions being processed in said passive RF ID tag to supply power to a receiver and a transmitter in said ID tag, said commands causing said transmitter in said RF ID tag to transmit product information back to a receiver in said RF ID tag reader using power from said RF transmissions originating in said RF ID tag reader, and wherein said microcomputer is programmed to control transmissions by said RF ID tag reader to interrogate RF ID tags and receive product information from said RF ID tag reader derived from transmissions from said RF ID tag and store said product information in memory, and wherein said microcomputer is also programmed to control said RF ID tag reader to send a RF transmission to cause said RF ID tags on items that have been paid for to write data therein indicating said items have been paid for such that said RF ID tags do not cause activation of store alarms under control of RF ID tag readers functioning as part of store security systems at store exits when said items are transported out said store exits.

2. The apparatus of claim 1 further comprising a thermal printer coupled to and controlled by said microcomputer, and wherein said microcomputer is programmed to control said printer to print any data desired in print form by a user.

3. The apparatus of claim 1 further comprising an infrared transceiver coupled to and controlled by said microcomputer, and wherein said microcomputer is programmed to control said infrared transceiver to send data by modulated infrared radiation and to control said infrared transceiver to output data for storage in said memory which has been received as modulated infrared radiation.

4. The apparatus of claim 3 wherein said portable information gathering apparatus has a rechargeable battery and electrical contacts coupled to said rechargeable battery through which charging current may be supplied to recharge said battery, and further comprising a detachable base unit which mates with said portable information gathering apparatus and which has electrical contacts which make electrical contacts with said electrical contacts on said portable information gathering apparatus when said base unit is mated with said portable information gathering apparatus, said base unit having a power converter having a DC output coupled to said electrical contacts on said base unit and having an input for receiving AC power from an electrical utility, said power converter for converting said AC power to a DC voltage across said electrical contacts on said base unit which is adequate to charge said rechargeable battery and to power the circuitry in said portable information gathering apparatus.

5. The apparatus of claim 4 wherein said base unit has a local area network interface circuit for coupling said base unit to a host computer elsewhere on a local area network, and has an infrared transceiver coupled to said local area network interface circuit and located in said base unit so as to be in line of sight communication with said infrared transceiver in said portable information gathering apparatus, said microcomputer also being programmed to download information to said host computer via said infrared transceiver and said local area network interface upon receiving a download command.

6. A portable information gathering apparatus comprising:
   a housing small enough to be carried by hand;
   a barcode scan engine mounted in said housing which is capable of scanning barcodes and decoding and outputting alphanumeric characters encoded in said barcodes:
   a display mounted in said housing:
   a memory mounted in said housing:
   a touchscreen input device mounted in said housing and superimposed over said display for receiving user input:
   a microcomputer mounted in said housing and coupled to and programmed to control said barcode scan engine, said display, said memory and said touchscreen input device, and programmed to receive decoded alphanumeric characters from said barcode scan engine and store them in said memory, and programmed to display data on said display and to receive data from said touchscreen input device and use said data received from said touchscreen input device to control operations of said microcomputer;
   and further comprising an infrared transceiver coupled to and controlled by said microcomputer, and wherein said microcomputer is programmed to control said infrared transceiver to send data by modulated infrared radiation and to control said infrared transceiver to output data for storage in said memory which has been received as modulated infrared radiation;
   and wherein said portable information gathering apparatus has a rechargeable battery and electrical contacts coupled to said rechargeable battery through which charging current may be supplied to recharge said battery, and further comprising a detachable base unit which mates with said portable information gathering apparatus and which has electrical contacts which make electrical contact with said electrical contacts on said portable information gathering apparatus when said base unit is mated with said portable information gathering apparatus, said base unit having a power converter hiving a DC output coupled to said electrical contacts on said base unit and having an input for receiving AC power from an electrical utility, said power converter for converting said AC power to DC voltage across said electrical contacts on said base unit which is adequate to charge said rechargeable battery and to power the circuitry in said portable information gathering apparatus:

and wherein said base unit has a local area network interface circuit for coupling said base unit to a host computer elsewhere on a local area network, and has an infrared transceiver coupled to said local area network interface circuit and located in said base unit so as to be in line of sight communication with said infrared transceiver in said portable information gathering apparatus, said microcomputer also being programmed to download information to said host computer via said infrared transceiver and said local area network interface upon receiving a download command; and wherein said base unit has a desktop support unit which is rotatably coupled to a charging mount which mates with said portable information gathering apparatus, said charging mount containing said electrical contacts for charging said portable information gathering apparatus as well as powering the circuits therein, said charging mount being rotatable relative to said desktop support unit under the influence of a knob, and wherein said barcode scanning engine has a barcode sensor which receives light reflected from a barcode through a window in the top of said housing, and wherein said charging mount mates with said housing in such a way and is sufficiently rotatable as to rotate said personal information gathering device to a horizontal orientation such that light reflected from a barcode travelling parallel to the surface of the earth can be sensed by said barcode sensor.

7. A portable information gathering apparatus comprising:
   a housing small enough to be carded by hand;
   a barcode scan engine mounted in said housing which is capable of scanning barcodes and decoding and outputting alphanumeric characters encoded in said barcodes;
   a display mounted in said housing;
   a memory mounted in said housing;
   a touchscreen input device mounted in said housing and superimposed over said display for receiving user input;
   a microcomputer mounted in said housing and coupled to and programmed to control said barcode scan engine, said display, said memory and said touchscreen input device, and programmed to receive decoded alphanumeric characters from said barcode scan engine and store them in said memory, and programmed to display data on said display and to receive data from said touchscreen input device and use said data received from said touchscreen input device to control operations of said microcomputer;
   and further comprising an infrared transceiver coupled to and controlled by said microcomputer, and wherein said microcomputer is programmed to control said infrared transceiver to send data by modulated infrared radiation and to control said infrared transceiver to output data for storage in said memory which has been received as modulated infrared radiation;
   and wherein said portable information gathering apparatus has a rechargeable battery and electrical contacts coupled to said rechargeable battery through which charging current may be supplied to recharge said battery, and further comprising a detachable base unit which mates with said portable information gathering apparatus and which has electrical contacts which make electrical contact with said electrical contacts on said portable information gathering apparatus when said base unit is mated with said portable information gathering apparatus, said base unit having power converter having a DC output coupled to said electrical contacts on said base unit and having an input for receiving AC power from an electrical utility, said power converter for converting said AC power to a DC voltage across said electrical contacts on said base unit which is adequate to charge said rechargeable battery and to power the circuitry in said portable Information gathering apparatus:

and wherein said base unit has a local area network interface circuit for coupling said base unit to a host computer elsewhere on a local area network, and has an infrared transceiver coupled to said local area network interface circuit and located in said base unit so as to be in line of sight communication with said infrared transceiver in said portable information gathering apparatus, said microcomputer also being programmed to download information to said host computer via said infrared transceiver and said local area network interface upon receiving a download command; and wherein said base unit has a desktop support unit which is rotatably coupled to a charging mount which mates with said portable information gathering apparatus, said charging mount containing said electrical contacts for charging and portable information gathering apparatus as well as powering the circuits therein, said charging mount being rotatable relative to said desktop support unit under the influence of a knob, and wherein said barcode scanning engine has a barcode sensor which receives light reflected from a barcode through window in the top of said housing, and wherein said charging mount mates with said housing in such a way and is sufficiently rotatable as to rotate said personal information gathering device to a horizontal orientation such that light reflected from a barcode travelling parallel to the surface of the earth can be sensed by said barcode sensor; and wherein said base unit has a radio transceiver coupled to said infrared transceiver for bidirectionally communicating data received from a portable information gathering device to another computer via an RF link.

8. A method of using a portable information gathering device, said information gathering device comprising:

a housing small enough to be carried by hand;
barcode scan engine mounted in said housing which is capable of scanning barcodes and decoding and outputting alphanumeric characters encoded in said barcodes;
a display mounted in said housing;
a memory mounted in said housing;
a touchscreen input device mounted in said housing and superimposed over said display for receiving user input;
a microcomputer mounted in said housing and coupled to and programmed to control said barcode scan engine, said display, said memory and said touchscreen input device, and programmed to receive decoded alphanumeric characters from said barcode scan engine and store them in said memory, and programmed to display data on said display and to receive data from said touchscreen input device and use said data received from said touchscreen input device to control operations of said microcomputer; and
further comprising a RF ID tag reader coupled to and controlled by said microcomputer, and wherein said microcomputer is programmed to control transmissions by said RF ID tag reader to interrogate RF ID tags on items within range of said RF ID tag reader and receive data from said RF ID tag reader derived from transmissions from said RF ID tag and store said data in memory; and
further comprising a PCMCIA/credit card/smart card slot and a slot interface means for communicating with either a PCMCIA card, a credit card with a magnetic stripe or a smart card, said slot interface means including a smart card interface means coupled to said microcomputer, and wherein said microcomputer is programmed to control said slot interface means to extract data from or write data to a smart card or PCMCIA card placed in said PCMCINA/credit card/smart card slot or to read data from the magnetic stripe of a credit card placed in said PCMCIA/credit card/smart card;

said method comprising the steps of:
gathering information about products in a store using said portable information gathering device by physically carrying said portable information gathering device to the locations of various products or displays of products to be purchased and either scanning barcodes on the products to be purchased or their packages or interrogating an RF ID tag embedded in a product or attached to or embedded in the package of the product, and storing the gathered information in said memory of said portable information gathering device;
after shopping is completed, downloading the information gathered from said products from said memory to a host computer;
receiving and displaying on said display of said portable information gathering device data from said host computer regarding the descriptions of the items to be purchased and the order total;
receiving payment for said products;
sending a security tag deactivation signal from said host computer to security tag deactivation apparatus;
deactivating all RF ID tag security tags on the products which have been paid for using said security tag deactivation apparatus upon receipt of said security tag deactivation signal;
monitoring all exits from said store for transition therethrough of any RF ID type security tag which has not been deactivated using a means for monitoring for active security tags.

9. The method of claim 8 wherein the step of receiving payment for said products, comprises the steps of:
displaying on said display a query as to the manner in which the user desires to pay for the products to be purchased;
receiving user input via said touchscreen indicating the manner in which the user desires to pay for the products to be purchased;
if the user selects payment by credit card and places a credit card in said PCMCIA/credit card/smart card slot, controlling said portable information gathering device to read data from the magnetic stripe of said credit card and store it said memory as well as transmit said data to said host computer;
controlling said host computer to automatically establish communication with a credit card processing center and transmit data regarding the proposed purchase thereto and obtain therefrom a purchase authorization code;
after said purchase authorization code is received, controlling said host computer to send said security tag deactivation signal to said security tag deactivation apparatus.

10. The method of claim 8 wherein the step of receiving payment for said products, comprises the steps of:

displaying on said display a query as to the manner in which the user desires to pay for the products to be purchased;

receiving user input via said touchscreen indicating the manner in which the user desires to pay for the products to be purchased;

if the user selects payment by smart card and places a credit card in said PCMCIA/credit card/smart card slot, controlling said portable information gathering device to read data from the smart card regarding the current balance available for purchases and stores said data in said memory;

controlling said portable information gathering device to compare the current balance available for purchase to the order total received from said host computer;

if the order total is less than the current balance available for purchase, controlling said portable information gathering device to subtract the order total from the current balance available for purchase to derive a new balance, and to write said new balance to said smart card;

after said balance available for purchase has been determined to be sufficient to cover the amount of the order, controlling said portable information gathering device to generate and send said security tag deactivation signal to said security tag deactivation apparatus or to cause said host computer to generate and send said security tag deactivation signal to said security tag deactivation apparatus if the balance available for purchase is not sufficient to cover said order total received from said host computer, controlling said portable information gathering device to display a message on said display advising the user of this fact and querying for a new method of payment;

controlling said portable information gathering device to receive data from said touchscreen indicating the user's selection of the type of payment to be used and vectoring processing to a routine for controlling said portable information gathering device appropriately to process the new method of payment.

11. The method of claim 8 wherein the step of receiving payment for said products, comprises the steps of:

displaying on said display a query as to the manner in which the user desires to pay for the products to be purchased;

receiving user input via said touchscreen indicating the manner in which the user desires to pay for the products to be purchased;

if the user selects payment by smart card and places a smart card in said PCMCIA/credit card/smart card slot, controlling said portable information gathering device to read data from the smart card regarding the current balance available for purchases and stores said data in said memory;

controlling said portable information gathering device to compare the current balance available for purchase to the order total received from said host computer;

if the order total is less than the current balance available for purchase, controlling said portable information gathering device to subtract the order total from the current balance available for purchase to derive a new balance, and to write said new balance to said smart card;

after said balance available for purchase has been determined to be sufficient to cover the amount of the order, controlling said portable information gathering device to generate and send said security tag deactivation signal to said security tag deactivation apparatus or to cause said host computer to generate and send said security tag deactivation signal to said security tag deactivation apparatus if the balance available for purchase is not sufficient to cover said order total received from said host computer, controlling said portable information gathering device to display a message on said display advising the user of this fact and querying for a new method of payment;

controlling said portable information gathering device to receive data from said touchscreen indicating the user's selection of the type of payment to be used and vectoring processing to a routine for controlling said portable information gathering device appropriately to process the new method of payment.

\* \* \* \* \*